(12) United States Patent
Dixit

(10) Patent No.: US 11,170,586 B1
(45) Date of Patent: *Nov. 9, 2021

(54) FLEET LEVEL PROGNOSTICS FOR IMPROVED MAINTENANCE OF VEHICLES

(71) Applicant: Northrop Grumman Systems Corporation, Falls Church, VA (US)

(72) Inventor: Sunil Dixit, Torrance, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/150,752

(22) Filed: Jan. 15, 2021

Related U.S. Application Data

(60) Division of application No. 16/945,263, filed on Jul. 31, 2020, now Pat. No. 10,964,130, which is a continuation-in-part of application No. 16/801,596, filed on Feb. 26, 2020, now Pat. No. 10,814,883, which is a continuation-in-part of application No. 16/583,678, filed on Sep. 26, 2019, now Pat. No.
(Continued)

(51) Int. Cl.
*G07C 5/00* (2006.01)
*B64F 5/60* (2017.01)

(52) U.S. Cl.
CPC ............... *G07C 5/008* (2013.01); *B64F 5/60* (2017.01)

(58) Field of Classification Search
CPC .................................. G07C 5/008; B64F 5/60
See application file for complete search history.

(56) References Cited

U.S. PATENT DOCUMENTS

| | | |
|---|---|---|
| 6,766,230 B1 | 7/2004 | Rizzoni et al. |
| 2003/0200069 A1 | 10/2003 | Volponi |

(Continued)

FOREIGN PATENT DOCUMENTS

| | | |
|---|---|---|
| EP | 1643332 | 4/2006 |
| EP | 2336918 | 6/2011 |
| EP | 2549415 | 1/2013 |

OTHER PUBLICATIONS

International Search Report in related Application Serial No. PCT/US2021/017525, dated May 21, 2021, 13 pages.

*Primary Examiner* — Brian P Sweeney
(74) *Attorney, Agent, or Firm* — McCracken & Gillen LLC

(57) ABSTRACT

A ground-based computing system receives data of performance parameters for like components disposed on like aircraft, and determines corresponding levels of degradation and rates of change of degradation for the respective like components. A fleet-level of degradation for groups of like components is generated based on analysis of the combined degradations of the like components in the respective group and models of components revised. A predicted time for maintenance for each like component is determined based on the corresponding at least one of the RUL and SOH of the like component, thereby enabling cost effective maintenance determinations for components based on a fleet-level information. The ground-based computing system transmits a modified component model to the like aircraft to replace a prior version of the component model which is used to generate on-board degradation analysis, thereby enhancing the accuracy of on-board degradation analysis based on fleet level data.

12 Claims, 36 Drawing Sheets

Failure/Degradation

☐ Incipient Failures

☐ Remaining Useful Life (RUL)

☐ End of Life (EOL)

Quality of Service (QoS)

☐ System Availability

☐ Predicted System Availability

☐ Design Reference Mission Profile

☐ Current Mission Profile

Related U.S. Application Data

10,725,463, which is a continuation-in-part of application No. 16/163,726, filed on Oct. 18, 2018, now Pat. No. 10,676,048.

(56) References Cited

U.S. PATENT DOCUMENTS

| | | |
|---|---|---|
| 2006/0047487 A1 | 3/2006 | Volponi et al. |
| 2008/0040152 A1* | 2/2008 | Vian .................... G06Q 50/04 705/2 |

* cited by examiner

FIG. 28
| Failure/Degradation | Quality of Service (QoS) |
|---|---|
| ☐ Incipient Failures | ☐ System Availability |
| ☐ Remaining Useful Life (RUL) | ☐ Predicted System Availability |
| ☐ End of Life (EOL) | ☐ Design Reference Mission Profile |
| | ☐ Current Mission Profile |
   

FLEET LEVEL PROGNOSTICS FOR IMPROVED MAINTENANCE OF VEHICLES

CROSS REFERENCE TO RELATED APPLICATION(S)

This patent application is a divisional application of U.S. application Ser. No. 16/945,263 filed Jul. 31, 2020, entitled FLEET LEVEL PROGNOSTICS FOR IMPROVED MAINTENANCE OF VEHICLES, which is a continuation-in-part of U.S. application Ser. No. 16/801,596 filed on Feb. 26, 2020, entitled PROGNOSTICS FOR IMPROVED MAINTENANCE OF VEHICLES, which is a continuation-in-part of U.S. application Ser. No. 16/583,678 filed on Sep. 26, 2019, entitled HIGH FREQUENCY SENSOR DATA ANALYSIS AND INTEGRATION WITH LOW FREQUENCY SENSOR DATA USED FOR PARAMETRIC DATA MODELING FOR MODEL BASED REASONERS, which was a continuation-in-part of U.S. application Ser. No. 16/163,726 filed on Oct. 18, 2018, entitled, PARAMETRIC DATA MODELING FOR MODEL BASED REASONERS the entire contents of which are incorporated herein by reference.

TECHNICAL FIELD

Embodiments of the present invention generally relate to determining when maintenance of components of complex vehicles, e.g. aircraft, is needed. Additionally, the embodiments identify whether or not maintenance of like components on all like aircraft is required based on analysis of fleet level data associated with such components and generating actionable dynamic and cost-effective "predictive maintenance" schedules based on the condition of the components for certified maintenance technicians vs. conventional fixed time-interval based "scheduled maintenance" which is costly and labor intensive.

BACKGROUND

Maintenance of complex systems, such as vehicles, aircraft, spacecraft and other systems, represents a significant cost of operation. Maintenance of such systems is typically done on a predetermined schedule (periodic time based) for the various components of the system. The schedule may be solely time-based, e.g. every three months, or maybe based on a combination of time, usage, and reliability metrics, e.g. every three months or 1000 hours of operation determined by mean-time-between-failure (MTBF) component reliability calculations. The amount of time and usage are typically based on the performance history of the same or similar components as utilized in a similar operational environment. Scheduled maintenance based entirely on such reliability metrics has been shown to be less than optimal in numerous commercial and department of defense systems. The Office of the Secretary of Defense (OSD) issued a directive 4151.22 (mandate) that all systems will follow Condition Based Maintenance Plus (CBM+) processes by the year 2032. CBM+ processes provide for maintenance to be scheduled based on the condition of the component and no longer on predetermined time-based and usage-based maintenance. However, compliance with the CBM+ requirements has presented significant challenges.

Although such predetermined scheduled maintenance of components has been satisfactory in some environments, this type of maintenance has not performed as well for some equipment/vehicles in other environments. Predetermined scheduled maintenance has proved to be costly and the cause for delays in vehicle availability due to unnecessary maintenance that may result in inadvertent mishaps by taking parts out for testing and replacing them. For example, consider a jet aircraft. The same type of jet aircraft may be utilized in a variety of extremely different environmental conditions, e.g. a desert with widely varying temperatures and blowing sand versus a temperate latitude with only minor airborne dust. Additionally, if the same aircraft is in operation under the same external environmental conditions, different pilots, especially military pilots, may choose to fly the same aircraft in substantially different ways causing different load variations on aircraft structures. Also, different missions will pose differing levels of stress on the components of the aircraft. Hence, predetermined scheduled maintenance for components may result in not performing needed maintenance due to more than anticipated stress or may result in performing unneeded maintenance due to a significantly lower level of stress than anticipated. Reliable prognostics for the improved timing of maintenance for components of vehicles will provide a more cost-effective solution as well as increasing the operational availability of an aircraft/system avoiding unneeded maintenance, and better utlization of the maintenance workforce. Performing maintenance only when actually needed is even more critical where a fleet of like aircraft have to be maintained. Therefore, there exists a need for a more accurate prediction of maintenance of components in a fleet of like type aircraft so that metrics of component performance across multiple like aircraft for the same component can be utilized to improve on-board testing criteria for the component as well as making fleet-wide concurrent maintenance determinations for like components.

SUMMARY

One object of embodiments of the present invention is to satisfy the need to update on-board component models for increased accuracy to yield reliable prognostics based on the incorporation of fleet-wide metrics of corresponding component performance across multiple like aircraft.

Another object of one embodiment of the present invention is to identify whether or not maintenance of the same components located on all like aircraft is required based on analysis of fleet level data associated with such components. A ground-based computing system receives data of performance parameters for like components disposed on like aircraft, and determines corresponding levels of degradation and rates of change of degradation for the respective like components. A fleet-level of degradation for groups of like components is generated based on analysis of the combined degradations of the like components in the respective group. At least one of a remaining useful lifetime (RUL) and a state-of-health (SOH) for each of the respective like components is determined based on a comparison of the levels of degradation for each of the like components and the fleet-level of degradation of the group of like components. A predicted time for maintenance for each like component is determined based on the corresponding at least one of the RUL and SOH of the like component, thereby enabling cost effective maintenance determinations for components based on a fleet-level information. The ground-based computing system transmits a modified component model to the like aircraft to replace a prior version of the component model which is used to generate on-board degradation analysis, thereby enhancing the accuracy of on-board degradation analysis based on fleet level data.

DESCRIPTION OF THE DRAWINGS

Some example embodiments of the present invention incorporate inputs from an IVHM system and a data fusion module which are described below with reference to the accompanying drawings in order to better understand the operation of embodiments of the present invention in which:

FIG. 28 illustrates quality of service metrics at the component level.

DETAILED DESCRIPTION

The fleet level prognostics embodiments benefit from the explanation of the embodiments and features associated with other inventions as discussed in relationship to FIGS. 1-35. The fleet level prognostics embodiments are described in association with FIGS. 36-48.

In one embodiment the prognostics system utilizes inputs from the Data Fusion Module 1175 and the MBR Diagnostics Engine 106. The IVHM system includes all modules in FIG. 11, the MBR diagnostics system, and the current subject prognostics system, the description of which begins by referring to the text associated with FIG. 26 following the description of the MBR Diagnostics Engine and the Data Fusion Module.

IVHM using Model Driven Architectures (MDA) and Model Based Engineering (MBE) is a solution where software and hardware elements are flight qualified once instead of every time the system is changed or upgraded. This results in significant cost savings by using an XML format configuration file containing a model with the diagnostics domain knowledge of the system. The model needs to be verified for accuracy but does not require expensive and time-consuming software flight qualification. This saves between 25%-35% in military operations and support costs.

Figure 1:
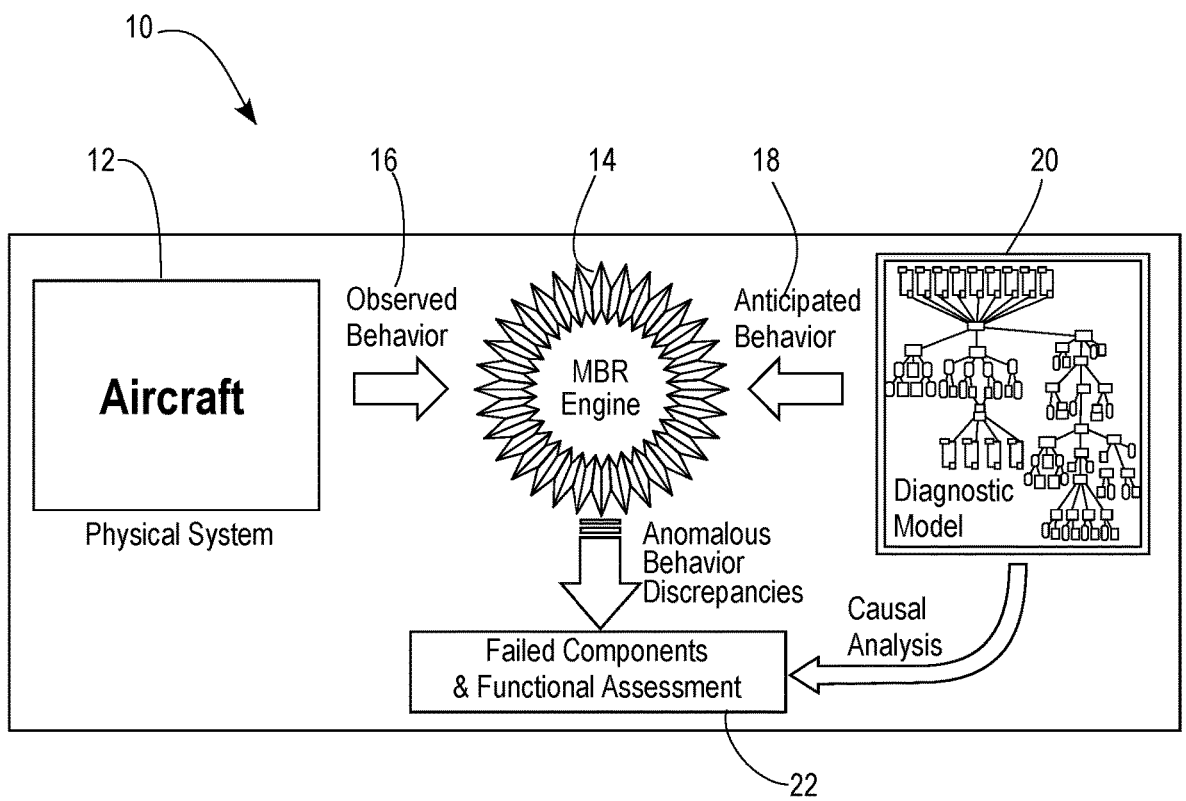
FIG. 1 shows a block diagram of an on-board operational IVHM system and its interfaces for diagnostic analysis of equipment failures in an aircraft.

FIG. 1 shows the functional behavior and interfaces of an IVHM (Integrated Vehicle Health Management) system 10 on aircraft 12 where MBR (Model Based Reasoner) Engine 14 runs on a computation device (not shown) in an avionics bay of aircraft 12. Although an aircraft is shown and discussed with reference to FIG. 1, embodiments are not limited to this type of vehicle. Observed behavior 16 refers to the sensor data in BIT (built in test), parametric, analog, and discretes obtained from various aircraft avionics data buses. Anticipated behavior 18 refers to what is expected from the modeled domain knowledge 20 of the various subsystems, line replaceable units (LRUs), and components of entire system (this model is represented in XML format). Component refers to subsystems, LRUs, and components. When observed behavior 16 is different from the anticipated behavior 18 anomalous behavior (discrepancies/residues) is registered and MBR Engine 14 goes into a diagnostics mode (causal analysis). With various reasoning algorithms and analysis of the BIT, parametric, and sensor data MBR Engine 14 produces results 22 that include detection of failed components; isolation to a single failed component or an ambiguity group of similar components; false alarm identification; functional assessment of the failed component (i.e., leakage in a pump, leakage in a pipe, blockage of air flow, bearing damage, and other assessments dependent on the physics of the component); and unknown anomalies. In case of an unknown anomaly, model 20 is refined with additional information on the component and its interactions with other components related to its failure modes. This information is obtained from the manufacturers of these components and additional failure modes are added to the existing model. To reduce the ambiguity group of similar elements in a chain (series or parallel), typically additional sensors are required to isolate to a specific component within the ambiguity group. If additional sensors cannot be applied due to size, weight, and power limitations the maintainer must perform off-board diagnostics analysis within the localized ambiguity group.

Figure 2:
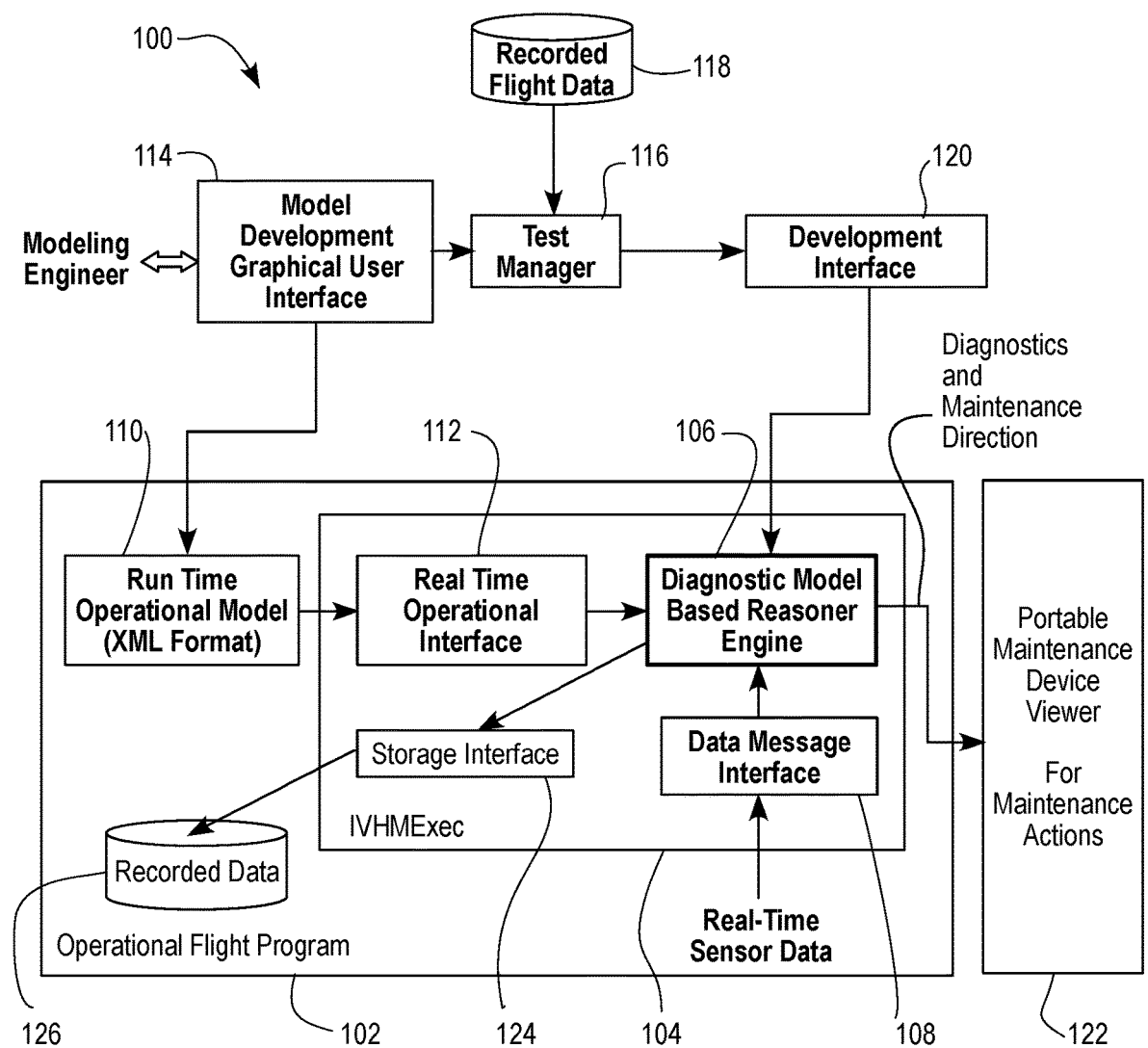
FIG. 2 shows a block diagram of design, operations, and maintenance processes & interfaces of the IVHM system.

FIG. 2 shows a block diagram of an IVHM system 100. The various components of FIG. 2 are linked together to logically combine their interconnected functions, failure modes, failure probabilities, and functional assessments in the modeled system, and also linked to sources of design (114, 116, 118, 120), real-time or post-processed input data distributed to the pilot's display (obtained from Operational Flight Program 102), ground systems (obtained from OFP 102), and storage on disk (126) for maintainer's on-ground maintenance actions 122. For discussion purposes, IVHM system 100 is represented as a block diagram but the functions and methods described maybe logically combined in hardware components in a variety of ways.

Operational Flight Program (OFP) 102 encompasses hardware and software for managing the overall operation of the vehicle. OFP 102 includes a runtime diagnostics engine IVHMExec 104. OFP 102 may also be implemented as a standalone avionics IVHM computer attached passively to the avionics data buses, actively interfaced with mission planning systems, and actively interfaced with ground systems and maintenance systems 122. IVHMExec 104 includes a diagnostic Model Based Reasoner (MBR) Engine 106. MBR Engine 106 combines a physical model of a vehicle system or subsystem with input data describing the system state, then performs deterministic inference reasoning to determine whether the system is operating normally, if any system anomalies exist, and if so, to isolate and identify the locations and types of faults and false alarms that exist. IVHMExec 104 writes maintenance records to a disk 126 that may also be accessed by Portable Maintenance Device Viewer 122.

MBR Engine 106 receives real-time sensor data through Data Message Interface 108 in which high-frequency and low-frequency sensor data are analyzed and integrated together to facilitate the decision-making by MBR engine 106. It also receives a Run Time Operational Model 110 of the vehicle through Real-Time Operational Interface 112. Model 110 of the vehicle is created by a modeling engineer using a Model Development Graphical User Interface (GUI) 114. Model 110 is created and verified with the MBR Engine 106 offline (non-real time) and then exported to an XML file that is used by a real-time embedded build of IVHMExec 104. In addition to creation of model 110, GUI 114 is also used to verify the model. Verification and validation are a test of the model's internal logic and elements, without the use of any specific input data. This process is necessary to ensure that the model is logically consistent, without errors that would prevent it from operating properly or not at all.

As a further step in the model development process, Test Manager 116 evaluates a model by testing it against simulated or actual flight data 118. Development Interface 120 allows for modification and addition of MBR Engine 106 algorithms, which are separate classes statically or dynamically linked to the IVHMExec 104 runtime executable (statically for standalone IVHMExec and dynamically for integration with the Graphical User Interfaces (GUIs)). While verification tests a model logically, Test Manager 116 ensures that the model performance and output is as desired. Once a model is verified and tested, an XML model configuration file 110 is generated.

IVHMExec 104 is the executive that loads the XML representation of the model and executes the MBR Engine 106 in real-time by applying the model to input sensor data messages as they are received from various buses in the vehicle and/or stored history data in various formats for replay on ground. IVHMExec 104 may also be used by Test Manager 116 through Development Interface 120. Storage interface 124 connects MBR Engine 106 to Recorded Data storage 126. Recorded Data 126 includes log files, complete time-stamped state of the equipment, for example, snapshots, time-stamped fault/failure anomalies, detections, isolations, and any functional assessments on the isolations. The log files also include the MBR Engine software states (version number, failures & reboots) as well as identification of other aircraft software, their version number, if failed their state at failure, reboots of software, and functional assessments that lead to the failure. Collection of this data allows for the replay of diagnostics visualization of the actual events that occurred on the aircrafts, and allows the maintainer to better understand both hardware and software interactions leading to the failed component(s). Recorded Data storage 126 stores the raw data used by the MBR Engine 106 and the results of its processing.

In an embodiment, MBR Engine 106 includes dynamically calibrated data input capability, and a set of logic gates (intersection AND, union OR, exclusive-or XOR, and others), rules, cases (histories), and decision trees combined in sensor logic for IVHM data fusion of parameterized and direct analog sensor data with corresponding Built-In-Test (BIT) inputs. A comparison of parametric data, direct analog sensor data, and BIT results produce confidence measures in failure and false alarm predictions.

An example of the creation of a model for use by MBR Engine 106 will now be described. In an embodiment, the model provides for data fusion from many sources within a modeled vehicle. In particular, the model may include parameterized data input capabilities that allow MBR Engine 106 to include analog and quantified digital data input, with either fixed or dynamically calibrated bounds to the measured physical quantities to determine the existence of anomalies. The parameterized data anomaly decision can be based on simple fixed bounds, dynamically changing calibration values based on physical sensor operations, or more complex decision properties including signal noise reduction, windowing, latency times and similar parameterized data conditioning. These data calibration parameters and thresholds become sensor node properties for evaluation during real time operations of the system. Functions can be represented as logic sets and operands while rules may be represented as logic sets or natural language semantics, historic behaviors (case based), or decision trees (fault tree analysis). For example, in the case of pressure functions, the model would evaluate whether flow pressure is provided and combine other inputs according to the function logic desired. In an embodiment, each input must indicate a positive result for the function to be evaluated as true although other logic functions may also be used. Various user-defined parameters for this function can be represented as node properties of the function. The XML MBR Model(s) 110 of the vehicle and the binary IVHMExec 104 real time engine running on an avionics computational device provide IVHM capability/functionality for the entire vehicle.

Figure 3:
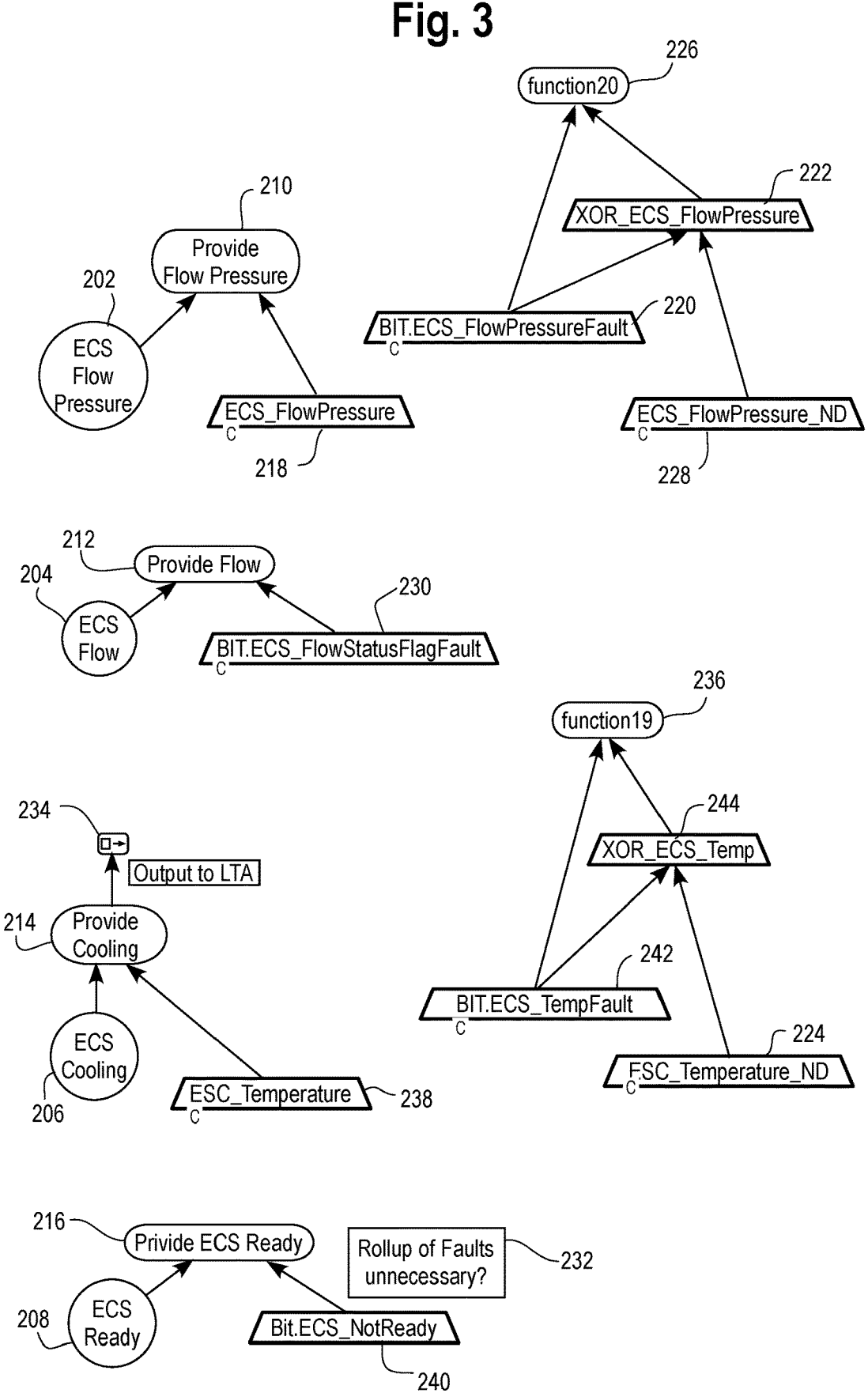
FIG. 3 shows a model of a subsystem for use with the IVHM system.

A parametric and BIT MBR model may include components and sensors that are related by their functions. In an embodiment, a model of a vehicle system or subsystem may be represented as nodes in a graph as shown in FIG. 3. In particular, FIG. 3 shows an example of an environment control subsystem (ECS) including both diagnostic or non-diagnostics nodes as it would be represented using the Model Development GUI 114 of FIG. 2. For the purposes of explanation, a specific example will be discussed, however, principles explained herein may be applied to any subsystem or system of a vehicle. A modeling engineer interacts with the model of FIG. 3 through the GUI 114 of FIG. 2.

Diagnostic nodes are used directly in the MBR model reasoning engine to determine the system components causing a fault or false alarm, while non-diagnostic nodes are used for tasks such as sensor output and BIT test comparison. The non-diagnostics nodes are used for real-time comparison of parametric sensor data with BIT data results. The parametric sensors represent the true system behavior (when the sensors have not failed), and if they are operating nominally when the BIT data show failure of corresponding components, this result is shown as a false alarm. Failed sensors are identified from false positive and false negative tests upon the sensors. Components, such as a Flow Pressure component, refer to a specific system element whose state (e.g. on, off, high or low pressure, etc.) and status (operational, failed, leaking, etc.) is indicated by MBR Engine 106, by connecting the component to other elements of the model. Sensor nodes are modeled with input data, which could take many forms, for example, direct sensor analog input, parametric data input and binary BIT data input. Referring to FIG. 3, a representative component node is shown as ECS Flow Pressure sensor node 202. Other component nodes include ECS Flow 204, ECS Cooling 206 and ECS Ready 208.

Figure 3A:
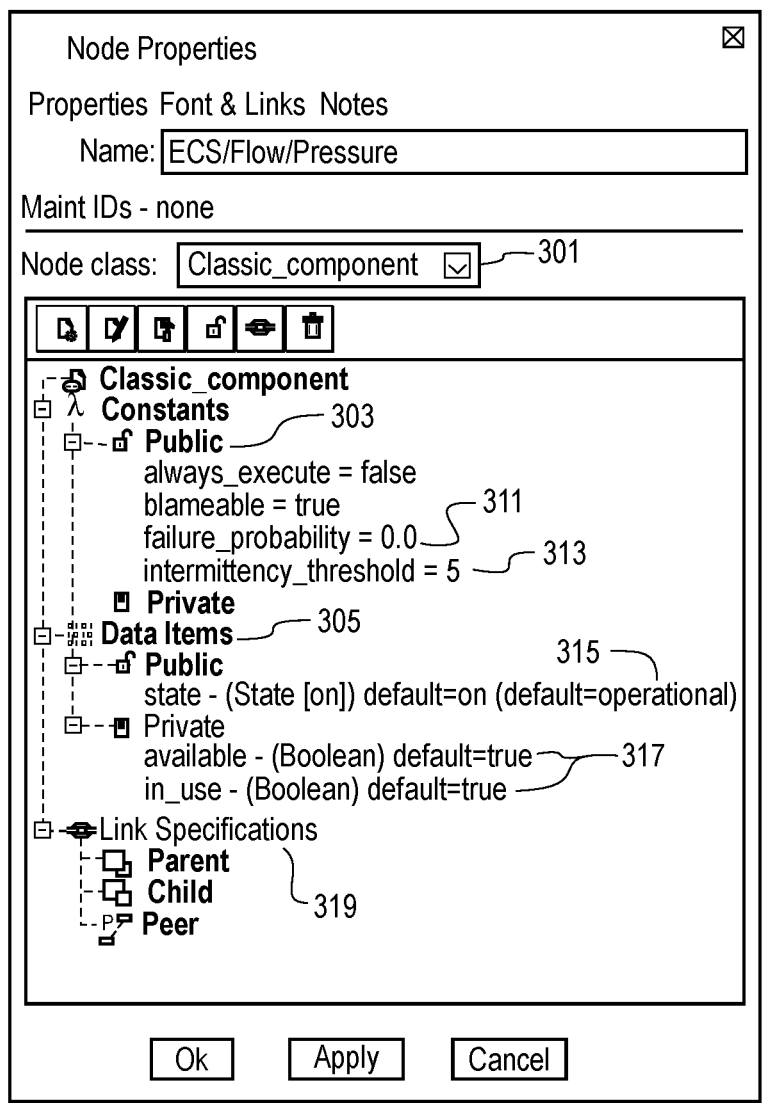
FIG. 3A shows a representation of a component in the model of FIG. 3.

FIG. 3A shows various user-defined parameters for node 202 may be seen by a modeling engineer by double-clicking on the function node icon, which brings up the window shown in FIG. 3A for node 202 (circle). The parameters defined in the Node Properties include the Node Class 301, default parameter values 303, and data items 305 defining the capabilities, output and status data types of node 202. Although specific labels and features are shown in FIG. 3A, these may be varied depending on the function being modeled and the design of a modeled vehicle.

In the default parameter values 303, 311 indicates a failure probability (failure modes) entered from a component supplier with a "0" indicating no supplier data available. Alternatively, the failure probability can be entered from historical performance data. It can be recalculated with degradation events, i.e. the failure probability increases with degradation events. The intermittency threshold 313 refers to a time period of intermittent or random behaviors with an exemplary default value of five seconds. The state 315 defines the various states of the component, e.g. ON, OFF, high-pressure, etc. The available and in use parameters 317 are shown as both being set to "true", i.e. the component is both available and in use. A "false" state in either of the parameters 317 could be due to failure and/or due to other reasons such as loss of power, etc. the link specification 319 specifies links to other components by function nodes.

Figure 4:
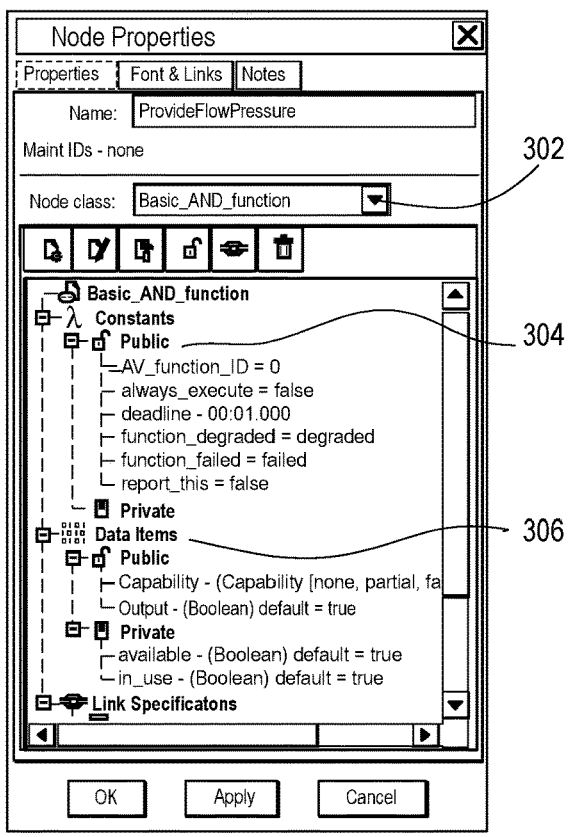
FIG. 4 shows a representation of a function node in the model of FIG. 3.

Another type of node in the model of FIG. 3 is a function node. A representative function node is shown as Provide Flow Pressure node 210. Other function nodes include Provide Flow 212, Provide Cooling 214 and Provide ECS Ready 216. Each of the function nodes in FIG. 3 represent a basic AND function. Provide Flow Pressure 210, for example, is used to determine if flow pressure is provided (logic sets and logic operands), combining other inputs according to the function logic desired. In this example, each input must indicate a positive result for the resulting state of the function to be true. Various user-defined parameters for function node 210 may be seen by a modeling engineer by double-clicking on the function node icon, which brings up the window shown in FIG. 4 for function node 210 (oval). The parameters defined in the Node Properties include the Node Class 302, default parameter values 304, and data items 306 defining the capabilities, output and status data types of node 210. Although specific labels and features are shown in FIG. 4, these may be varied depending on the function being modeled and the design of a modeled vehicle.

Figure 5:
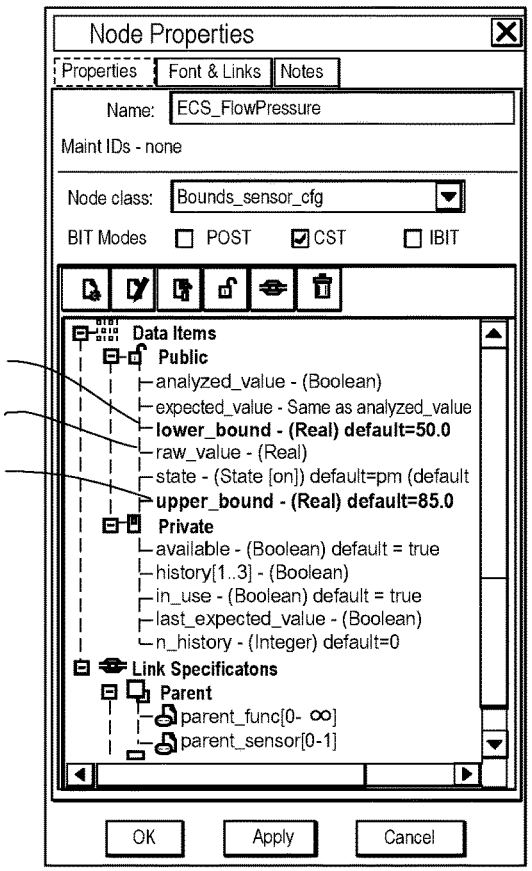
FIG. 5 shows a representation of a sensor node in the model of FIG. 3.
Figure 6:
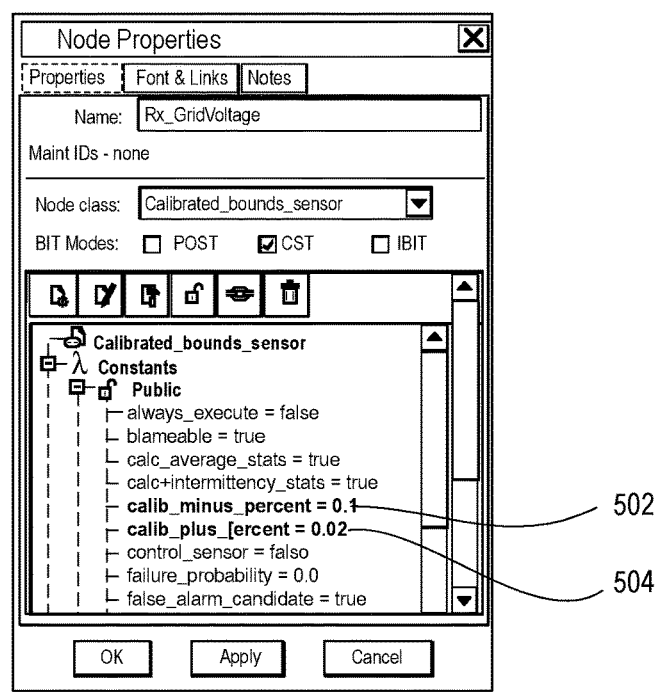
FIG. 6 shows a representation of a calibrated bounds sensor node in the model of FIG. 3.

Another type of node in the model of FIG. 3 is a physical sensor node. A representative physical sensor node is shown as ECS_FlowPressure node 218 (trapezoid) in FIG. 3. Another physical sensor node is shown as ECS_Temperature node 238. Physical and virtual nodes are used in the model to indicate input data, which could take many forms. As described above, a modeling engineer interacts with the model of FIG. 3 through GUI 114. Various user-defined parameters for physical sensor node 218 may be seen by a modeling engineer by double-clicking on the node icon, which brings up the window shown in FIG. 5 for physical sensor node 218. For sensor node 218, parameterized input data is used with fixed upper and lower bounds (allowable thresholds) defined as defaults in the Node Properties window shown in FIG. 5. The use of parameterized data allows for direct analysis of quantified sensor values, listed in the sensor Node Properties as raw value 402 as seen in FIG. 5. In this case, the sensor raw value 402 contains the measured flow pressure for the ECS subsystem. If raw value 402 drops below the lower bound 404 or exceeds the upper bound 406, then the sensor indicates an anomaly, which is then used by MBR Engine 106 (FIG. 2) along with the rest of the model to determine the nature and cause of the anomaly (causal analysis FIG. 2).

Another example of a physical sensor node is BIT_ECS_FlowPressureFault 220. This sensor uses Built-In-Test (BIT) data from the modeled system, which indicates either an anomaly or normal operation in the data output. This BIT test is designed to use the same upper and lower bounds as the corresponding parameterized sensor, but could produce a different result in the case of an anomalous operation. As such, we use the BIT test as an input along with a separate parameterized data input, into XOR_ECS_FlowPressure node 222 which is an exclusive logical or (XOR) sensor node. In some cases, only a BIT test sensor may be available to the maintainer; in this case, the BIT test will be used as a diagnostic sensor similar to the parametric sensor node used here for the ECS Flow Pressure 218. Other physical sensor nodes in the model of FIG. 3 include BIT_ECS_NotReady node 240 and BIT_ECS_TempFault node 242. XOR_ECS_FlowPressure node 222 receives inputs from physical sensor node BIT_ECS_FlowPressureFault 220 and ECS_FlowPressure_ND 228 (nondiagnostics), which is a parameterized input sensor node. The reason that a separate parameterized input sensor is used for the XOR input is because this input is non-diagnostic (no diagnostics cycle performed). Sensors can be either diagnostic, which means that they are used in the MBR engine to determine system faults and false alarms, or non-diagnostic to remove them from the MBR engine assessment. For XOR sensor input, a non-diagnostic parametric sensor input 228 is desirable to prevent interference with the MBR engine, as the XOR logic and output is complementary and separated from the MBR engine processing. In the example used here, the BIT test sensor 220 is also non-diagnostic, for the same reasons. In addition, for XOR sensors, a blank function 226 is used to fulfill a design requirement that each sensor has a downstream function attached to it. Another blank function is shown at 236. Similarly, to node 222, XOR_ECS_Temp node 244 receives input from physical sensor node BIT_ECS_TempFault 242 and parameterized sensor node ECS_Temperature_ND 224.

XOR_ECS_FlowPressure node 222 produces a separate output stream, only indicating a positive Boolean result when the connected sensors (the parameterized sensor node 228 and the corresponding BIT test node 220) provide different assessments. Under normal operating conditions this should not happen, therefore the XOR sensor node is useful to determine when one of the system's BIT or parameterized inputs is providing an anomalous result. This provides the modeler with another tool to diagnose the system's health, which may otherwise be difficult to analyze.

An example of a case where only a BIT test data field is available is shown in FIG. 3 as BIT_ECS_FlowStatusFlagFault node 230 which provides sensor input to Provide Flow node 212. In this case, the BIT test node 230 is diagnostic, and used in the MBR Engine directly. Other model element types seen in FIG. 3 include comments shown, for example, as 232, describing model functionality, and output icon 234 which allows for model elements outside (i.e., Outside submodel: "Output to LTA") of those shown in the sub-model shown in FIG. 3 to communicate with the sub-model, specifically the Provide Cooling function node 214.

In some cases, parametric nodes will not have fixed upper and lower bounds. In this case, a separate node class can be used, as shown, for example, in FIG. 6. This node is not part of the subsystem model of FIG. 3. Here, a second input is used which provides a calibration value (for example, a calibration voltage) which may vary over time. The measured value must then fall in a percentage range defined by calib_minus_percent 502 and calib_plus_percent 504 (generally determined from subsystem supplier information) around the calibration value. This type of sensor node can be used in place of Bounds_sensor_cfg class nodes, such as ECS FlowPressure node 218 of FIGS. 3 and 5, when known calibration values for the limits of a parameterized sensor exist.

Figure 7:
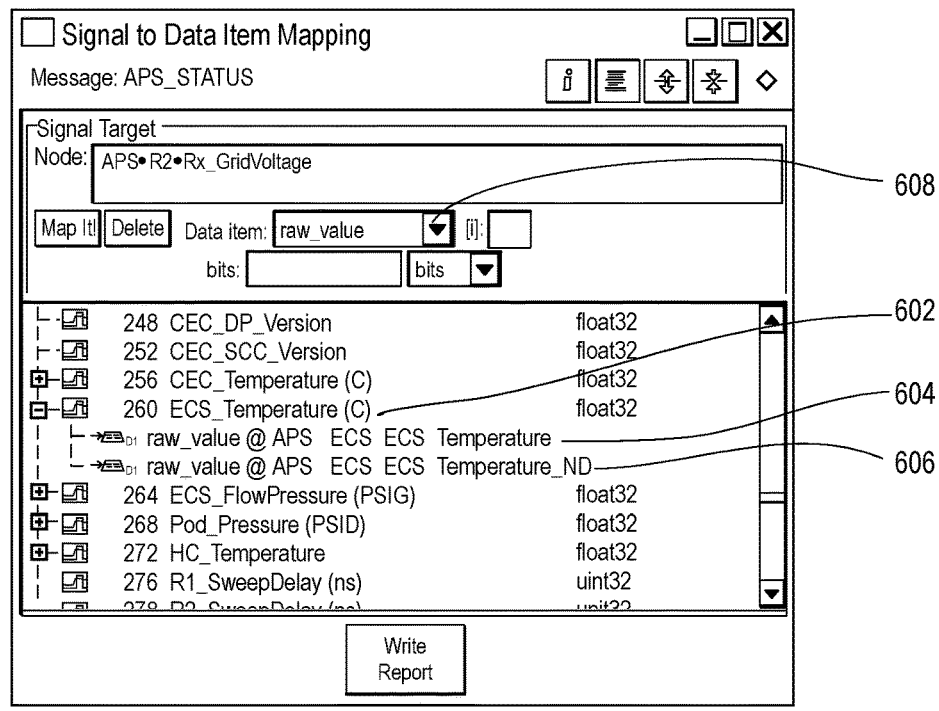
FIG. 7 shows a representation of a data mapping to sensor nodes.

In an embodiment, a model such as that shown in FIG. 3 includes a list of data fields corresponding to each element of the model. For example, as shown in FIG. 7, the ECS_Temperature (C) 602 value is mapped to the diagnostic ECS_Temperature sensor node 604 and non-diagnostic ECS_Temperature sensor node 606 in the ECS submodule. These are the labels of data columns in a file format used as data input for this model, and allow for all data fields for various sensors in each subsystem to be defined systematically in one file. Separate data items are mapped for BIT test data nodes, and calibration data items for calibrated sensor nodes. The raw value data item selection in the drop-down menu 608 indicates that this example data item is a raw measurement value from the ECS temperature sensor. Each sensor in the model (parametric or BIT) is mapped to a data item, along with any calibration value data sets for calibrated parametric sensors.

Figure 8:
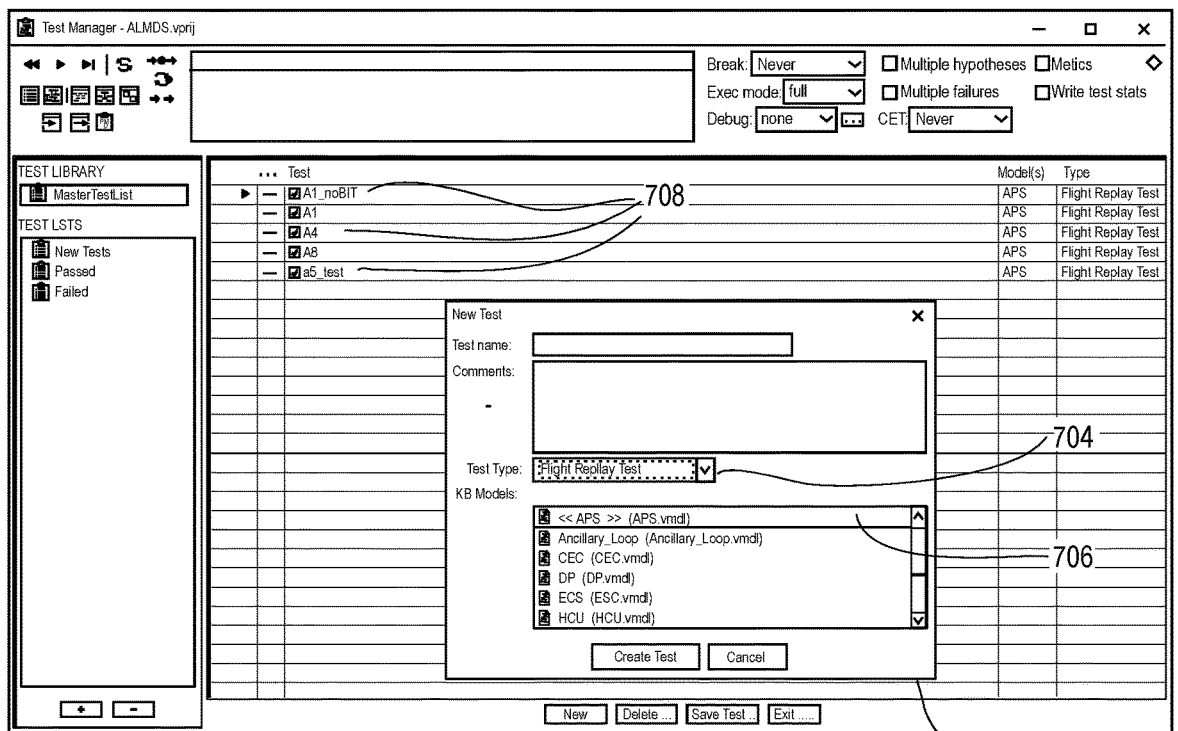
FIG. 8 shows a representation of a mechanism for testing a model for use with the IVHM system.
Figure 9:
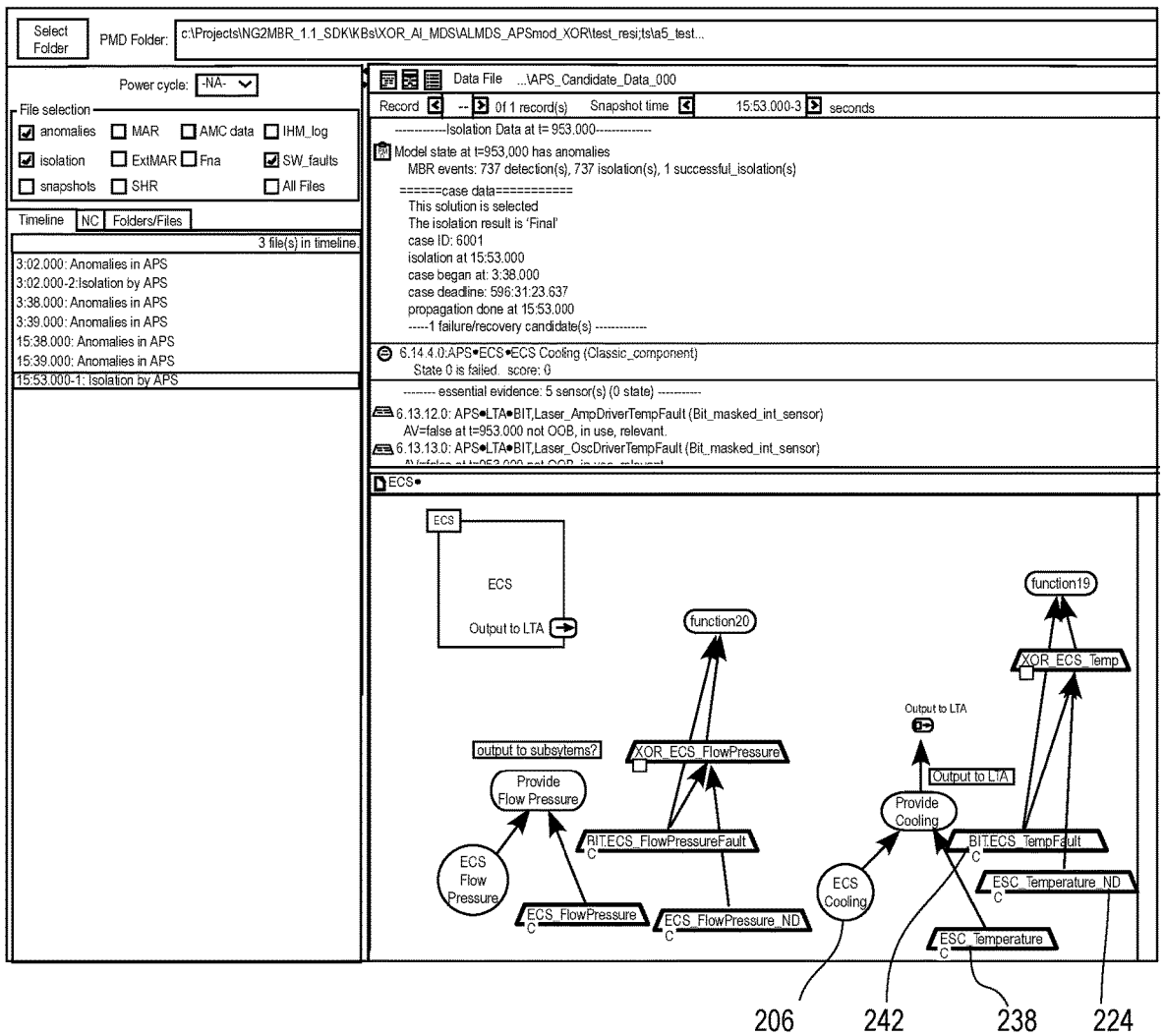
FIG. 9 shows an example of a fault analysis report.

Referring back to FIG. 2, after an IVHM MBR model is built using Model Development GUI 114 (with all sensors, components and functions in place to emulate the operations of each subsystem), there are two methods to run the model using real or simulated system data. As explained above, GUI 114 contains a direct method to run the MBR model using recorded flight data 118 with Test Manager 116. FIG. 8 shows a representative Test Manager window with a New Test pop-up window 702. When Flight Replay Test 704 is selected, a suitable test simulated data or actual flight data file can be selected from options 706 and loaded into Test Manager 116 in FIG. 2. After a test of the model is run using a data file, an output file is generated and can be viewed with subsequently stored analyzed diagnostics results written as maintenance records (i.e., the maintenance records storage 126 in FIG. 2). Other test cases with existing flight data already may be selected from those shown at 708. The specific tests shown in FIG. 9 are representative examples only, and many other tests may also be used.

In an alternative embodiment, a modeling engineer using GUI 114 (FIG. 2) may test a model using a Command Line standalone version of IVHMExec 104 (FIG. 2). For this procedure, an XML (Extensible Markup Language) file containing information about the model and data mapping is generated (i.e., the complete <<APS>> (APS.vmdl) model 706 in FIG. 8 from a different GUI screen not shown). This file can be run with the Command Line standalone version of IVHMExec 104 to generate the output file at a predefined storage location, which can be loaded in PMD data viewer 122 (FIG. 2). This result should be the identical as that generated in the Test Manager 116 (FIG. 2) for the same flight data, but the Command Line procedure allows for batch file processing of large quantities of data sets and varying numbers of system MBR models.

Figure 10:
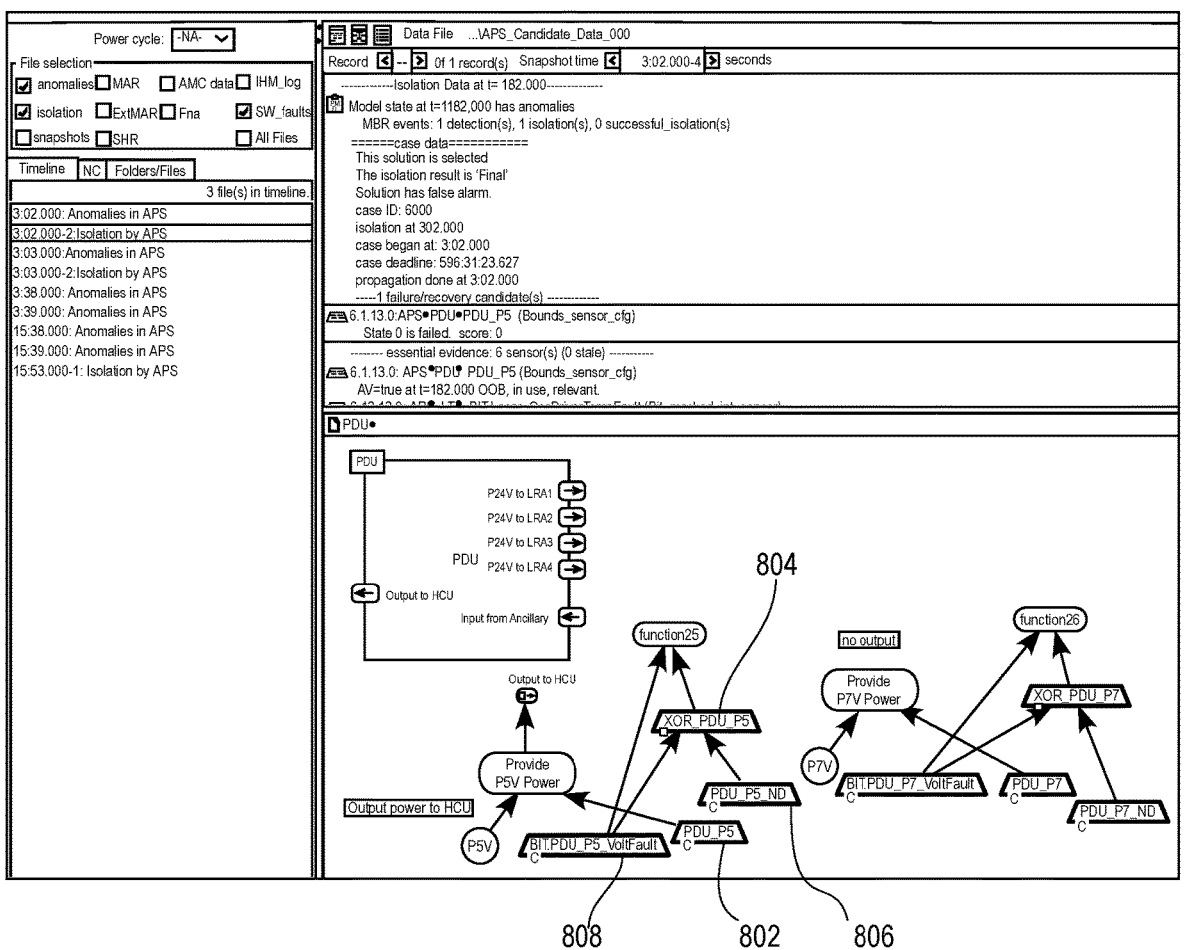
FIG. 10 shows an example of a false alarm report.

An example of output data from a model test is shown in FIG. 10 (PMD Viewer 122 FIG. 2). MBR Engine 106 (FIG. 2) has isolated a fault for the ECS Cooling component, using a fault in both the parameterized ECS Temperature sensor represented as ECS_Temperature node 238 and supporting evidence in other subsystem components including other temperature sensors (in some of these cases, for example, an LTA Laser Amplifier Driver Temperature (not shown), the only data available is a BIT test, hence a BIT test node is used for supporting evidence in this case). The logic of the interconnected subsystems' sub-models as similarly shown in FIGS. 2 and 10 dictates this result when the parameterized sensor ECS_Temperature node 238 measuring the ECS temperature is determined to be an anomaly with appropriate supporting evidence (from other sensor internal to subsystem or external sensors from other subsystem models). In addition, the BIT test BIT.ECS_TempFault node 242 measuring the ECS Temperature anomaly is separately indicating a fault; this sensor node is non-diagnostic and therefore not used to determine system faults, but it is used as a comparator for the non-diagnostic ECS_Temperature_ND parametric sensor node 224. Variations between the BIT and parametric nodes can indicate a faulty BIT test or sensor, and are one of the capabilities added by implementing parameterized sensors.

FIG. 10 shows an example of an output of MBR Engine 106 generating a False Alarm. In this case the Power Distribution Unit (PDU) P5V sensor 802, a parametric sensor measuring voltage in a PDU sub-model a system, is generating an anomaly because the data input for this subsystem is out of the defined parametric range. A parametric sensor node implementation allows for direct use of this sensor data, bypassing potentially troublesome hardware BIT test results. Parameterized nodes also allow analysis of quantitative data directly for calculation of confidence measures, windowing the data for spurious data points, and similar analysis. In this sub-model, a comparator analysis using XOR_PDU_P5 node 804 between the parametric node PDU_P5_ND 806 and BIT test data from BIT_PDU_P5_VoltFault 808 is made to determine if there are any discrepancies between these two results which would be indicative of a sensor or BIT test failure. In the example below, the anomaly is determined to be a False Alarm since other subsystems would expect a similar anomaly in the case of an actual fault in the system hardware. As no such other anomaly exists, the MBR Engine 106 is able to determine that this anomaly is a False Alarm (outcome listed in the top right box of FIG. 10). The other lines shown below this box and above the graphics are timestamped supporting evidence in the outcome of FIG. 10.

The central purpose of the invention is to produce High Fidelity Real Time Diagnostics capability (False Alarm (FA) rejections, Fault Detection (FD), Fault Isolation (FI), and parameter trending for equipment failures) for vehicles and other systems, but is especially (but not exclusively) suited for aircraft. This invention provides embedded software diagnostics capability on numerous hardware devices and operating systems, and system avionics integration for determining the health of the system during in-flight real-time system operations. By implementing parametric data input from high-frequency and low-frequency sensors and XOR parametric-BIT comparator fusion, the system has the capability to analyze quantitative sensor input, develop sophisticated fault and false alarm confidence measures, and identify and analyze BIT failures while maintaining valid system health management and diagnostic capabilities.

Figure 11:
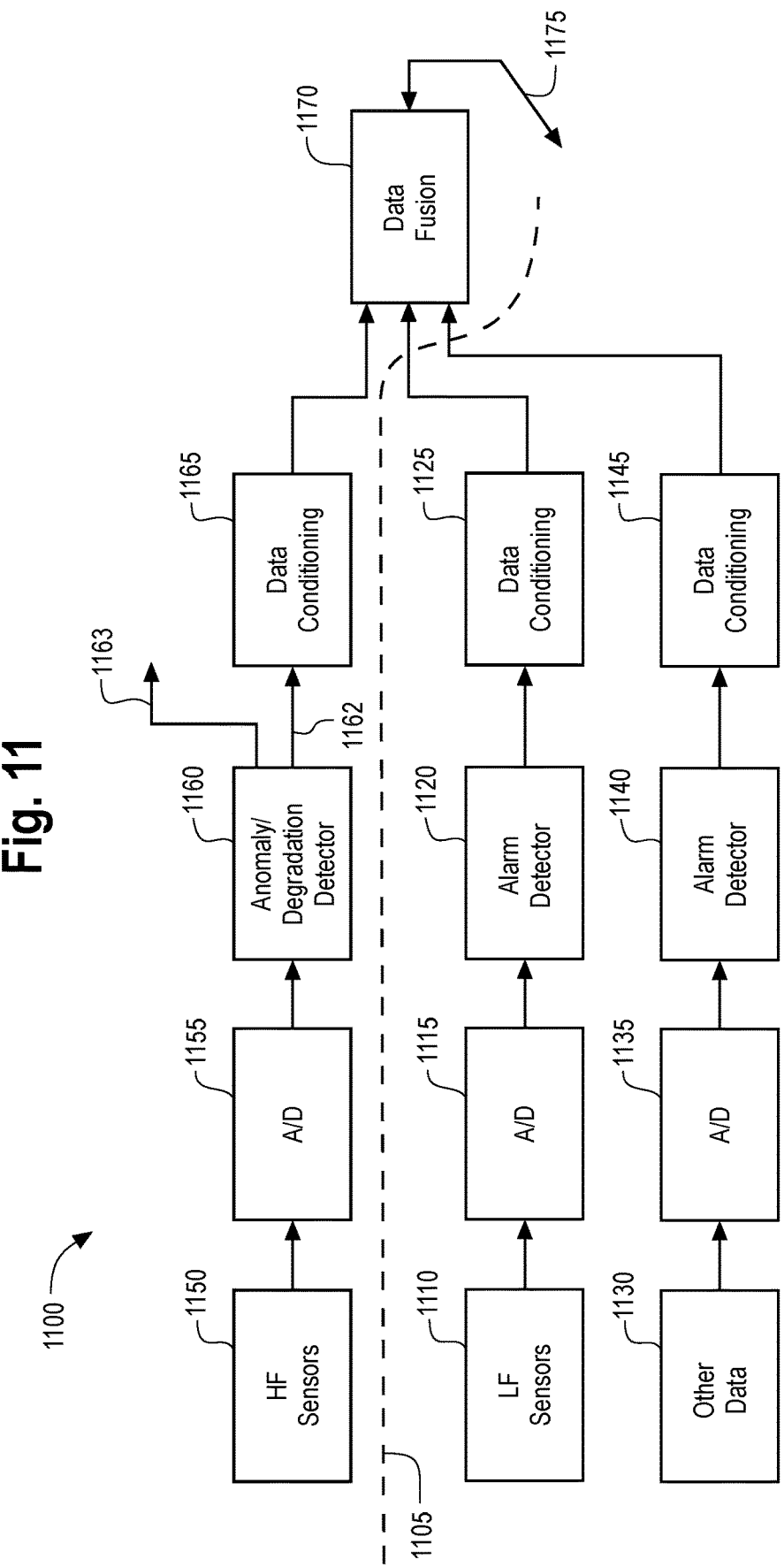
FIG. 11 is a block diagram of an embodiment of the Data Message Interface in which high-frequency and low-frequency sensor data is processed and integrated.

FIG. 11 is a block diagram of an embodiment 1100 of the Data Message Interface 108 (FIG. 2) in which both high-frequency and low-frequency sensor data are processed and integrated together. The dashed line 1105 separates the high-frequency sensor data processing components shown above the line 1105 from the low-frequency sensor data processing components shown below the line. The low-frequency sensor data processing represents a conventional approach. Low-frequency sensors 1110 provide a relatively low data rate output and may be associated with sensors for pressure, temperature, volume, flow, voltage, current, etc. Such sensor output is typically associated with an analog voltage which is converted into a digital signal by the analog-to-digital converter (A/D) 1115. Of course, if a direct digital output is provided by the sensor, it does not need to be processed by the A/D converter 1115.

The digital signal representations of the sensor outputs are supplied as inputs to the alarm detector 1120 which functions to make a determination of whether an alarm condition exists. Such a determination is based on a comparison of whether the digital value of the sensor output is within a fixed window of values defined by static, stored, upper and lower threshold values associated with each respective sensor. Such a comparison can be made by a microprocessor comparing the sensor value with the corresponding threshold values, or could be made by dedicated circuitry, e.g. integrated circuit comparators. If the value of the sensor output is within the respective window, the functioning of the component's parameter being sensed is determined to be within an acceptable range, i.e. no alarm condition. If the value of the sensor output is outside the respective window, functioning of the parameter is determined to be not within an acceptable range, i.e. an alarm is needed. If a sensor window is relatively wide (low and high threshold values are far apart), an extreme or unusual, but abnormal, operating condition may cause the parameter being sensed to exceed such a window and thereby cause alarm. This corresponds to a false positive. The wide window allows for most signals to register as alarms, especially noisy signals, while the system may be functioning properly. This is generally the case in pre-flight testing when components and sensors are achieving normal steady state. The time internal for steady state can be up 30 minutes for certain systems such as Radars. As steady state is achieved false alarms are significantly reduced. Current methods require a long schedule and budget to achieve an understanding of remaining false alarms and an acceptable static lower and upper threshold for each sensor. Our MBR Engine implementation reduces this effort and budget by 90% within two test flights. True False Alarms are easily identified. True Faults can then be worked upon for maintenance (repair or replacement). Persistent false positives (above upper threshold) are an indication that the corresponding sensor has failed. A zero sensor raw value represents an electrical short circuit in the sensor. If the sensor window is set to relatively narrow (low and high threshold values closer together) to accommodate a sensor output corresponding to extreme or unusual operating conditions so as to minimize false alarms, there is a risk that the parameter being sensed may be operating with an unacceptable characteristic that will not be determined to be an anomaly/alarm condition because the sensor output lies outside the narrow window. This corresponds to a false negative. False negatives indicate that possible real anomalies have missed alarm registration and tagging that would otherwise be processed in the detection cycle for causal analysis. Hence, there are challenges in establishing a window with fixed upper and lower threshold values.

The output from the alarm detector 1120 consists of the input digital sensor values with respective digital tags indicating alarm or no alarm. This provides an input to data conditioning 1125 which provides data formatting and alignment. Since the digital output from different sensors may have a different number of digits or may have different ways of encoding values, data formatting converts these values into standardized data representations and formats (i.e., floats, integers, binary bits, etc.), as well as padding of digits of data as necessary. Also, because the sensor data rate (frequency) will typically differ for different sensors, converting each sensor data stream into a data stream having a common data rate, e.g. 50 Hz, makes it easier to integrate and process the information from such a variety of sensors and data branches. The data conditioning 1125 can be implemented on a microprocessor which can make formatting changes to provide conformity of the expression of the sensor values, and can also utilize a common clock to establish time synchronized signals into a single common data rate for the respective digital sensor outputs which may require either up-sampling or down-sampling of each sensor data stream to convert it to the target common data rate, e.g. 50 Hz.

The other data 1130 represents other information obtained from sensors or monitoring such as hardware and software BIT, system fault codes, warnings, cautions, advisories, meteorological, and biological (heart rate, etc. of the vehicle operator, e.g. pilot) data. Signals associated with this information are further processed by the A/D converter 1135, alarm detector 1140, and data conditioning 1145 which perform similar functions as explained above for the corresponding A/D converter 1115, alarm detector 1120, and data conditioning 1125, respectively.

The high-frequency sensors 1150 provide high data rate analog information and may for example include sensors such as, stress gauges, strain gauges, accelerometers, vibration sensors, transducers, torque gauges, acoustics sensors, optical sensors, etc. Such sensor outputs are converted to a digital signal representation by A/D converter 1155 and are input to the anomaly/degradation detector 1160 (see FIG. 12 and text for a more detailed description) in which functions to make determinations of whether each of the sensor data streams represents an anomaly and/or degradation condition is made. If one or both such conditions are determined to exist for a sensor value, the corresponding digital sensor data is output with embedded flag indication at output 1162 which contains real-time sensor information at a down sampled sensor date rate. Output 1163 is a raw output of the digital sensor data for all the sensors, but after having been down sampled to reduce the amount of data associated with each sensor. This output 1163 contains data for all sensors but at a down sampled (substantially lower) data rate and is intended to be utilized by additional real time processors (not shown) to provide diagnostic health determinations. The down sampled data is more manageable (smaller in size requiring less memory for storage) and easier to process, as compared to processing all of the real time sensor data and reduces the time and processing capability required for processors that perform the real time diagnostic health determinations. The data conditioning 1165 operates similarly to data conditioning 1125, except that it must process substantially more sensor data per unit of time since the high frequency sensors will typically produce orders of magnitude more data than the low frequency sensors in the same time interval. The format used by all of the data conditioners accommodates the incorporation of a flag for anomaly or degradation condition, or alarm status.

The data fusion module 1170 (see FIG. 13 for a more detailed description) maps the incoming sensor data streams within a moving time window into groups of sensor data that are correlated, i.e. where the sensor data for each sensor within one group has a mutual relationship in which a component anomaly or failure sensed by data from one sensor in the group should also be reflected by an anomaly or failure as indicated by data from other sensors in the group. For example, assume a first group consists of sensor data associated with sensors that sense the vibration of a pump, the electrical power utilized by the pump, and the flow rate produced by the pump. Also assume that the pump is suffering a degradation due to worn bearings. If the bearings are sufficiently worn, the pump will generate vibrations outside the norm; electrical power utilized by the pump may increase or have a spike in power demand at start-up due to increased friction in the worn bearings. The sensor data associated with the flow rate produced by the pump may or may not show a reduced flow outside of the norm depending upon the severity of the degradation as the pump motor tries to compensate with increased load (power) increasing the pump shaft rotation while maintaining the required flow. Eventually if this is allowed to continue the pump components will fail with torn bearings, shaft misalignment, and possibly burnt motor wire windings.

A consistency of sensor data indicating out of norm conditions from more than one sensor in a sensor group is a step in identifying the presence of an actual degradation or failure. The actual failure isolation is determined by the MBR Engine algorithms 106 (FIG. 2) when compared to the MBR model 20 (FIG. 1). Conversely, data from one sensor indicating an out of norm condition that is not verified by sensor data from another sensor in the group also indicating an out of norm condition is possibly a false alarm which may result from a temporary anomaly (random or intermittent) or that a persistent sensor out of norm condition indicates that the sensor is itself not functioning properly.

Sensor data associated with other upstream or downstream components can also be included within a group. In the above pump example, assume that the pump is controlled to produce a flow of liquid that is channeled through a component, e.g. an engine that requires cooling. In this further example a heat sensor associated with the engine could be included within the group since a failure of the pump would also likely produce an increased engine heating that could exceed a desired operational range. Thus, it will be understood that the grouping of sensor data that are correlated can be associated with the sensed attributes for more than one component. A group of sensor data may include sensor information from a high-frequency sensor 1150, a low-frequency sensor 1110, and/or other data sensors 1130. Of course, the data from some sensors may not be included in any group and hence will be analyzed and considered individually.

The data fusion module 1170 analyzes the mapped sensor data within a time window that increments over time, either on a group basis for the sensor data included within a predetermined group of correlated sensors or on an individual basis where sensor data is not part of any group. The data fusion module 1170 makes a determination based on stored usage and operational norm information for each group/individual of sensor data of whether a tag should be associated with the group/individual sensor data, where the tag consists of one of a predetermined set of conditional codes. Each conditional code is mapped to and compared to similar fault code generated by the component. The conditional codes are then transmitted for further processing in MBR Engine 106 (FIG. 2), while the fault codes and conditional codes are stored in non-volatile memory. For example, a conditional code of "0"" indicates the sensed attributes of a component are within a normal range of operation; a "1" represents a component anomaly/failure; "2" represents a detected false positive that could be caused by the normal range of operation window for the sensor being so wide as to include an undesired operational condition; "3" represents a detected false negative that could be caused by a sensor failure or too narrow a window of normal range calibration for the sensor such that real anomaly supporting evidence misses the MBR Engine 106 detection cycle.

The sensor data along with the conditional codes are transmitted from the data fusion module 1170 to the diagnostic model-based reasoner engine 106 for further analysis. The data fusion module 1170 is implemented in software that runs on a microprocessor/computer capable of mapping the sensor data streams into correlated groups, comparing the respective sensor values against a dynamic normal window of operation having an upper and lower threshold, determining if an anomaly/fault associated with one sensor in a group is supported by a correlation of an anomaly/fault by another sensor in the group, and encoding the respective sensor data with an error code tag representative of the malfunction/fault determined.

Figure 12:
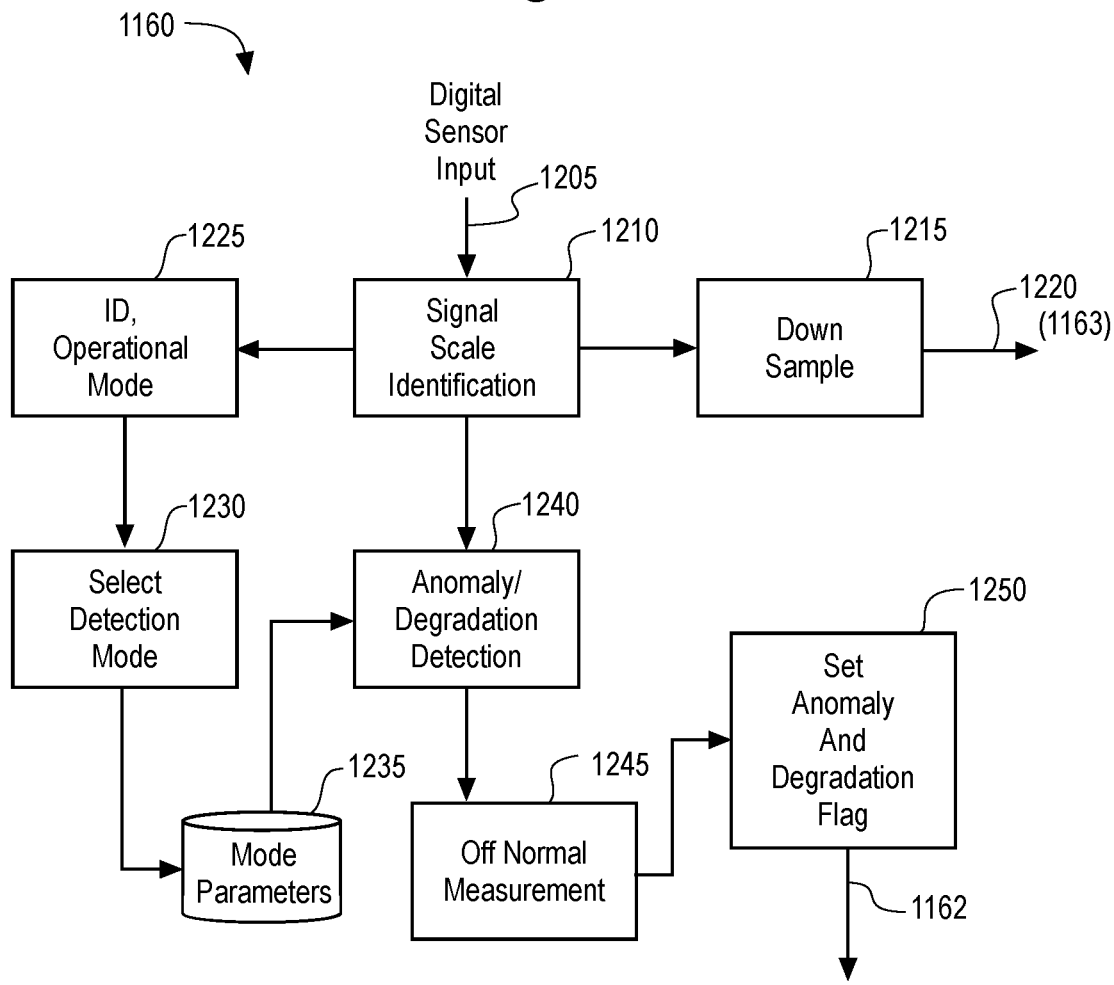
FIG. 12 is a block diagram of an embodiment of the anomaly and degradation detector of FIG. 11.

FIG. 12 is a block diagram of an embodiment of the anomaly and degradation detector 1160 of FIG. 11. This detector is preferably implemented by software running on Graphical Processing Units (GPU) such as on a system-on-a-chip that has hundreds, if not thousands, of GPU processor cores available for processing. This supports the concurrent processing of the outputs from a large number of sensors. Although the A/D converters may utilize dedicated hardware circuits, the A/D converters may also be implemented in software utilizing GPU cores. Likewise, the data conditioning module 1165 may also be implemented by software running on the GPU cores. The digital sensor inputs 1205 from the A/D converter 1155 are received as inputs by the signal scale identification module 1210 which receives the parametric values from the sensors in a dynamic/moving window of valid values and thresholds. The dynamic window of valid values is established based on historical stored normal data for the operation of the vehicle with which the sensors are associated. The raw sensor data received by the signal scale identification block 1210 is passed to the down sample module 1215 which reduces the size of the sensor data stream by eliminating substantially normal data (keeping a small amount time-stamped normal data with number of deleted duplicate data represented by this data sample). Representative out of norm parameter data are tagged with a timestamp and the number of deleted duplicate data represented by this data sample. This down sampled data stream transmitted on output 1220 allows for the re-creation of the initial data stream for non-real time off-line analysis. The identification of operational mode block 1225 analyzes the sensor data and compares it to different stored historical value ranges associated with corresponding different modes of operation of the vehicle, e.g. pre-flight, taxi, take-off, acceleration and deceleration, loitering, weapons delivery, landing, post-flight; to name a few of the modes. The select detection mode block 1230 receives an output from the identification of operational mode block 1225 which identifies a mode of operation of the vehicle. The select detection mode block 1230 causes mode parameters 1235 to identify a corresponding stored set of parameters (upper and lower thresholds, and other mode dependent factors) for each sensor that defines a normal window of anticipated values unique to that operational mode.

These parameters are transmitted to the anomaly/degradation detection module 1240 which utilizes the corresponding parameters for each sensor data stream to identify values that lie outside of the anticipated operational norms defined by these parameters. Thus, dynamic windows of normalized operation for each sensor varies depending on the mode of operation. This provides a dynamic change of normal parameters for each sensor based upon the mode of operation and thus allows a more accurate determination of whether an anomaly/degradation is being sensed because the corresponding "normal value windows" can be changed to allow for values anticipated during a specific mode of operation. Because sensor values can vary considerably depending upon the mode of operation, tailoring window thresholds and parameters for the respective modes of operation greatly enhances the ability to eliminate false alarms without having to utilize a single large acceptable range to cover all modes of operation. Off-line training based on collected and stored previous sensor data for various modes of operation allows for refinement of these window threshold values.

The off normal measurement module 1245 receives the respective sensor data from the anomaly/degradation detection module 1240. Module 1245 makes parameter distance measurements of the values associated with each sensor output relative to normal parameter values for the determined mode of operation. Based on these parameter distance measurements, the off normal measurement module 1245 makes a determination for each sensor output of whether the function being sensed by the sensor is operating within a normal mode or if an anomaly exists. If the sensor output value falls within the corresponding normal value window, a normal operation is determined, i.e. the function is operating within anticipated range of operation. If the sensor output falls outside the corresponding normal value window, and anomaly of operation is determined, i.e. the function is operating with degraded performance or failure, or problem with the sensor or its calibration exists. Refer to the tag conditional codes as explained above. Such a tag is applied to each sensor output and transmitted to the set anomaly and degradation flag module 1250. Module 1250 incorporates such a tag with each of the sensor output values which are transmitted as outputs 1162 to the data conditioning module 1165.

Figure 13:
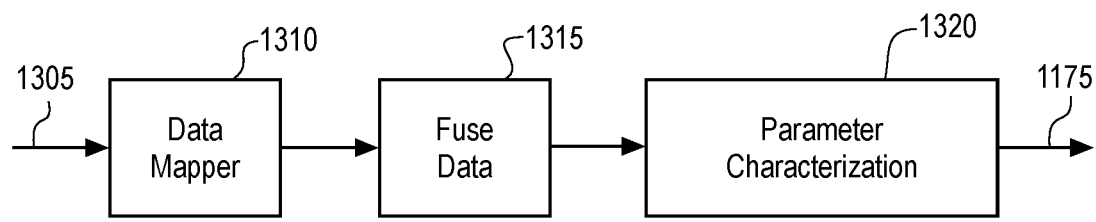
FIG. 13 is a block diagram of an embodiment of the data fusion module as shown in FIG. 11.

FIG. 13 is a block diagram of an embodiment of the data fusion module 1170 as shown in FIG. 11. The fusion module 1170 may be implemented by software running on a microprocessor-based computer. A data mapper module 1310 receives incoming streams of sensor data 1305 from data conditioning modules 1125, 1145 and 1165. This module maps or correlates the data from the incoming sensor streams so that the data from different sensors that are correlated, as explained above, are integrated into respective groups within a moving time window. That is, as the time window moves, sensor outputs occurring within that time window are those to be mapped into correlated groups. Since the incoming sensor data has been standardized to a common data rate, the time within each time window can be selected to capture one data output for each sensor. Since the sensors that will be supplying data are known in advance and groups of sensors that are correlated can be manually predetermined, the correlation information (sets of sensors that are correlated) to can be stored in memory and utilized to route the respect of sensor outputs by the data mapper into respective correlated groups. These groups of correlated sensor outputs are input to fuse data module 1315 which analyzes the data for a correlated group of sensor outputs, including sensor outputs in the group determined to be degraded/anomalous, against a stored set of initial performance parameters for the corresponding group of correlated sensors. The fuse data module 1315 fuses or integrates the data for a correlated group of sensor outputs into a single data set that is tagged with conditional fault or anomaly codes to assist in further analysis provided by the diagnostic model based reasonor engine 106. The fused output data from the fuse data module 1315 is an input to the parameter characterization module 1320 which compares the data associated with each correlated group of sensor outputs with outputs from single sensors that are part of the respective correlated group of sensors. This comparison preferably utilizes the corresponding outputs from single sensors from a past or last state. Such a comparison with a past output sensor state is useful for showing and predicting future states that may indicate off-normal behaviors or at least trending towards off-normal behaviors. The results of such comparisons are stored in a queue and then output as an organized set as outputs 1175 to the MBR engine 106 for further analysis. The queue allows for variable data rate output to accommodate any processing latency required in the MBR Engine 106, while managing the input data rates 1175 without loss of data (by dynamically allocating more processor RAM for queue as needed and releasing the allocated RAM when not needed).

Figure 14:
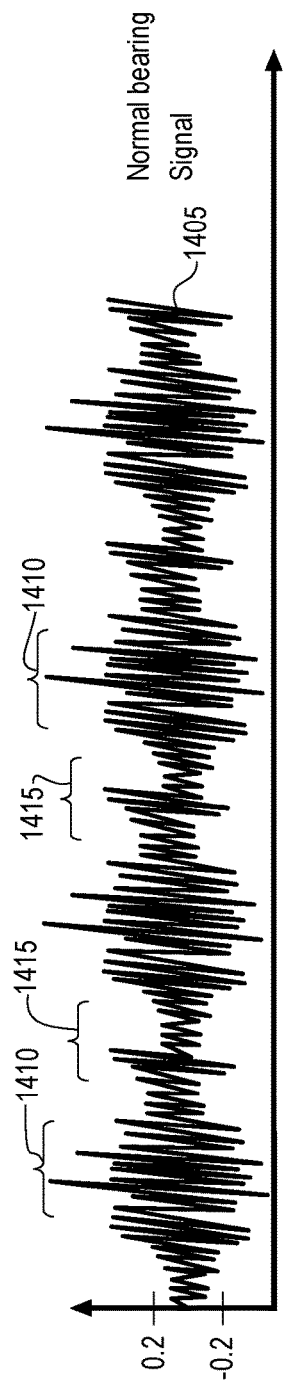
FIGS. 14 and 15 show exemplary high-frequency sensor data from a vibration sensor for motor bearings in a centrifugal pump showing representative sensor data corresponding to normal and defective pump bearings.
Figure 15:
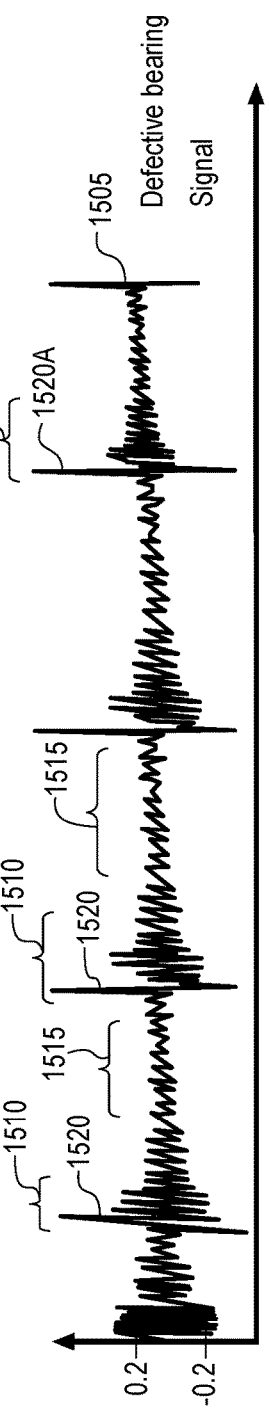

FIGS. 14 and 15 show exemplary high-frequency sensor data 1405 and 1505 from a vibration sensor for motor bearings in a centrifugal pump for corresponding normal and defective pump bearings, respectively. The sensor output data 1405 represents vibrations from a normally operating bearing in the pump and shows repetitive amplitude variations 1410 with the larger amplitudes corresponding to states of the pump which normally give rise to slightly larger vibrations smaller amplitude variations 1415 corresponding to states of the pump that produce less vibrations. The larger amplitude variations 1410 will typically correspond to pump states in which a greater load due to compensation for fluid backflow in the impeller housing or a change in load is occurring with the smaller amplitude variations 1415 corresponding to no fluid backflow, which produces less vibrations. Both 1410 and 1415 represent steady state operation of the centrifugal pump. Note that the rotor (pump shaft) velocity remains constant over the entire shown time interval.

Sensor output data 1505 represents vibrations from a malfunctioning/defective bearing in a pump. Somewhat similar to the variations in FIG. 14, there are repetitive larger amplitude outputs 1510 interspersed with smaller amplitude outputs 1515. However, it will be noted that the difference between the average of the smaller amplitude outputs and the average larger amplitude outputs is significantly greater in FIG. 15 then the same corresponding differences in FIG. 14. Also, an amplitude spike 1520 at the beginning of the larger amplitude output sections 1510 has a significantly higher amplitude than any of the remainder of the larger amplitude output section 1510. As time goes on, it will be noted that spike 1520A is even more exaggerated in its amplitude difference relative to the remainder of the corresponding larger amplitude section 1510. Such a vibration differential at the beginning of a pump cycle may correspond to increased friction due to worn bearings. Note also the baseline trend of the system to higher frequencies over time (e.g. increasing average slope from the start). This is an indication of the onset of degradation and misalignment of the pump shaft, and possible ultimate failure of the pump, unless repaired.

Once sensor data has been collected and stored corresponding to the normal anticipated bearing vibrations during the operation of a pump in good working order, this data can be compared/contrasted with sensor data during an in-service operation (in-flight for an aircraft) to make a determination of whether the subject pump is operating normally or is in need of maintenance or replacement. As explained below with regard to FIGS. 16 and 17, such a determination will preferably be made on the basis of information obtained from more than one sense parameter.

Figure 16:
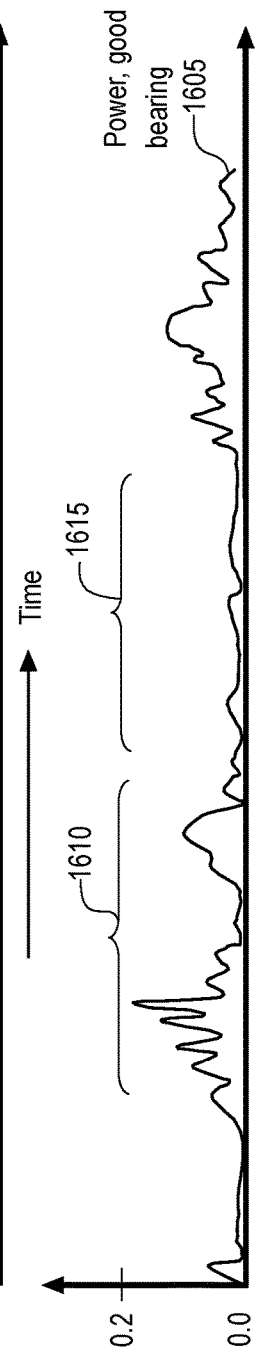
FIGS. 16 and 17 show exemplary high-frequency sensor data from a sensor that monitors electrical power to the centrifugal pump corresponding to power associated with a good bearing and a bad bearing, respectively.
Figure 17:
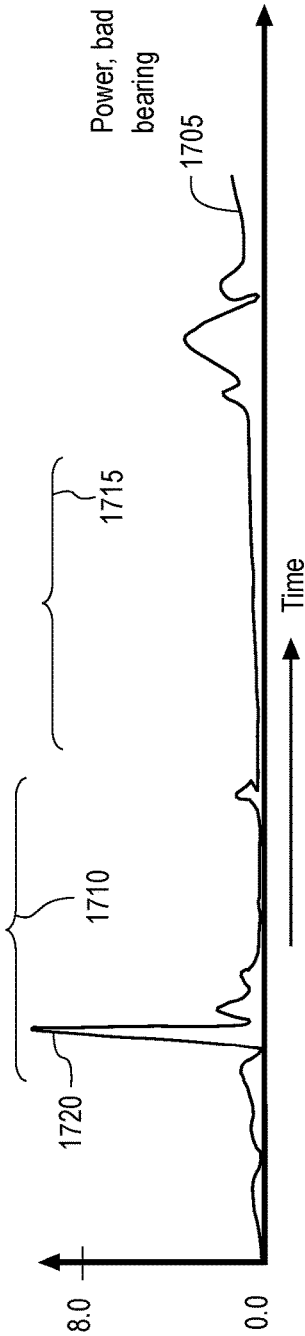

FIGS. 16 and 17 show exemplary high-frequency sensor data 1605 and 1705 from sensors that monitor electrical power to the centrifugal pump with a good bearing and a bad bearing, respectively. The sensor output data 1605 corresponding to power consumed by the pump with good bearings includes a larger magnitude section 1610 of relatively higher power consumption in the lower magnitude section 1615 with relatively low power consumption. It should be noted that the timescale in FIGS. 16 and 17 are the same but are different from the timescale associated with FIGS. 14 and 15. For example, the larger amplitude section 1610 may correspond to a time in which the pump is operational and under load with the lower magnitude section 1615 corresponding to a time interval with a lighter load or perhaps almost no load. Sensor output data 1705 corresponds to power consumed by the pump with bad bearings and includes a larger magnitude section 1710 representing higher power consumption relative to the lower power consumption as indicated by time interval 1715. However, the spike 1720 from the sensor of power being consumed represents more than an order of magnitude greater than the highest power consumption indicated during corresponding time interval 1610. Such an extreme large need for power consumption is consistent with an initial starting of the pump (or of a pump cycle) with a bad bearing where the bad bearing causes an especially high initial resistance to get the rotating part of the pump in motion.

The fusion of the data from the pump vibration sensor with the pump power sensor leads to a high reliability determination of whether the bearing of the pump is malfunctioning/degrading. Positive correlation by both a defective bearing signal 1505 and the power sensor data 1705 results in a highly reliable determination that the associated pump, at a minimum, needs maintenance or perhaps replacement. Conversely, without a positive correlation from two or more sensor signals, it is possible that only one sensor signal indicating a defect could be a false positive. Such a false positive could be the result of a temporary condition, such as a temporary change in operation of the vehicle or transient electrical interference. Alternatively, a lack of positive correlation could also indicate the sensor associated with the detection of the malfunction being itself defective or perhaps going out of calibration.

Figure 18:
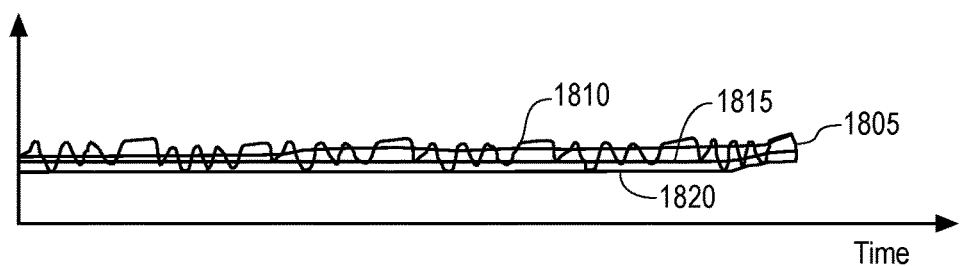
FIGS. 18, 19, 20 and 21 are exemplary graphs showing high-frequency sensor signals and derived sensor signal averages utilized for dynamic anomaly recognition.

FIGS. 18, 19, 20 and 21 are exemplary graphs showing high-frequency sensor signals and derived sensor signal averages utilized for dynamic anomaly recognition. This technique is independent of and performed in addition to the operation-based mode of processing, but both occur in parallel in Anomaly/Degradation Detection 1160. Only parameter anomaly tags with other information described below are forwarded to the Data Fusion 1170. It should be noted that timescale (horizontal axis) for these graphs are not the same as these graphs are presented to assist in explaining how different moving averages are utilized for dynamic anomaly recognition. In FIG. 18 the output 1805 from a high-frequency sensor forms the basis for a series of three different moving averages with respective short, medium and long timescale durations. In this example, the shorter timescale average 1810 is substantially shorter than the medium timescale average 1815 which is shorter than the long timescale average 1820. Timescale durations refers to the number of sensor data values utilized to calculate corresponding short, medium and long moving averages. The number of values may vary depending on the sensor data rate and the typical rate of change of senor values. On initial data acquisition, these moving averages are dynamically set according to incoming parameter values and their rate of change in amplitudes. Medium moving average timescale duration is generally observed to be 1.5 to 2.5 times the short moving average timescale duration. The long moving average timescale duration is generally observed to be twice as large (or larger) as the medium moving average timescale duration. Note that the larger timescale duration sizes for medium and long moving averages has the effect of decreasing the magnitude (amplitude) in the resultant curves of these averages. These moving average sampling windows may be refined with off-line training on previous sensor data. These can then be statically set once enough confidence is gained on their applicability, thus reducing the computational processing power which can then be utilized for other processes. As shown in FIG. 18, the substantially consistent average magnitude of sensor output is reflected by corresponding substantially straight line short, medium and long moving averages 1810, 1815 and 1820, respectively.

Figure 19:
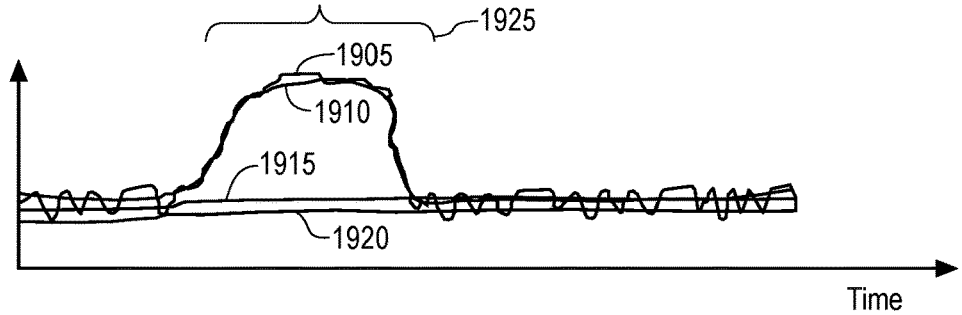

FIG. 19 shows the output 1905 for a high-frequency sensor with associated short, medium and long moving averages 1910, 1915 and 1920, respectively. In this example, there has been a substantial magnitude amplitude, short duration transient during interval 1925. Short term moving average 1910 closely tracks the sensor signal 1905 during this transient interval. However, a medium length moving average 1915 and the longer term moving average 1920 have a timescale that causes little variation of these averages during the transient interval, as shown. Such a transient could reflect a temporary (intermittent or transient) anomaly that is short relative to the moving average time interval associated with even the medium length moving average 1915. These can occur due random noise in the data due to noisy data busses, environmental effects, or some other near-neighbor mechanistic effect. This behavior is also known as a non-persistent shift in the moving averages, thus indicating a random statistical fluctuation in the signal.

Figure 20:
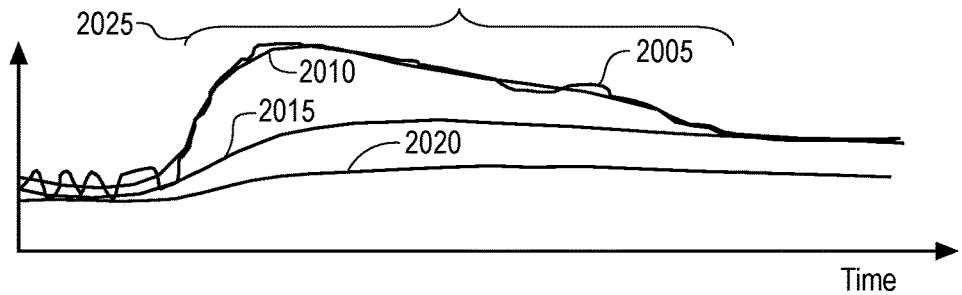

FIG. 20 shows the output 2005 for a high-frequency sensor with associated short, medium and long moving averages 2010, 2015 and 2020, respectively. This example illustrates a substantial initial magnitude change of sensor output values starting at the interval 2025. Although the initial magnitude change of the sensor output decreases by the end of interval 2025, it is still maintained at a level significantly higher than that proceeding interval 2025 (i.e., increasing slope of the baseline curve). As will be seen, the short term moving average 2010 closely tracks the sensor output values before, during and after interval 2025. However, the duration of the interval 2025 is substantially longer than the number of values used for the medium moving average 2015 such that the medium moving average 2015 begins to track towards the short term moving average 2010 so that these two moving averages substantially coincide at the end of interval 2025. Although the long moving average 2020 is slowly moving upward towards the medium moving average 2015 during the interval 2025, it will be noted that by the end of interval 2025 the long moving average 2020 has still not reached the value of the medium moving average 2015. Although the long moving average 2020 will eventually converge with the medium moving average 2015 (assuming the sensor output value remains a relative constant at the end of the interval 2025), it will take a substantial number of moving average rollover calculations for this to occur depending upon the difference between the number of sensor values utilized in the medium and long moving averages. The fact that the baseline slope is slowly increasing during large samplings (large number of sequential moving average calculations) of the parameter values indicates an off-nominal behavior, i.e., a persistent-shift in the moving averages (note in all curves). This is registered (tagged) as an anomaly as well as a degradation event in the corresponding parameter data. The component corresponding to these moving averages has not failed and can still be used but is in a degraded state (i.e., the operating conditions must be adjusted to lower values in order to attain steady state). At some point in the near future, however, this component may be repaired or replaced for full normal performance of the component.

Figure 21:
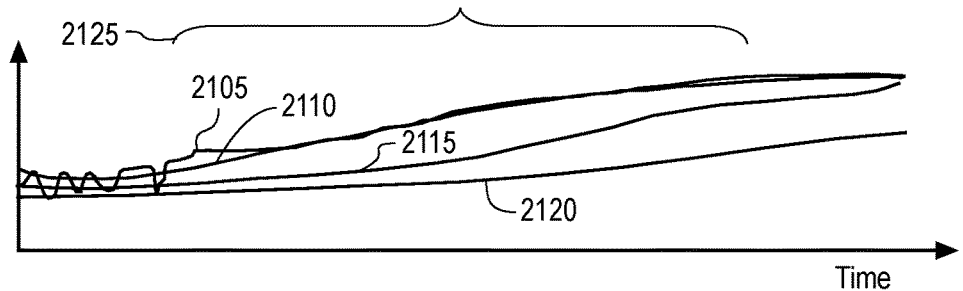

FIG. 21 shows the output 2105 for a high-frequency sensor with associated short, medium and long moving averages 2110, 2115 and 2120, respectively. In this example, the sensor output value 2105, beginning at interval 2125, undergoes a steady rate of increase in values until it reaches a substantially off-nominal value at the end of interval 2125. As expected, the short moving average 2110 closely tracks the values of the underlying sensor values 2105. The medium length moving average 2115 (medium sampling window) begins to climb towards the short moving average 2110 but does not reach the value of the short term moving average 2110 until after the end of interval 2125. As expected, the long moving average 2120 slowly begins to move upward towards the medium moving average 2115 but, by the end of the graph as shown, has not reached the same value as the medium moving average 2115. This example illustrates a persistent change (persistent shift in moving averages) of sensor output values moving from values shown prior to interval 2125 to new relatively off-nominal moving averages at the end of interval 2125. This example illustrates a near-failing component. It must be repaired or replaced very soon, i.e. preferably upon return of associated vehicle to a depot. The baseline slope is increasing continuously without a downturn and sharply. If this is a critical component, vehicle safety is comprised if vehicle operations continue as is. The operator of the vehicle should return to base. The parameter data is tagged as a critical anomaly (for a critical component) with an alarm that will be processed immediately by the MBR engine 106 and information displayed to pilot or transmitted to ground based pilot (assuming the vehicle is an aircraft) for immediate action.

Figure 22:
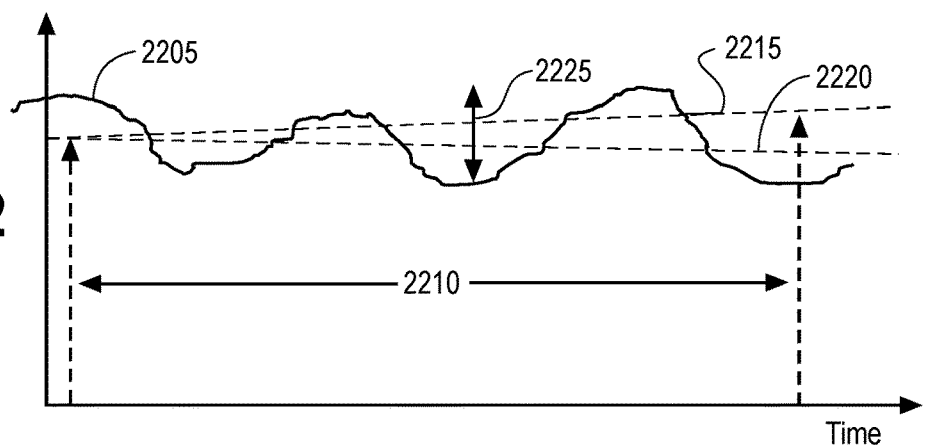
FIG. 22 is an exemplary graph of a high-frequency sensor signal with derived mathematical functions also utilized for dynamic anomaly recognition.

FIG. 22 is an exemplary graph of high-frequency sensor values from which is derived criteria that is utilized to assist in dynamic anomaly recognition. This exemplary graph provides a visual representation showing criteria determined over a moving data window 2210 based on the underlying sensor values 2205. These criteria provide a standard for determining whether an alarm should be implemented for the corresponding function sensed by the associated sensor values. Line 2215 represents the slope (s) of the data values contained within the window 2210. Line 2220 represents the arithmetic mean (u) of the data values contained within the window 2210. The vertical line 2225 is a visual representation of the standard deviation (SD) for the data values contained within the window 2210. Generally, an alarm should be set when:

<0.0167
and
SD/u<1/6

This technique accommodates the verification of persistent shifts in sensor output values as well as determining alarm coefficients, i.e. when alarm should be determined. The technique is based on a low probability with Gaussian Distribution statistics of determining a consistence value greater than six standard deviations, as normalized by the mean. It will be noted that the standard deviation is normalized by the mean to accommodate different sensor output values. In comparison with FIGS. 18-21, it is noted that normalized signals with moving mean averages (FIG. 22) produce smaller slopes "s" for persistent shifts in moving averages, and smaller values in SD/u. This produces the necessary conditions (as given above) for generating alarms.

Figure 23:
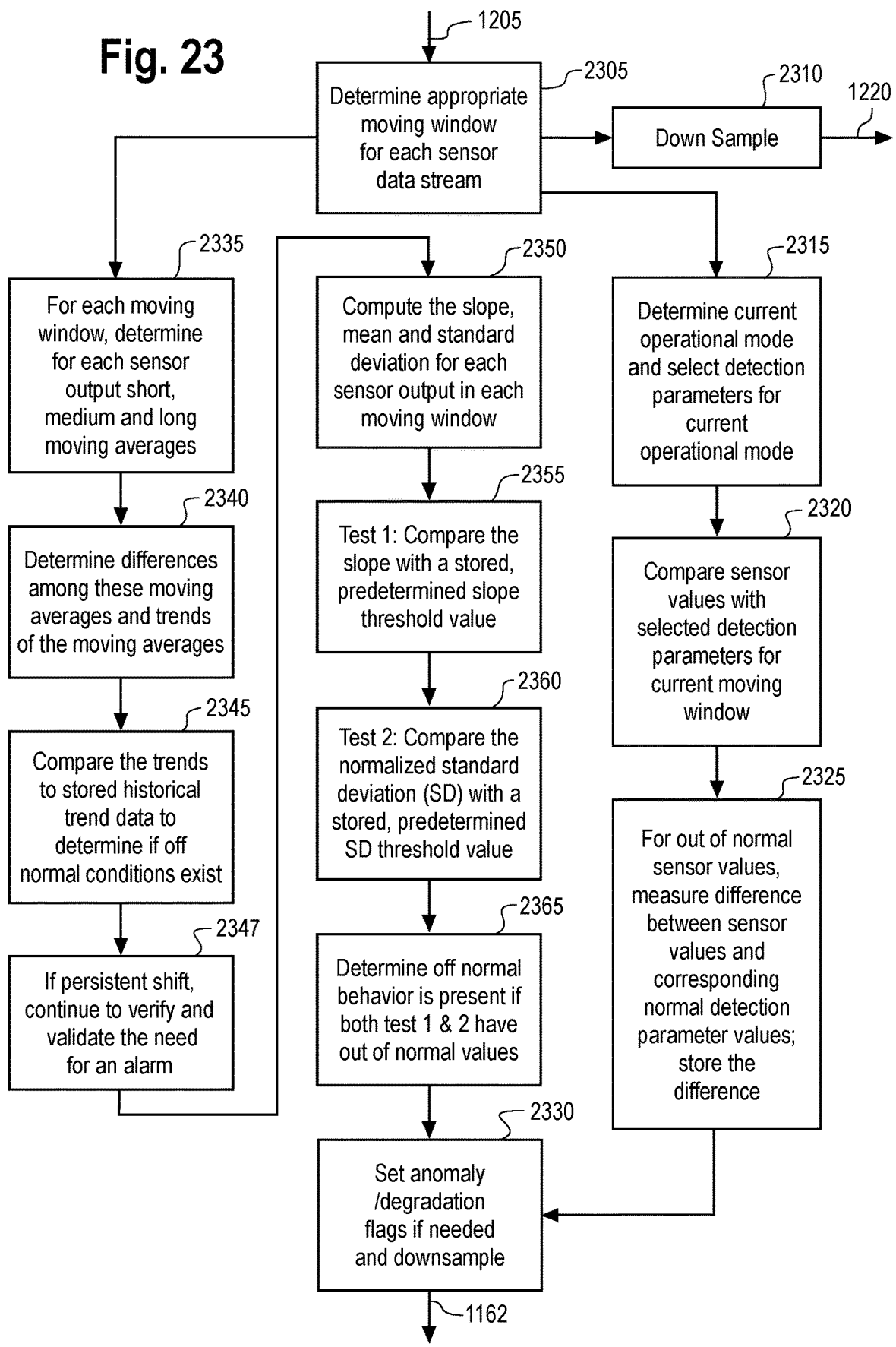
FIG. 23 is a flow diagram of exemplary steps that can be utilized to implement the anomaly/degradation detector of FIG. 12.

FIG. 23 shows a flow diagram of exemplary independent and parallel steps that can be utilized to implement the anomaly/degradation detection of FIG. 11. The stream 1205 of digital outputs from the sensors is received as an input to step 2305 which determines an appropriate moving window for the data associated with each sensor. Each of the sensors will be outputting data at a fixed data rate although the output data rates for the various sensors may be different. Since the output data for each sensor is uniquely identified for that sensor, a known data rate for each sensor can be stored in memory and then retrieved to assist in determining an appropriate moving data window, i.e. the number of sensor output values to be grouped together to form a series for analysis. Following step 2305, the digital sensor data stream is down sampled at step 2310 to minimize the quantity of data transmitted on output 1220. Often, when an anomaly is flagged, the same anomaly will be present over a series of moving data windows. The down sampling can consist of counting the number of consecutive moving data windows that each have the same anomaly for a given sensor output and then encoding the counted number of data frames/windows with the data associated with the last of the consecutive moving data windows with the same anomaly so that the original data can be reconstituted if desired by merely replicating the associated data of the counted number of times. This procedure is also utilized for nominal data to reduce its output size. It is anticipated that this information will be used in both real time for prediction of a future state/value of the component and in a non-real time environment such as for maintenance analysis performed at a maintenance location. The output 1220 may be transmitted such as wirelessly to the ground control station and/or maintenance location or may be stored locally in non-volatile storage and later transferred from storage to the maintenance location or retrieved from vehicle by a connected hand held device running the PMD Viewer.

In step 2315 a determination is made of the current operational mode and corresponding stored parameters for the operation mode are selected. For an aircraft, the current operational mode could be takeoff, normal acceleration, combat acceleration, cruising in the steady-state speed, landing, etc. this information can be determined such as from a flight plan stored in memory or from analysis of the sensor data that reflect the mode of operation, e.g. weight on wheels, accelerometers, speed, rate of change of altitude, etc. Stored predetermined criteria/thresholds for such sensor data can be utilized to determine the mode of operation when compared with the current sensor tags. Detection parameters, e.g. upper and lower threshold values, or stored normal values for the determined mode of operation, associated with particular modes of operation are selected. Each of multiple anomaly detectors 1160 is connected to a set of identical existing high frequency sensors (from 1 to n sensors) in the component and implemented in one core of the GPU. Alternatively, multiple anomaly detectors 1160 can be executed in the same GPU core for different sensors from similar or differing components. The sensor thresholds and calibration information are available from supplier data and stored on the vehicle for processing against real time input vehicle data. There are sufficient GPU cores that can be used for each high frequency sensor in the vehicle.

In step 2320 the current sensor values are compared with the selected detection parameters for a current moving window. With actual measurements (real time input signal), these selected detection parameters conform to nominal operation of the component to which the sensor is attached. An artificial neural network (ANN) with input, hidden, and output layers with backward propagation may be utilized as the anomaly detection mechanism. Stored training data is organized into groups of classes and is utilized in supervisory capacity (off-line supervised learning). An n-dimension Gaussian function can be utilized for modeling each class. These are also referred to as radial basis functions (RBF). They capture the statistical properties and dimensional inter-relationships between the input and the output layers. The algorithmic goal of the RBF ANNs is the output parameter "0" for nominal component behavior and "1" for an off-nominal component behavior.

In step 2325, for an output of normal sensor value, e.g. an anomaly, the difference between the sensor values and the corresponding normal detection parameters is calculated and stored. This information is useful in off-line training of sensor data and RBF function model refinement. In step 2330, data flags/tags are set, if needed, for corresponding sensor data.

In step 2335 determination is made of a short, medium and long moving averages for the output of each sensor for each moving window. The computation of moving averages is well understood by those skilled in the art will have no trouble implementing such calculations and software. In step 2340 a determination of the differences among these moving averages is made as well as the trends of the moving averages. In step 2345 the determined trends are compared to stored historical trend data to determine if off normal conditions exist. If a persistent shift (determined by discussion above) exists per step 2347, the process continues with verification and validating of the need for an alarm flag and sends corresponding sensor data to 2350.

In step 2350 the slope, mean and standard deviation for each sensor output in each moving window is computed. One of ordinary skill in the art will know how to implement such calculations in software either using a standard microprocessing unit or using an arithmetic processing unit. These calculations can also be implemented on a graphical processing unit. In step 2355 a 'test 1' is made where the slope is compared with a stored predetermined slope threshold value to determine if an off normal condition exists. In step 2360 a 'test 2' is made where the normalized standard deviation is compared with a stored predetermined standard deviation threshold value to determine if an off normal condition exists. In step 2365 off normal behavior is determined to be present if both 'test 1 and 2' have out of normal values. If needed, anomaly/degradation flags are set in step 2330 following step 2365. Also, in step 2330, the high-frequency sensor data is down sampled in order to have substantially the same data rate as the data rate received from the low-frequency sensors and the other data sensors. This facilitates easier processing and integration of the sensor data from all the sources by the data fusion block 1170.

Figure 24:
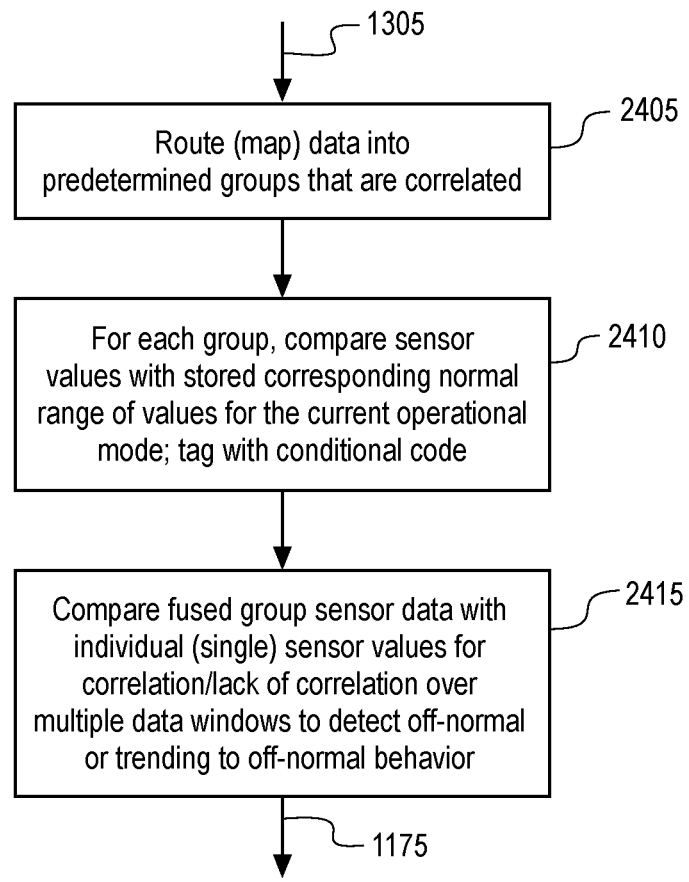
FIG. 24 is a flow diagram of exemplary steps that can be utilized to implement the data fusion of FIG. 13.

FIG. 24 shows a flow diagram of exemplary steps that can be utilized to implement the data fusion of FIG. 13. In step 2405 the incoming sensor data streams 1305 are routed (mapped) into predetermined groups in which each of the data streams within a group are correlated. The correlation of sensor data is explained above. Since each of the sensor data streams are uniquely identified and the sensors within a group that are correlated are predetermined and stored in memory, such as by manual input by a modeling engineer (FIG. 2) that identifies the sensors in each correlated group. This information is stored in memory and then retrieved to segregate the incoming data streams into correlated groups. These correlated groups may be temporarily stored in memory for individual analysis as well as correlation analysis for any faults indicated by individual sensor outputs.

In step 2410, for each of the correlated groups, the sensor values are compared with corresponding normal range of values associated with the current operational mode. Based on this analysis, the sensor data associated with a group identified to be off normal is tagged with a conditional code. In step 2415, the fused group sensor data is compared with individual (single) sensor values for correlation or lack of correlation over multiple data windows to detect off-normal or trending to off-normal behavior. For example, individual sensor data coming from one of sensors 1110 or 1130 that is correlated with a group of correlated high-frequency sensors 1150 can be useful in either confirming an anomaly or preventing a potential false alarm where the individual sensor data is not validated by other off normal sensor outputs by others in the group. Alternatively, such an individual sensor data may reflect normal operation while the corresponding group of correlated sensors from high-frequency sensors may show a trend towards an off-normal behavior. This represents a "false negative" for the individual sensor in which the single sensor data is not responsive enough to provide a warning that the subject component may require some form of maintenance.

Figure 25:
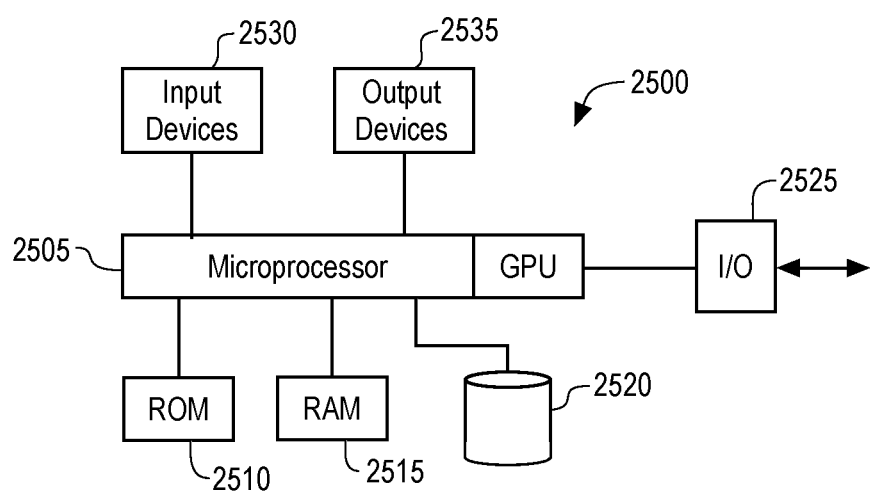
FIG. 25 is a block diagram of an exemplary computing system for implementing the high frequency sensor analysis and integration with low frequency sensor data.

FIG. 25 is a block diagram of an exemplary computing system 2500 for implementing the high frequency sensor analysis and integration with low frequency sensor data. Central to the computing system on system on chip (SOC) is microprocessor 2505 which may also include an arithmetic processing unit and/or a graphical processing unit (GPU). Alternatively, a GPU may be used by itself to process some of the computations/decisions of FIGS. 23 and 24, i.e. other than "graphical" information. A read-only memory (ROM) 2510 contains stored program instructions and data for use by the microprocessor 2505. A random-access memory (RAM) 2515 is also used by the microprocessor 2505 as a location where data may be stored and later read (the GPU also has its own RAM). A nonvolatile memory device 2520 is utilized to store instructions and/or data that will not be lost upon a loss of power to the computing system. An input/output (I/O) buffer 2525 is coupled to the microprocessor 2505 and facilitates the receipt of external data and the transmission of data from the microprocessor to external devices. Input devices 2530 represent conventional ways for a user to input information to the computing system, e.g. keyboard, mouse, etc. Output devices 2535 are conventional ways for information to be conveyed from the computer system to a user, e.g. video monitor, printer, etc. Depending on the number of parallel cores of the microprocessor 2505 (or the GPU), all cores provide sufficient computational power needed to process the data from all of the sensors in accordance with the steps explained above. For example, one core may be used to process all the data for one correlation group of sensors since all sensors in that group will have outputs that need to be stored and compared against the outputs of the other sensors in that group.

As will be understood by those skilled in the art, the ROM 2510 and/or nonvolatile storage device 2520 will store an operating system by which the microprocessor 2505 is enabled to communicate information to and from the peripherals as shown. More specifically, sensor data is received through the I/O 2525, stored in memory, and then processed in accordance with stored program instructions to achieve the detection of anomalies and degradation of components associated with the respective sensors. Based on the analysis of the sensor data as explained above, those skilled in the art will know how to implement in the computer system software to determine different length moving averages such as discussed with regard to FIGS. 18-21 over consecutive moving data windows and compare the respective values of the different length moving averages with stored threshold values for a particular mode of operation. Similarly, with respect to FIG. 22, those skilled in the art will know how to calculate in software the slope, mean, and standard deviation for sensor data in consecutive moving data windows and compare the results with stored criteria. Different thresholds and values are stored in memory corresponding to the different modes of operation of the respective vehicle. Upon determining the mode of operation, the corresponding stored thresholds and values will be utilized for comparison with the information derived from the sensors during the respective mode of operation. In contrast to utilizing just a fixed upper and lower threshold value for determining a normal range of operation for a given sensor for all types of operational conditions, the techniques described herein provide for a dynamic, i.e. changing, criteria for a given sensor to determine anomalies/degradation dependent upon changes in the sensor data and/or the mode of operation of the vehicle.

If used and unless otherwise stated, the terms "upper," "lower," "front," "back," "over," "under," and similar such terms are not to be construed as limiting embodiments to a particular orientation. Instead, these terms are used only on a relative basis.

Figure 26:
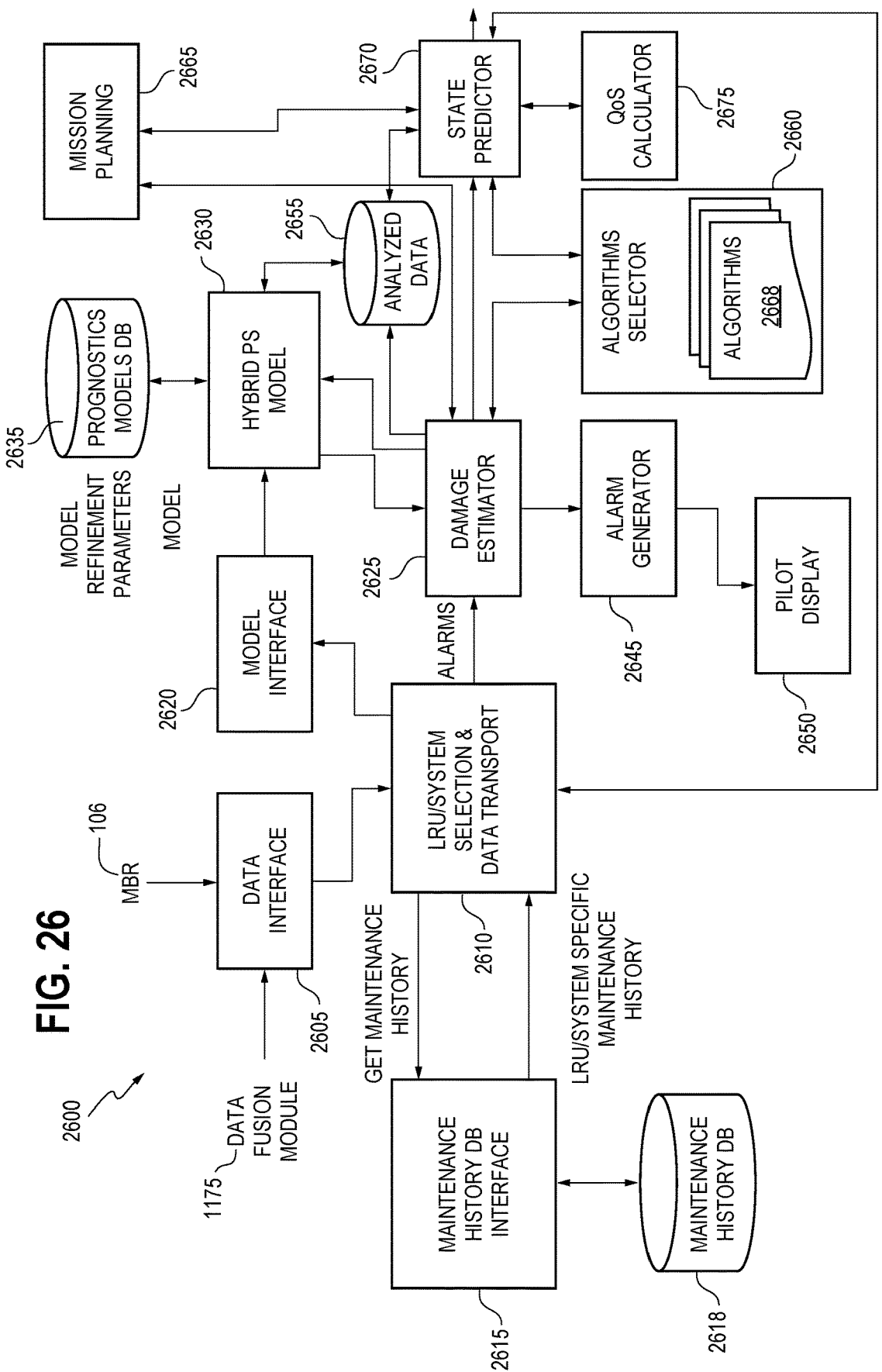
FIG. 26 is a block diagram of an exemplary prognostics system for determining the need for maintenance on a component level based on its condition.

FIG. 26 shows a block diagram of an exemplary prognostics system 2600 for determining the past, current, and future states of performance/degradation at the component level, and for determining whether maintenance at the component level is required for the aircraft/system while providing aircraft/system equipment degradation/failure situational awareness. The system 2600 operates on a component level basis, i.e. at any given time the data and information being processed may relate to a single component or multiple components simultaneously depending on detected and tagged anomalous behavior of the component(s) data from the Data Fusion Module 1175 and output from MBR Diagnostics Engine 106, allowing for interconnected degradation/failure modes between multiple interrelated components. To process all of the data and information from the plurality of components in a complex vehicle system, the prognostics system 2600 may consist of a plurality of processing systems each devoted to processing information and data associated with a different single component.

The Data Interface Module 2605 takes input 1175 from the Data Fusion Module, identifies the tagged data and alarms, and passes this separated data to the LRU/System Selection and Data Transport Module 2610. Any alarms are passed immediately by module 2610 to the Damage Estimator Module 2625. The output from 106 (MBR diagnostics engine) consists of multiple component fault codes corresponding to respective components' fault/failure and false alarm isolations as well as nominal data and functional analysis for the cause of fault/failure (e.g., leaking pipe, worn bearing, motor shaft misalignment, etc.). Both faulty and nominal data corresponds to BIT and parametric data that is passed to the Damage Estimator Module 2625. Alarms and corresponding decomposed fused data (i.e., data that is separated for degraded components in LRU/System Selection & Data Transport Module 2610 for each component and built into multiple streams that are simultaneously transferred into various modules with highest priority given to component data with alarms) from multiple sources are also passed to the Damage Estimator Module 2625 from the Data Fusion Module 1175 via the Data Interface 2605 and the LRU/System Selection & Data Transport Module 2610.

The LRU/System Selection & Data Transport Module 2610 identifies and separates the pertinent tagged data (tagged data with alarms getting the highest priority) associated with the component to be analyzed and the corresponding BIT, parametric, analogs (direct sensor signals without analog-to-digital (A/D) conversion), discretes (hardware ON/OFF control signals passed via software bits), environmental (internal environmental conditions e.g. humidity, pressure, temperature, dust, others), and external metrological data (e.g., sand, dust, heat, wind, rain, others), etc. air vehicle data. This data is transmitted to the Model Interface Module 2620. Model Interface Module 2620 creates multiple streams of data one for each component. The tagged data is metadata obtained from the Anomaly Detector (high frequency sensors), low frequency sensors, and other data streams with tagged alarms and data fused with corroborated evidence data. Corroborated evidence data consists of data representing 1) no fault, 2) fault, 3) a false alarm either false negative or false positive, and 4) functional analysis for cause of 2) and 3). Corroborated evidence data from various interacting/interconnected component sensors for the current component fault/failure mode is received from the Anomaly/Degradation Detector Module 1160, fused in the Data Fusion Module 1175, and provided to the Data Interface Module 2605. This data is decomposed in the LRU/System Selection & Data Transport Module 2610 for the current component fault/failure mode. Independently corroborated evidence data is received from the MBR Diagnostics Engine 106 that performs fault/failure/false alarms isolations from various interacting/interconnected components sensors parametric and BIT data for the current component fault/failure mode. LRU/System Selection & Data Transport Module 2610 also requests via the Maintenance History Database Interface 2615 case-based histories from the Maintenance History Database 2618 associated with the pertinent component maintenance data (including pilot squeaks and maintainer notes post flights), which is then compared in real time against current anomalous component behavior and alarm data. These histories are case-based records and stored parameter values for the pertinent component. Maintenance History DB Interface Module 2615 may, for example, utilize ANSI SQL statements to extract previously stored repair and replacement information and tests conducted, contained in these maintenance records written by the maintainer. The maintainer is the technician assigned to perform the maintenance on the aircraft/system components for which he/she has attained maintenance certification. These maintenance records also contain previously stored inflight real time assessments by the prognostics engine and stored in the Maintenance History Database 2618, which is preferably a relational database. The maintainer enters maintenance notes via a graphical user interface (GUI) when fixing or repairing or replacing a component and additional visual observation on the status of a component's degradation. The pertinent records also contain the original BIT and sensor parametric recorded data from which degradation is determined. Recorded notes may also contain manually input explanations on the nature of an alarm and functional analysis of why the component alarm was issued and what remediation steps were taken to fix the alarm/problem.

The Model Interface Module 2620, based on the decomposed tagged data received from LRU/System Selection & Data Transport Module 2610 for a particular component, transmits a request to the Prognostics Model Database 2635 identifying the associated component and requesting that the Prognostics Model Database 2635 transmit the relevant physics-based model, e.g. an XML file, empirical model, e.g. an XML file, and physical system logical/functional model, e.g. an XML file to the Hybrid PS Model Module 2630. These models/files are the "blue prints" that contain the diagnostics and prognostics definition of and knowledge of the component in terms of the respective component attributes, functions, behaviors, and semantics. As will be explained in more detail with regard to FIG. 27, a physics-based model of the relevant component utilizes values associated with component compared to the current corresponding data values to generate a residue along with an empirical model of the relevant component which also generates a resulting residue. These residues are combined to form the complete observation of current data as compared to the combined models. Near zero residues imply no anomalous component behavior (small residues may be caused by noise in the component which may be later eliminated by training the system off-line from collected data).

The Damage Estimator Module 2625 utilizes the residues from the physics-based model (i.e., physical system damage equations) and empirical model along with physical system logical/functional model to generate a representation of the degradation behavior of each component. The residues are the differences between the expected component attributes, functions, behaviors, and semantics and the corresponding attributes generated by the current data streams for the component being evaluated. Residues are generated for each of the three models during the evaluation of a component and are typically near zero for aircraft components with good performance. The level of degradation represents the severity level of the alarm displayed to the pilot/mission operator. The alarm levels may, for example, be correlated to the remaining useful life (RUL) of the component which is determined by the Damage Estimator Module 2625. An RUL between 70% and 51% may indicate a mild degradation behavior (assuming a gradual decline and not a sharp drop from recent RUL values), between 50% and 11% representing a medium degradation behavior, and below 11% requiring repair or replacement of the component. Of course, various percentages may result depending on the anticipated future wear/degradation and severity of future environments. The Damage Estimator Module 2625, RUL and EOL (end of life) determination are explained in more detail below.

The Alarm Generator Module 2645 generates alarms based on the level of the RUL determined by the Damage Estimator Module 2625. It calculates the slope of the RUL from current and previous stored RUL data and generates the level of the alarm based on this slope and the current value of the RUL. For example, a change of slope greater than a predetermined amount would likely signal too rapid a degradation and cause an alarm even if the value of the RUL alone would not warrant generating an alarm. This is further described for FIG. 30. The calculated RUL curve 3005 is determined from history and current data. For the degraded component, the slope 3010 is calculated dynamically over a sliding window of RUL calculations. The final RUL curve slope is calculated over a few consecutive sliding windows, e.g. 3 windows. This is the mean of the RUL curve slope that is calculated, weighted and normalized to the same units as the y-axis (RUL axis) to produce one-to-one unit of measure relationship between the y-axis and x-axis (i.e., the time axis to produce a unit-less slope). This unit-less slope is compared against a predefined threshold e.g. 0.5. If this slope is greater than the predefined threshold, an alarm is issued. The time unit (x-axis value) is the difference in start of operations and the current time (within each sliding window) and the starting RUL is the historic RUL at the start of operations (i.e., used in the first sliding window; subsequent sliding windows use the last RUL calculation in the previous sliding window, and so on). The alarms are passed to the Pilot Display 2650 that presents visual indicia indicating the level of an alarm with associated LRU/component for pilot actions. Depending on the amount of degradation, the specific component and the flight and mission criticality of the component, a decision could be to continue with a flight mission even with a known degraded component.

The Algorithm Selector Module 2660 determines the algorithms utilized by the Damage Estimator Module 2625 and the State Predictor Module 2670. Algorithms 2668 associated with the component currently being analyzed are identified and loaded from the Algorithms Selector Module 2660 into memory for Damage Estimator Module 2625 and State Predictor Module 2670 for processing. The State Predictor Module 2670 uses historic past state and calculates the current and predicted future states for the component being analyzed (using the particle filter algorithm). These states are updated as new BIT, parametric sensor, analog, discretes, environment, etc. data relevant to the subject component are received. The Analyzed Data Database 2655 receives and stores all the analyzed data by the Damage Estimator Module 2625 along with hybrid model parameters from the Hybrid Model Module 2630 and the State Predictor Module 2670.

The Quality of Service (QoS) Calculator 2675 calculates an IVHM diagnostics and prognostics system level quality of service metric as well as component level quality of service metric. Some of these metrics are depicted in FIG. 28. Note, in FIG. 28, all metrics are pertinent to current aircraft/system and its components. RUL is calculated in the Damage Estimator Module 2625, while end-of-life (EOL) which is a future prediction, is calculated in the State Predictor Module 2670. Component QoS metrics are calculated in the QoS Calculator Module 2675 for the subject vehicle/aircraft and are stored for all current aircraft in the Analyzed Data DB 2655. An off-line ground-based fleet level prognostics system accumulates data (mines data) from all aircrafts/systems and produces reports for single, multiple, or the entire fleet from these stored metrics. These QoS metrics are passed to the State Predictor Module 2670 which then stores this information in the Analyzed Data DB 2655; to be retrieved later off-line on ground for various report generation and data replay. The Mission Planning 2665 provides the mission profile to the Damage Estimator Module 2625 and mission planning information to the State Predictor Module 2670. The Mission Planning Module 2665 receives equipment damage information from the Damage Estimator Module 2625 for building a degraded mission plan, i.e. an alternate modified mission plan (if possible) dependent on the degree of component degradation. The State Predictor Module 2670 periodically receives updated mission plans from the Mission Planning Module 2665 and in return provides current equipment and future equipment degradation states to Mission Planning Module 2665 that builds reactive and proactive mission plans based on the condition of the equipment. All analyzed data by the Damage Estimator Module 2625 and the State Predictor Module 2670 results are stored in the Analyzed Data 2655.

Figure 27:
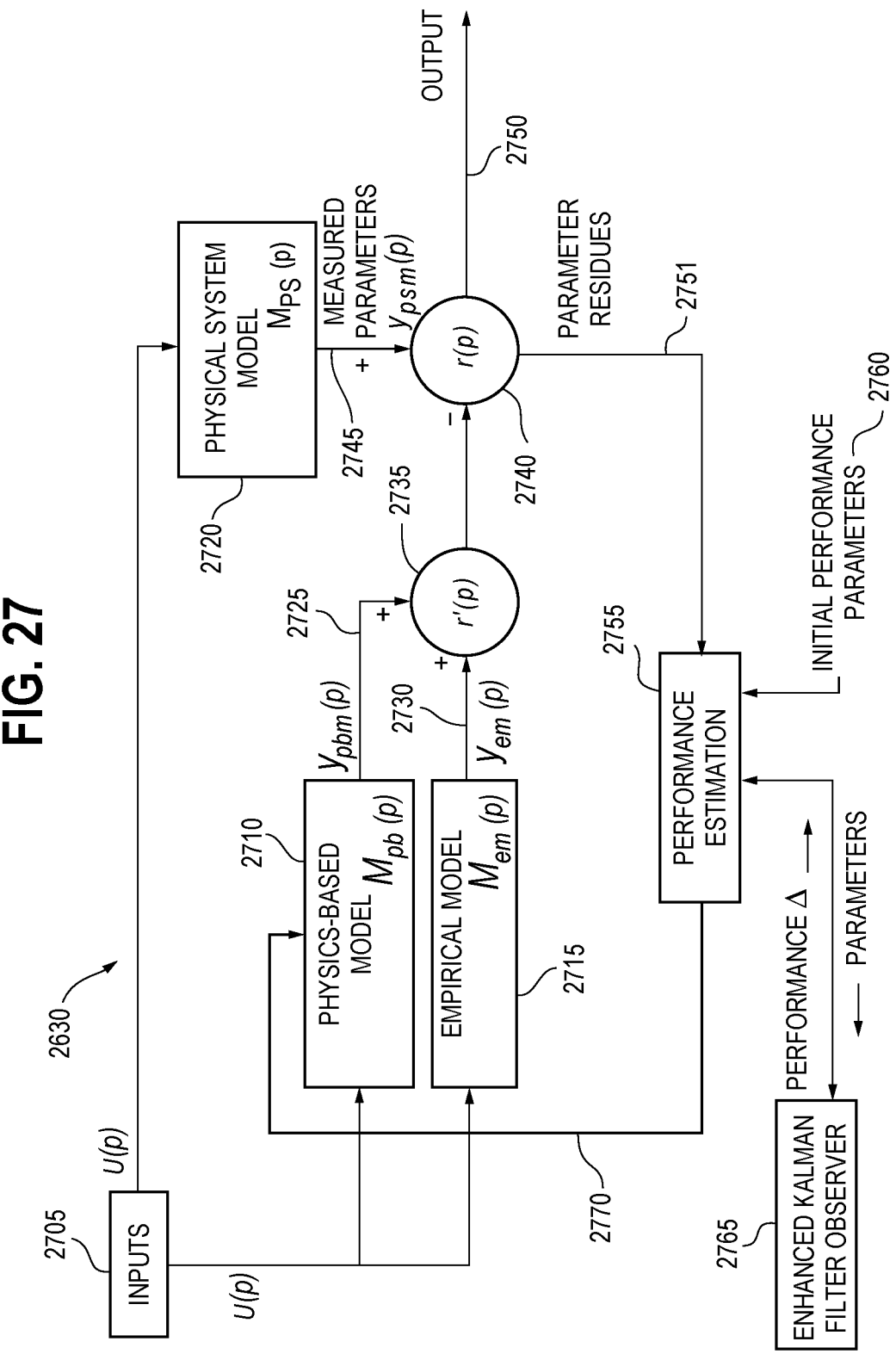
FIG. 27 is a block diagram of an exemplary hybrid system of different models characterizing the behavior and parameters of each component.

FIG. 27 shows a block diagram of an exemplary Hybrid Model System 2630 that consists of: 1) Physics-Based Model Module 2710, 2) Empirical Model Module 2715, and 3) Data-Driven Functional Physical System Model Module 2720, of each component where the respective component's behavior and the trend towards degradation are reliably characterized. Any potential inaccuracies and deficiencies (due to imperfections in manufacturing of components, structures, etc. and/or other causes such as micro-structural tears in wing structures, bad circuits in transistors, substandard quality materials in resistors, capacitors, etc.) in the physics-based model are effectively overcome with use of the empirical model. The empirical model residues are in general additive resolving the imperfections due various causes that have not been accounted for in the physics-based models. These residues can also be subtractive in which case the physics-based model is over specified (it is modeled with more detail than available component data on the aircraft/system). In such an event, the supplier of the component is asked to provide the additional required data at the component output. An empirical model residue of zero implies that the component conditions and states are functioning normally or that discrepancies seen previously in history have been refined sufficiently from the empirical model to produce a zero residue for the current mode of operation, usage, mission, and environment. From FIG. 27, the residue $r'(p)$ and $r(p)$ can be represented mathematically:

$$M_{pb}(p) = \frac{y_{pbm}(p)}{u(p)}$$

where:
 $p$=parametric sensor data
 $M_{pb}$=physics-based model
 $y_{pharm}$=parametric output of model
 $u$=input stream of parametric data $$M_{em}(p) = \frac{y_{em}(p)}{u(p)};$$

similar definitions $$M_{ps}(p) = \frac{y_{ps}(p)}{u(p)};$$

similar definitions

The residues $r'(p)$ and $r(p)$ are defined as:

$r'(p)=y_{pharm}(p)+y_{em}(p)=y_{pbm}(p)+M_{em}(p)u(p)=\{M_{pbm}(p)M_{em}(p)\}u(P)$ $r(p)=y_{ps}(p)-r'(p)$ The residual zero or near zero is ideal for matching the component process and model. Of course, additive noise will change the residual and must be accounted for in the model if not eliminated from the system.

The three-tier models contain the entire prognostics models of the component and are preferably stored as XML files. The Inputs 2705 for each of the models is the parametric data sensed for each respective component, i.e. the output of the Data Fusion Module 1175 and MBR Diagnostics Engine 106. The residue outputs 2725 and 2730 from the Physics-based Model Module 2710 and Empirical Model Module 2715, respectively, are summed by summation node 2735 with its output forming an input to summation node 2740. The residue output 2745 from the Physical System Model Module 2720 forms the other input to summation node 2740 which is subtracted from the other input, i.e. the combination of the addition of the residues from the Physics-based Model Module 2710 and Empirical Model Module 2715 (i.e., this combination of residues representing the difference between anticipated behavior vs observed behavior as shown in FIG. 1).

The output 2751 of the summation node 2740 is an input to the Performance Estimation Module 2755 and the output 2750 is forwarded to Damage Estimator Module 2625, stored in Analyzed Data 2655, and model parameter refinements into the Prognostics Models DB 2635. State Predictor Module 2670 receives the updated analyses (consisting of model parameters and residues) from the Analyzed Data 2655. In Performance Estimation Module 2755 the initial input is received from the Initial Performance Parameter Database 2760 which stores historical performance data on every aircraft/system component. A comparison of the parameter residues 2751 and the corresponding parameters obtained from database 2760 provides an input to the Enhanced Kalman Filter Observer Module 2765 which filters the input and provides an output to Performance Estimation Module 2755 containing a delta differential of performance. The output of Performance Estimation Module 2755 is a feedback loop routed to Physics-based Model 2710 where a predetermined performance difference from the expected and historical performance measures triggers a root cause analysis. Continuous decreasing performance is caused by a corresponding increasing degradation of the component.

Figure 29:
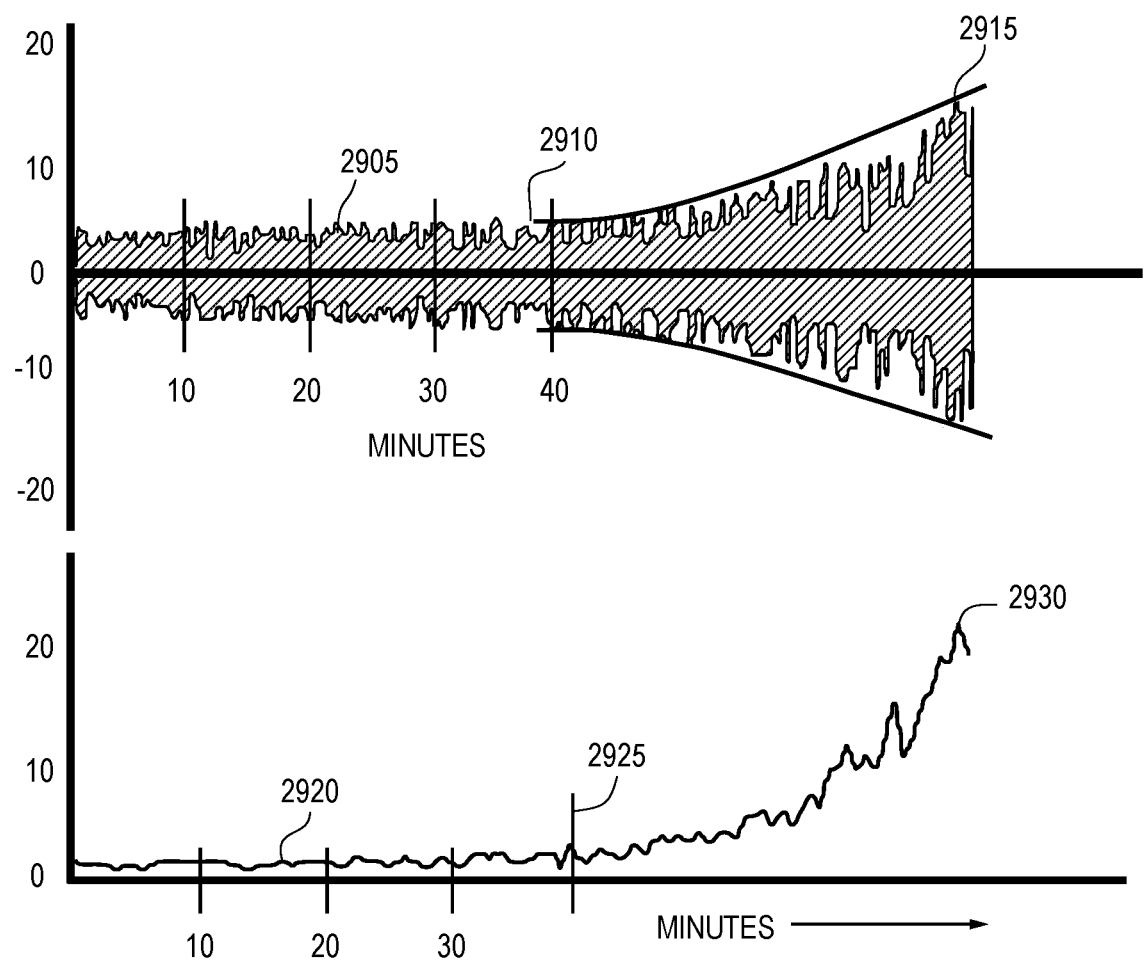
FIG. 29 shows exemplary degradation for a brine pump's bearing performance and power distribution performance.

As an example, a degraded brine pump was selected and monitored for its various component signals over tens of minutes of operation. The degradation for this pump's bearing performance and pump's power distribution performance is shown in FIG. 29. Over minutes of operation, the bearing vibrational amplitude 2905 quickly rises from normal operation to an onset 2910 of degradation, to the point 2915 of possible eminent failure. Similarly, in FIG. 29 the pump's power distribution 2920 rises sharply starting at the onset 2925 of bearings degradation. The large power 2930 required may cause additional pump component degradations if allowed to continue at this level of operation. Over many flights more accurate initial performance parameters are obtained from off-line on ground training on models and algorithms performed via collected data and improvements/refinements of the models and algorithms as a continuous process.

The Physics-based Model 2710 will contain a plurality of equations that characterizes the operation of the subject component based on physics of the component, e.g. electrical, mechanical, fluid dynamics, etc. It describes the nominal behavior and when component damage indication exists (from input parametric and BIT data streams), how this damage is expected to grow, both in quality and quantity. Damage indications may not be monotonic in nature. Damage could be caused by the intrinsic properties of the component (e.g., effects due to recovery in batteries, or semiconductors in power systems) or extrinsic effects such as incomplete/partial maintenance actions. Each fault mode may in general have a different damage propagation model. The Empirical Model 2715 is very helpful in capturing these differences in different component fault mode damage variations and possibly component healing (if hardware has this capability) of the component Physics-Based Model 2710. These equations will, of course, vary depending upon the particular component that is to be characterized. For example, the exemplary brine pump could be characterized with individual component operations as shown in Table 1 below.

TABLE 1

| Brine Pump Component | Equation | Physics |
|---|---|---|
| Bearings | $\dot{T}_t = \frac{1}{J_t}\left(r_t\omega^2 - H_{t,1}(T_t - T_o) - H_{t,2}(T_t - T_a)\right)$ | Thrust Bearing Temperature Radial Bearing Temperature Bearing Oil Temperature |
| | $\dot{T}_r = \frac{1}{J_r}\left(r_r\omega^2 - H_{r,1}(T_r - T_o) - H_{r,2}(T_r - T_a)\right)\dot{T}_o =$ $\frac{1}{J_0}(H_{o,1}(T_t - T_o) + H_{o,2}(T_r - T_o) + H_{o,3}(T_o - T_a))$ | |
| Load Torque | $\tau_L = a_0\omega^2 + a_1\omega Q - a_2\omega Q^2$ | Torque Load on Brine Pump Shaft |
| Pump Shaft | $\dot{\omega} = \frac{1}{J}(\tau_e - r\omega - \tau_L)$ | Shaft Rotational Velocity |
| Angular Velocity Pump Pressure | $p_p = b_0\omega^2 + b_1\omega Q - b_2 Q^2$ | Pressure |
| Discharge Flow | $\dot{Q} = \frac{1}{J_Q}(Q_0 - Q_i)$ | Brine Flow |

TABLE 1-continued

| Brine Pump Component | Equation | Physics |
|---|---|---|
| Impeller Wear | $\dot{A} = -\omega_A Q_i^2$ | Rate of Change of Impeller Area |
| | $\dot{r}_t = \omega_t r_t \omega^2$ | Rotational Thrust |
| | $\dot{r}_r = \omega_r r_r \omega^2$ | Radial Thrust |

The definitions of the above parameters are given in Table 2.

TABLE 2

| Parameter | Description | Units |
|---|---|---|
| $p_s(t)$ | Suction Pressure | Pascal (Pa) |
| $p_d(t)$ | Discharge Pressure | Pascal (Pa) |
| $T_a(t)$ | Ambient Temperature | Kelvin (K) |
| $V(t)$ | Motor Generator Voltage | Volts (V) |
| $\omega_s(t)$ | Synchronous Speed of Motor Voltage | rad/sec |
| $\omega(t)$ | Mechanical Rotation | rad/sec |
| $Q(t), Q_i(t), Q_0$ | Pump Flow, Flow through Impeller, Initial Flow | meter$^3$/sec |
| $J_o, J_Q$ | Thermal Inertia of Oil, Flow Inertia | K/(J * s), 1/sec |
| $\tau_L, \tau_e$ | Load Torque, Motor Torque | Newton meter |
| A | Impeller Area | meter$^2$ |
| $T_o(t), T_t(t), T_r(t)$ | Oil Temperature, Thrust Bearings Temperature, Radial Bearings Temperature | K |
| $v_{rms}$ | Root-mean-square voltage (in volts) applied to pump motor | Volts |
| $\omega_s$, s | Synchronous speed due to supply voltage of motor, 's' is the slip due asynchronous behavior between $\omega_s$ and $\omega$ (motor mechanical rotation) | rad/sec, no units |
| $r_t(t)$ | Thrust Coefficient of Friction | Newton meter sec |
| $r_r(t)$ | Radial Coefficient of Friction | Newton meter sec |
| $b_0(t)$ | Coefficient Proportional to Impeller Area | kg/m |
| $H_{o,i}, H_{t,i}, H_{r,i}$ | Oil, Thrust, Radial Heat Transfer Coefficients | Watts/K |
| $a_n, b_n$ | Pump Geometry Coefficients | kg/m, kg/m$^2$, kg/m$^4$, kg/m$^7$ |
| $\omega_A, \omega_t, \omega_r$ | Wear Coefficients | No Units |

Typical brine pump nominal parameter values are given in Table 3.

TABLE 3

| PARAMETER | NOMINAL VALUE |
|---|---|
| $\omega(0)$ | 376 rad/s |
| J | 50 kg m$^2$ |
| r | $8.0 \times 10^{-3}$ N m s |
| n | 3 phases |
| p | 1 pole pair |
| $R_1, R_2$ | $3.6 \times 10^{-1}$ Ω, $7.6 \times 10^{-2}$ Ω |
| $L_1 + L_2$ | $6.3 \times 10^{-4}$ H (Henries) |
| Q(0) | 0 m$^3$/s |
| $a_0$ | $1.5 \times 10^{-3}$ kg m$^2$ |
| $a_1$ | 5.8 kg m |
| $a_2$ | $9.2 \times 10^{-3}$ kg/m$^4$ |
| $b_0(0)$ | 12.7 kg/m |
| $b_1$ | $1.8 \times 10^4$ kg/m$^4$ |
| $b_2$ | 0 kg/m$^7$ |
| $J_Q$ | 376 rad/s |
| $T_o(0), T_r(0), T_t(0)$ | 290 K |
| $J_o, J_t$ | $8.0 \times 10^3$ K/(J * s), 7.3 K/(J * s) |
| $H_{o,1}, H_{o,2}, H_{o,3}$ | 1.0 W/K, 3.0 W/K, 1.5 W/K |
| $H_{r,1}, H_{r,2}$ | $1.8 \times 10^{-3}$ W/K, $2.0 \times 10^{-2}$ W/K |
| $H_{t,1}, H_{t,2}$ | $3.4 \times 10^{-3}$ W/K, $2.6 \times 10^{-2}$ W/K |
| $r_t(0), r_r(0)$ | $1.8 \times 10^{-6}$ N m s, $1.4 \times 10^{-6}$ N m s |

The Empirical Model 2715 provides a model of the subject component data values that models normal system operation based on a statistically significant sample of operational data of the component. Such an empirical model based on historical performance data of the component allows for a wider variation of performance expectations than the physics-based model since the same component may have been operated under different stress levels and/or in different environments. As an example, monitoring time dependent (at different times of the day over days, weeks, months, etc.) fluid flow through the brine pump impeller housing and pipes characterizes local brine pump operations and usage. The corresponding data values provide a statistically significant empirical model that empirically defines the brine pump as utilized in local aircraft/system operations and usage. By utilizing the empirical model, differing RUL and EOL predictions for identical brine pumps at different locations on the same aircraft/system or identical brine pumps in other aircrafts/systems provides for real world variations by which the RUL and EOL of monitored brine pumps can be judged. Such results provide increased accuracy for predictions of RUL and EOL.

The Physical System Model 2720 is a data-driven functional model. The prognostics nodes in the Physical System Model 2720 contain the expected usage parameters of the component pertinent to the mission profile of the aircraft/system and its operating modes (i.e., preflight, taxi, takeoff, loiter, etc.). The observed/measured behaviors, i.e. data values, are compared against the corresponding functional model, i.e. acceptable ranges (thresholds) of values for the corresponding measured data values, which are a "blue print" of acceptable behaviors with the residue 2745 of this comparison being the output.

Figure 31:
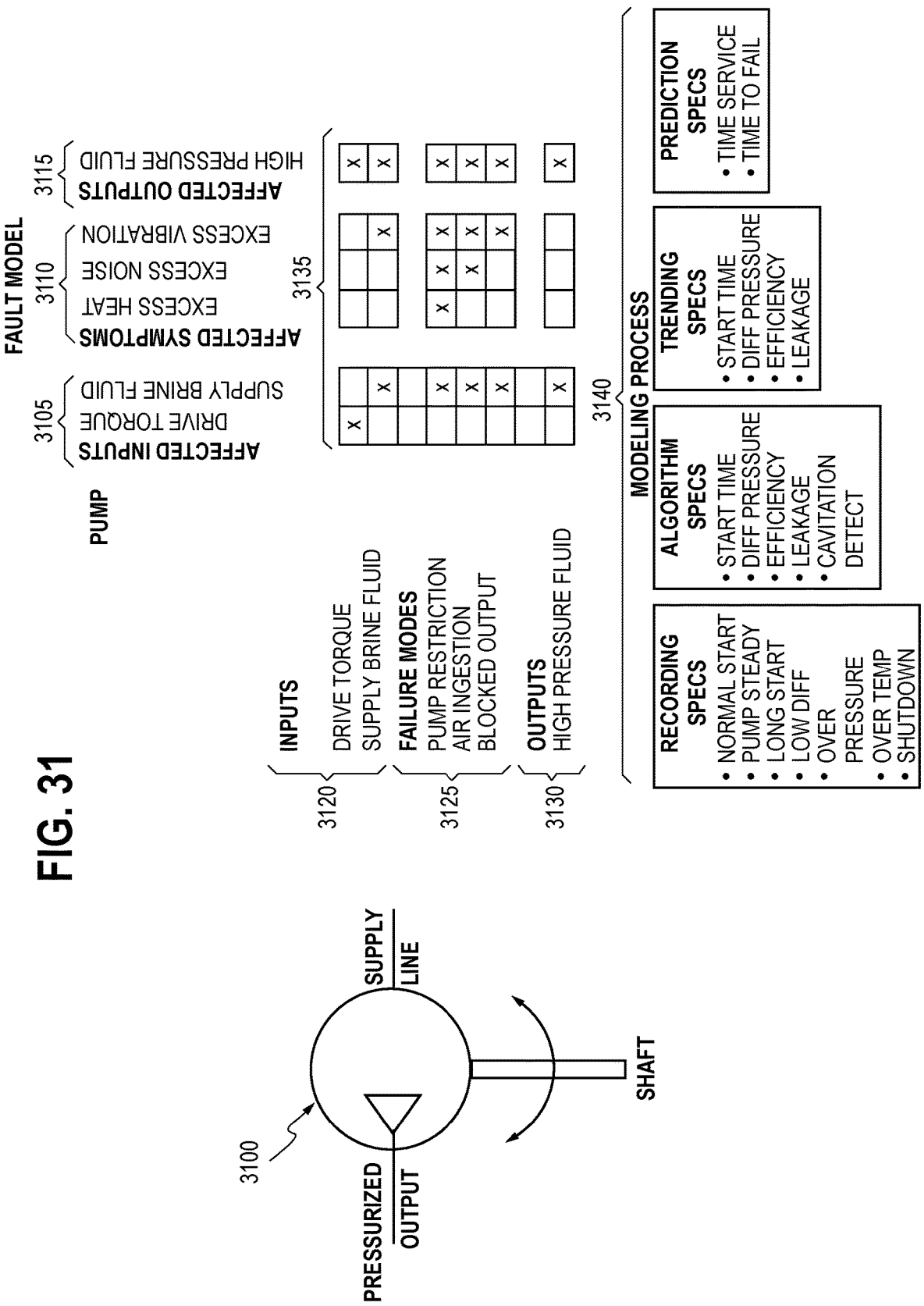
FIG. 31 illustrates brine pump components as monitored in an exemplary physical system model of the brine pump.

For example, a subset of brine pump components of an exemplary Physical System Model 2720 is shown in FIG. 31. It consists of a "fault model" and a "modeling process" which uses different parameters/characteristics that models the brine pump, in this example a subset of brine pump components is shown. A partial brine bump representation 3100 shows a brine "Supply Line", brine "Pressurized Output" via the impeller (the black triangle), and the motor rotation shaft that provides torque supplied by the motor to circulate brine in the brine pump cooling system. The "Fault Model" consists of Affected Inputs 3105, Affected Symptoms 3110, Affected Outputs 3115, Inputs 3120, Failure Modes 3125, Outputs 3130, and the check boxes 3135. The check boxes 3135 represent correlations between Affected Inputs 3105 and Inputs 3120, Affected Symptoms 3110 and Failure Modes 3125, and Affected Outputs 3115 and Outputs 3130. As an example, note that the correlation for Pump Restriction in Failure Modes 3125 corresponds to symptoms of Excess Heat, Excess Noise, and Excess Vibration in Affected Symptoms 3110. This follows similarly for the other correlations mentioned above. These correlations provide a significant contribution to producing a high-fidelity model of the brine pump. The model must include the type of data required to understand the degradation of the component under scrutiny. The Modeling Process 3140 describes the typical data specifications that are required. Typical specifications are "Recording Specs", "Algorithm Specs", "Trending Specs" (quality and quantity of degradation), and "Prediction Specs". Other specifications may be required depending on the component being modeled (e.g., wiring diagram specs for electrical components, etc.).

The Performance Estimation Module 2755 and the Enhanced Kalman Filter 2765 together measure component performance differences in time dependent sliding sensor data windows. The Enhanced Kalman Filter 2765 is used as an observer of component sensor parameter(s) over time. That is, it uses sensor parameter(s) history to monitor and calculate the change in the parameter(s) of the component over a variable time dependent sliding sensor parametric data window. The Enhanced Kalman Filter provides for nonlinear dynamics in component performance. It initially calculates the performance of the component from existing stored trained data (which is trained off-line), calculates differences with current data, and compares with historic component performance. Any change in performance is forwarded to the Performance Estimation Module 2755. The Enhanced Kalman Filter Observer 2765 and the Performance Estimation Module 2755 are founded on robust banks of two-stage Kalman Filters (in the first module 2765 used as an "observer") where both simultaneously estimate the performance state and the degradation bias (if one is seen for the component; see FIG. 29 as an example of the sensor signal). Inputs 2705 pass to Performance Estimation 2755 Kalman Filter Stage One along with Parameter Residues 2751 (from Physical System Model 2720) and Initial Performance Parameters 2760. The outputs of this stage as passed that to the Enhanced Kalman Filter Observer 2765 Stage Two are new component parameters, i.e. component parameters that have been adjusted by a mean of residues over small sampling window vs directly from Inputs 2705. In Stage Two 2765, the estimation results from Stage One 2755 are taken as "measurements". The output of Stage Two 2765 provides a dynamic delta difference in performance measurements and improved component parameters for improved performance estimation in the Performance Estimation 2755. This two-stage Kalman Filters approach is designed for fast convergence with a rapid covariance matrix computation providing the abnormally behaving component fast degradation detection and isolation. Two-stage Kalman filters are generally known, e.g., V. R. N. Pauwels, 2013, *Simultaneous Estimation of Model State Variables and Observation and Forecast Biases Using a Two-Stage Hybrid Kalman Filter*, NASA, ASIN: B01DG0AT6A. The two-stage mechanism also decides if sensor parametric data shows degradation, locates the sensor, quantifies the degradation, and outputs the result.

Figure 34:
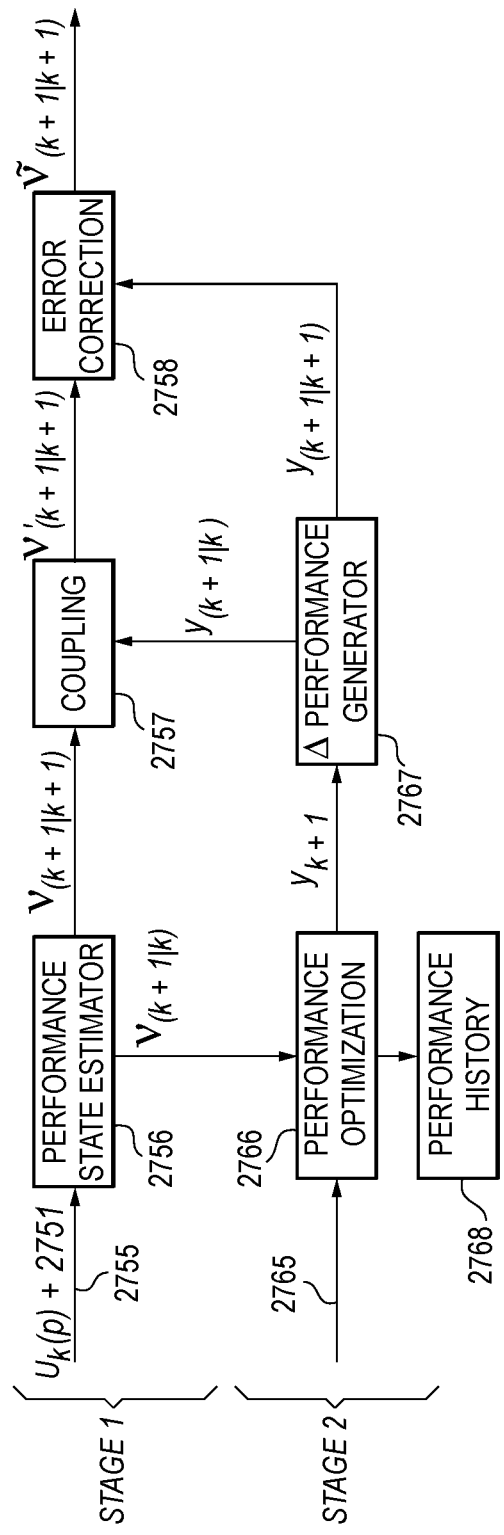
FIG. 34 is a block diagram that shows an exemplary embodiment of the two stage Kalman Filter of FIG. 27 in more detail.

The two-stage Kalman Filter is depicted in more detail in FIG. 34. Discrete linear time-varying state-space time equations are used to describe the dynamics of the component parameters: These are:

$$u_{k+1} \approx C_1 u_k + C_2 v_k - C_2 Z_k y_k + w_k^u$$

where
$u_k$ is the input data stream
$v_k$ is the first performance estimate
$y_{k+1} = y_k + w_k^y$
$C_1$ and $C_2$ are constants $$Z_k = \begin{pmatrix} z_{1_k} & \cdots & 0 \\ \vdots & \ddots & \vdots \\ 0 & \cdots & z_{n_k} \end{pmatrix}$$

covariance matrix provides the parameter coupling between stage1 and stage2 $w_k^u$ and $w_k^y$ are uncorrelated random Gaussian vectors Input data stream $u_k(p)$ and residue 2751 goes to Performance State Estimator Module of 2756 of Performance Estimation Module 2755 which calculates two sets of equations 1) the time update equations and 2) the measurement update equations. These are distinguished in FIG. 34 with subscripts (k+1|k) for time update equations and (k+1|k+1) for measurement update equations. Time update equations are responsible for calculating a priori estimates by moving the state and error covariance 1 . . . n steps forward in time. Measurement equations are represented by a static calculation of $u_{k+1}$ and are responsible to obtain a posteriori estimates through feedback measurements into the a priori estimates. Time dependent updates are responsible for performance prediction while measurement updates are responsible for corrections in the predictions. This prediction-correction iterative process estimates states close to their real values. The measurement equations $v_{(k+1|k+1)}$ are passed to the Coupling Module 2757. New time dependent parameter states $v_{(k+1|k)}$ are passed to the Performance Optimization Module 2766 and parameter states with subscript (k±1|k) are modified with parameter residues 2751 where parameter states with subscript (k±1|k±1) do not included residues in their determination. Performance History Module 2768 provides, maintains, and updates history of optimized performance predictions. New optimized performance states $y_{k+1}$ are produced by the Performance Optimization Module 2766 and passed to the Δ Performance Generator Module 2767. Module 2767 provides dynamic Δ (delta) component parameter performance over the current number of forward time steps 1 . . . n. Module 2767 passes the time dependent delta updates $y_{(k+1|k)}$ to Coupling Module 2757 and the measurement updates $y_{(k+1|k+1)}$ the Error Correction Module 2758. The Coupling Module 2757 couples (solves for) the measurement updates $v_{(k+1|k+1)}$ and time dependent delta prediction updates $\tilde{v}_{(k+1|k)}$ via solving the covariance matrix $Z_k$ resulting in the final performance parameters $\tilde{v}_{(k+1|k+1)}$ corrected for errors in the Error Correction Module 2758.

Figure 35:
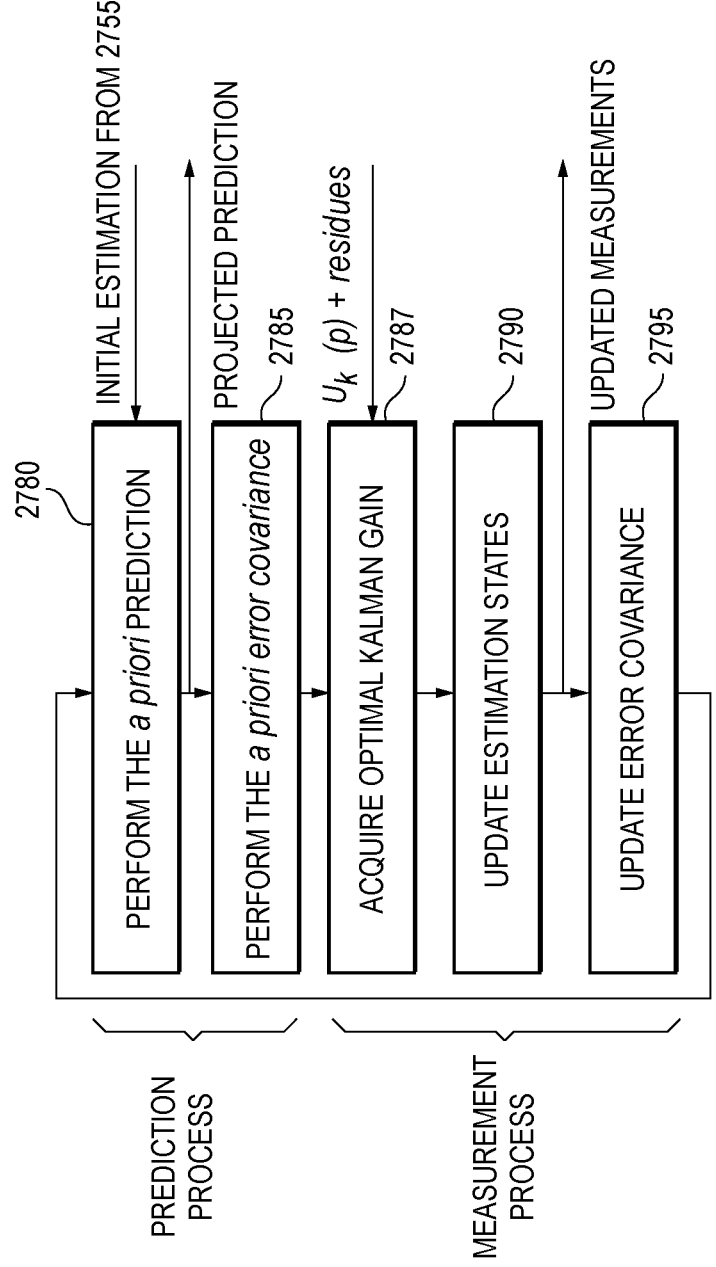
FIG. 35 is a flow diagram of a method for exemplary steps showing the functioning of the two stage Kalman Filter.

The flow chart utilized with the two-stage Kalman Filter method is shown FIG. 35. The process runs recursively; it covers the prediction of a priori state in step 2780 and a priori error covariance in step 2785, and the calculation of optimum Kalman gain in step 2787. It updates the a posteriori predicted state in step 2790 and a posteriori error covariance in step 2795. The process is then recycled to the initial step 2780 for the next processing cycle. This result is routed via the feedback loop to the Physics-Based Model Module 2710. The Physics-Based Model Module 2710 uses this result in determining if there are any deficiencies in the physics-based modeling. The size (quantification) and the rate of the degradation event over multiple time dependent sliding data windows (i.e., from the output results of the Performance Estimation Module 2755) enhance model refinement. These refinement results and associated sensor parametric data are stored in the Prognostics Models DB 2635 for later replay and learning/training.

The Damage Estimator Module 2625 makes a determination of the amount of damage for each component. For the brine pump example, the damage vector equation is given by (note that all variables in the physics-based model equations are directly measured parametric sensor values or derived values from these sensor parametric data): Friction Wear (sliding and rolling friction)

$$r_{thrust}(t) = w_{thrust} r_{thrust} \omega^2;$$

$$r_{radial}(t) = w_{radial} r_{radial} \omega^2;$$

where
- $w_{thrust}$=the thrust bearing wear coefficient
- $w_{radial}$=the radial bearing wear coefficient
- $\omega$=pump rotational speed (defined earlier)
- $r_{thrust}$=the sliding friction
- $r_{radial}$=the rolling friction Damage vector $$d(t)=[a_4(t),r_{thrust},r_{radial}(t)]^\theta$$

where
- d(t)=is the damage vector
- $a_4(t)$=is the impeller area coefficient (defined earlier)
- $r_{thrust}(t)$=is the sliding friction (defined earlier)
- $r_{radial}(t)$=is the rolling friction (defined earlier)
- θ=is pump temperature Significant damage in brine pumps occurs due to bearing wear, which is a function of increased friction (i.e., subject to friction coefficients).

Figure 30:
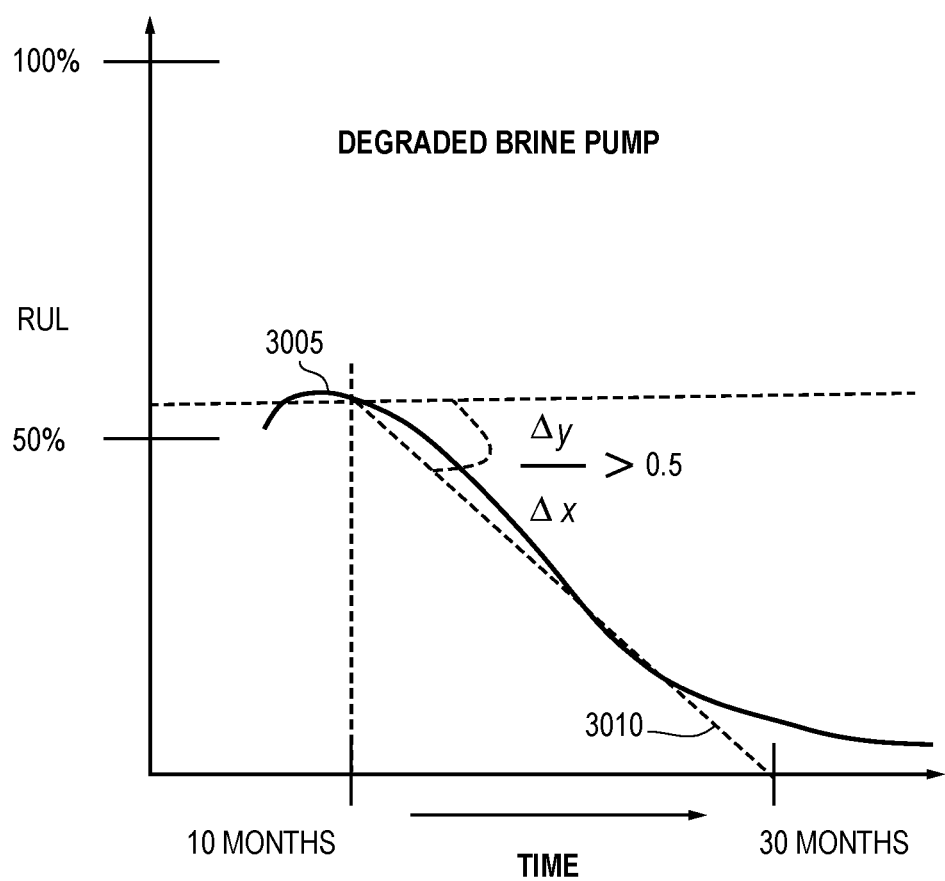
FIG. 30 is a graph showing an exemplary change of slope in brine pump performance utilized in remaining useful life determinations.

The Wear Vector is formed by the wear coefficients:

$$w(t)=\phi(t)=[w_{a4},w_{thrust},w_{radial}]^\theta$$

where
- φ(t) will be used as a parameter vector in predictive algorithm differentiating it from the weight calculations
- θ=pump temperature The RUL calculation in the Damage Estimator Module 2625 is identical to the EOL calculation discussed below for the State Predictor 2670 except that RUL is calculated for the current point in time and not a future projection/prediction in time. Typical RUL graph 3005 representing a degraded Brine Pump degradation over time is shown in FIG. 30. RUL may be estimated at any time in the aircraft/system operating history, even in the absence of faults/failures and/or component defects (i.e., the defect equation is valid for all operating conditions in either historic or current time horizons where data is available). Future predictions of RUL (where data is not available) are known as end-of-life (EOL) predictions.

State Predictor 2670 uses a state vector that is a time dependent equation. For the Brine Pump the complete state vector equation can be written as (note that all variables in the physics-based model equations are directly measured parametric sensor values or derived values from these parametric sensor data):

$$x(t)[\omega(t),\theta_{thrust}(t),\theta_{radial}(t),\theta_{oil}(t),a_4(t),r_{thrust}(t),r_{radial}(t)]^\theta$$

- $\theta_{thrust}(t)$=is the temperature at thrust bearings (defined earlier)
- $\theta_{radial}(t)$=is the temperature at radial bearings (defined earlier)
- $\theta_{oil}$=is the temperature of the oil (defined earlier)
- $a_4(t)$=the impeller area coefficient (defined earlier)
- $r_{thrust}$=is the sliding friction (defined earlier)
- $r_{radial}$=is the rolling frication (defined earlier)
- $\omega(t)$=is the pump motor rotation (defined earlier)

State Predictor 2670 uses a state vector that is a time dependent equation, i.e., the state of the brine pump at any point in time. Together, the damage equation and the state equation define the physics of the component at any point in time.

The prediction of EOL of the brine pump is calculated numerically using a particle filter algorithm that predicts the future state of the brine pump with the equation for the state vector equation and the damage equation as defined above. The future state particle probability density (note x is the state vector given above) is given by the particle filter (PF) process:

The Particle Filter (PF) computes $$p(x_{k_P},\phi_{k_P}|y_{0:k_P}) \approx \sum_{i=1}^{N} w_{k_P}^i \delta_{(x_{k_P}^i,\phi_{k_P}^i)}(dx_{k_P}d\phi_{k_P})$$

Approximate this distribution in n steps $$p(x_{k_{P+n}},\phi_{k_{P+n}}|y_{0:k_P}) \approx \sum_{i=1}^{N} w_{k_P}^i \delta_{(x_{k_{P+n}}^i,\phi_{k_{P+n}}^i)}(dx_{k_{P+n}}d\phi_{k_{P+n}})$$

so that the particle i is propagated n steps forward without new data available, taking its weights as $w_{k_P}^i$; EOL is approximated by $$p(EOL_{k_P}|y_{0:k_P}) \approx \sum_{i=1}^{N} w_{k_P}^i \delta_{EOL_{k_P}^i}(dEOL_{k_P})$$

i.e., propagate each particle forward to its own EOL while using the particle's weight at k, for the weight of its EOL prediction.

The particle filter process is a robust approach that avoids the linearity and Gaussian noise assumption of Kalman filtering, and provides a robust framework for long time horizon prognosis while accounting effectively for uncertainties. Correction terms are estimated in off-line training/learning to improve the accuracy and precision of the algorithm for long time horizon prediction from collected Analyzed Data 2655. Particle filtering methods assume that the state equations that represent the evolution of the degradation mode in time can be modeled as a first order Markov process with additive noise, iteratively refined sampling weights, and conditionally independent outputs.

Figure 33:
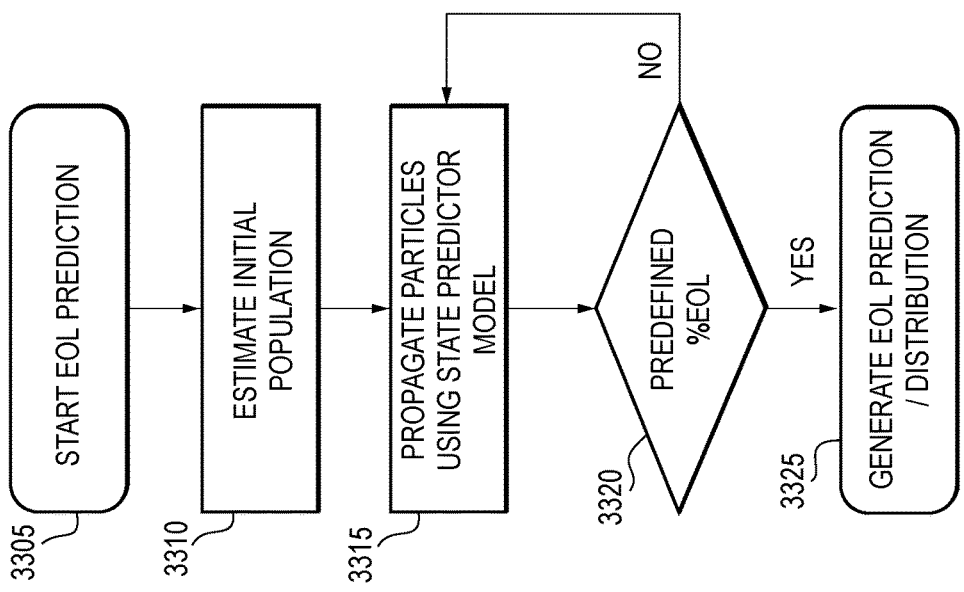
FIGS. 32 and 33 show exemplary flow charts for the particle filter determination and the end of life prediction, respectively.
Figure 32:
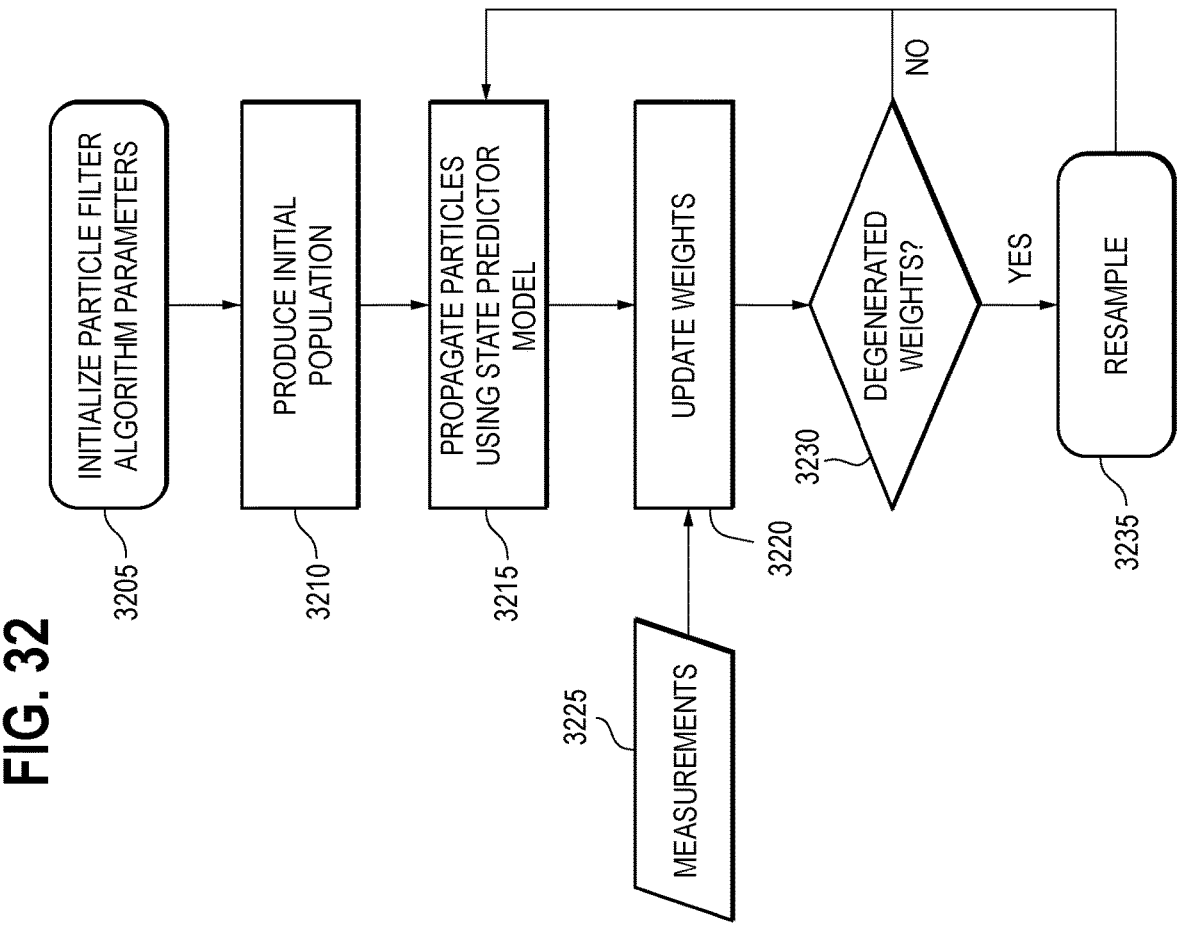

FIGS. 32 and 33 shows exemplary flow charts of the Particle Filter algorithm and the EOL prediction, respectively. In step 3205 the particle filter algorithm is initialized with initial particle parameters stored in memory. In step 3210 an initial particle population is produced based on the initial particle parameters. In step 3215 the particles are propagated using a state predictor model. In step 3220 the weights assigned to the various parameters are updated based on current measurements of the respective parameters in step 3225. In step 3230 a determination is made of whether the updated weights are degenerated weights. Degenerated weights are defined as differences in particle weights, i.e., when a small number of particles have high weights while the rest of the particles have small weights. When all resampled particles have similar weights within <=5%, the particle varying weights degeneracy is broken. A NO determination by step 3230 results in an iteration of the process by returning to step 3215. A YES determination by step 3230 results in resampling by step 3235 followed again by a further iteration by returning to step 3215. When degeneracy is not broken, resampling is required. Resampling (3235) is done on the current number of particles (particles propagated to step 3215) in order to avoid computation for those particles that do not contribute to the estimation. These particle weights are outliers and are rejected. The particle filtering process is also explained by the particle filtering equations as provided above.

FIG. 33 is a flow diagram of an exemplary method for providing an EOL determination. In step 3305 the EOL production is started. In step 3310 an estimate is made of the initial particle population (an arbitrary initial number of particles chosen for calculation; improved later in off-line algorithm and model training from stored raw data and analysis data). In step 3315 the particles are propagated using a state predictor model. In step 3320 a determination is made of whether a predetermined percentage of EOL has been reached for the component under consideration. A NO determination by step 3320 results in an iteration back to step 3315 in which a further propagation of particles using the state predictor model occurs followed by a determination again by step 3320. A YES determination by step 3320 results in step 3325 generating an EOL prediction. Continuous component EOL predictions (for degraded components) during the operation of the aircraft/system are stored in Analyzed Data 2655. This EOL prediction is used for future aircraft/system operation. The EOL prediction enables an EOL probability distribution function (PDF) to be created from this data and previous historic data by a fleet level prognostics engine on ground and off-line for further analysis to produce the EOL prediction that is provided to the product support team as a report. The above equations provide a more detailed explanation of the EOL determination. Note, that RUL is calculated at the current point in time and does not involve future state prediction. The calculation is identical to the EOL calculation presented above, with the exception that the RUL calculation is determined for the current-point-in-time using the EOL equations and methods described above.

Figure 36:
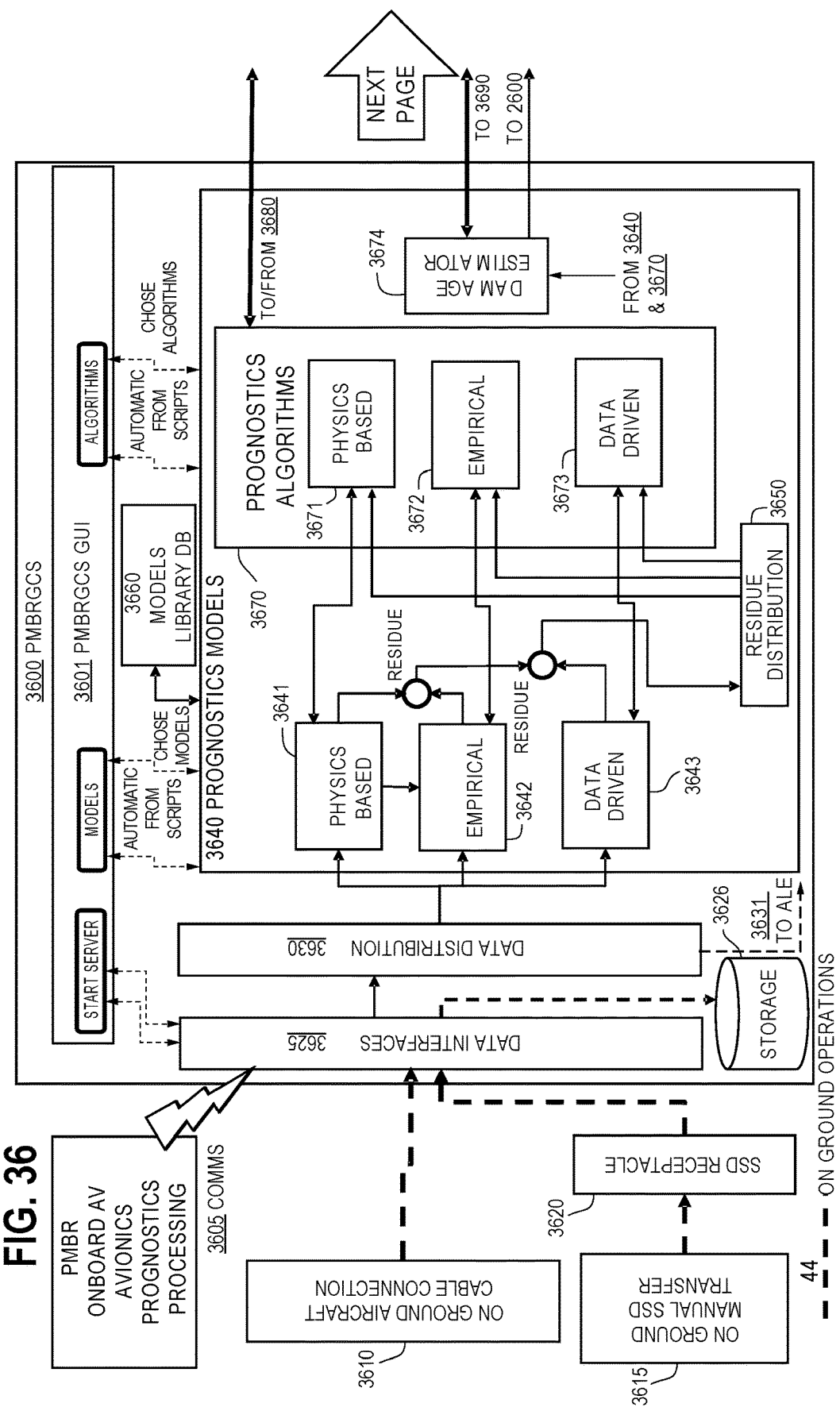
FIGS. 36 and 37 together show a block diagram of an exemplary fleet level prognostics system for using collected fleet level data to provide improved component maintenance metrics based on fleet level data.
Figure 37:
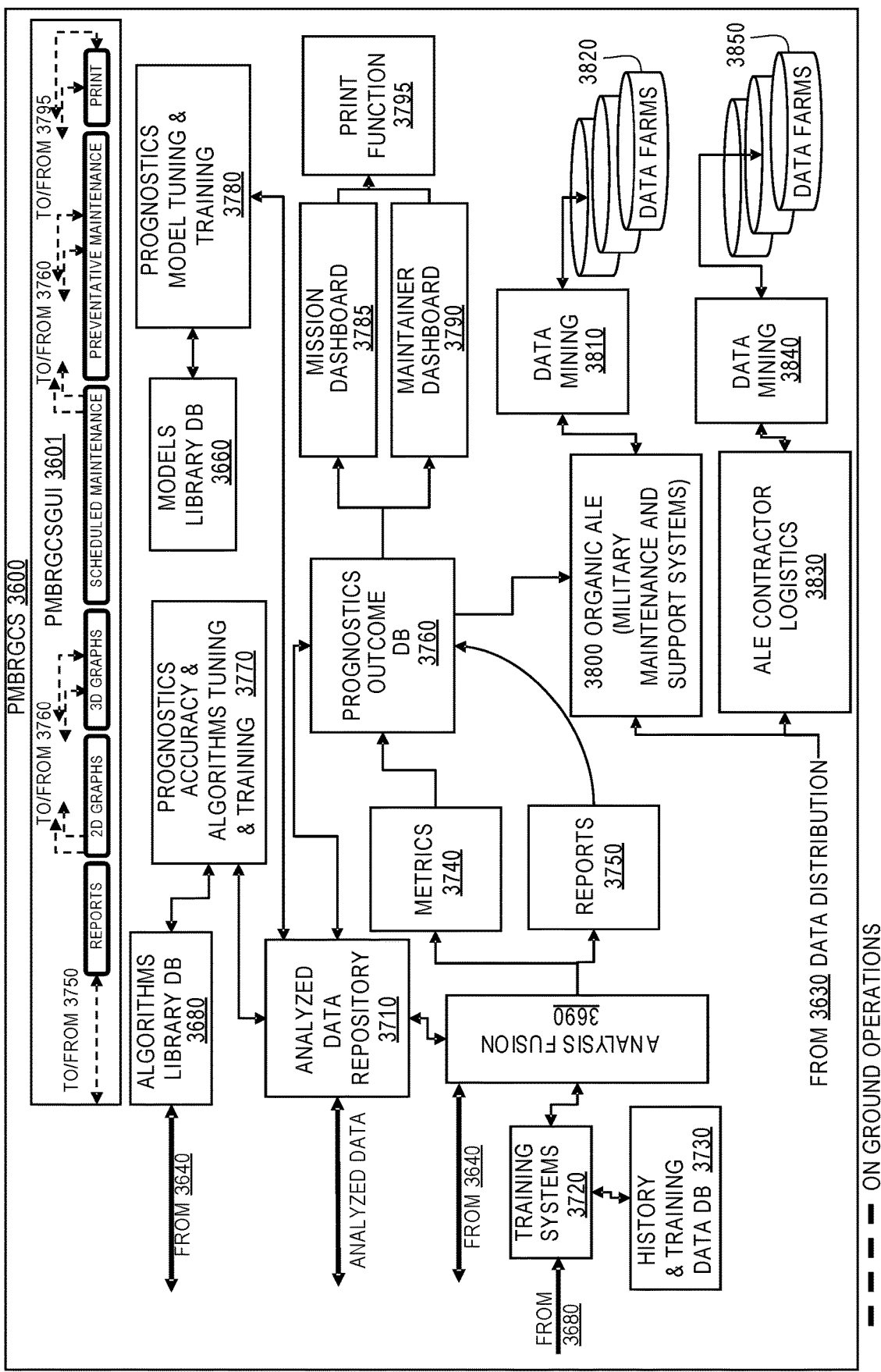
Figure 44:
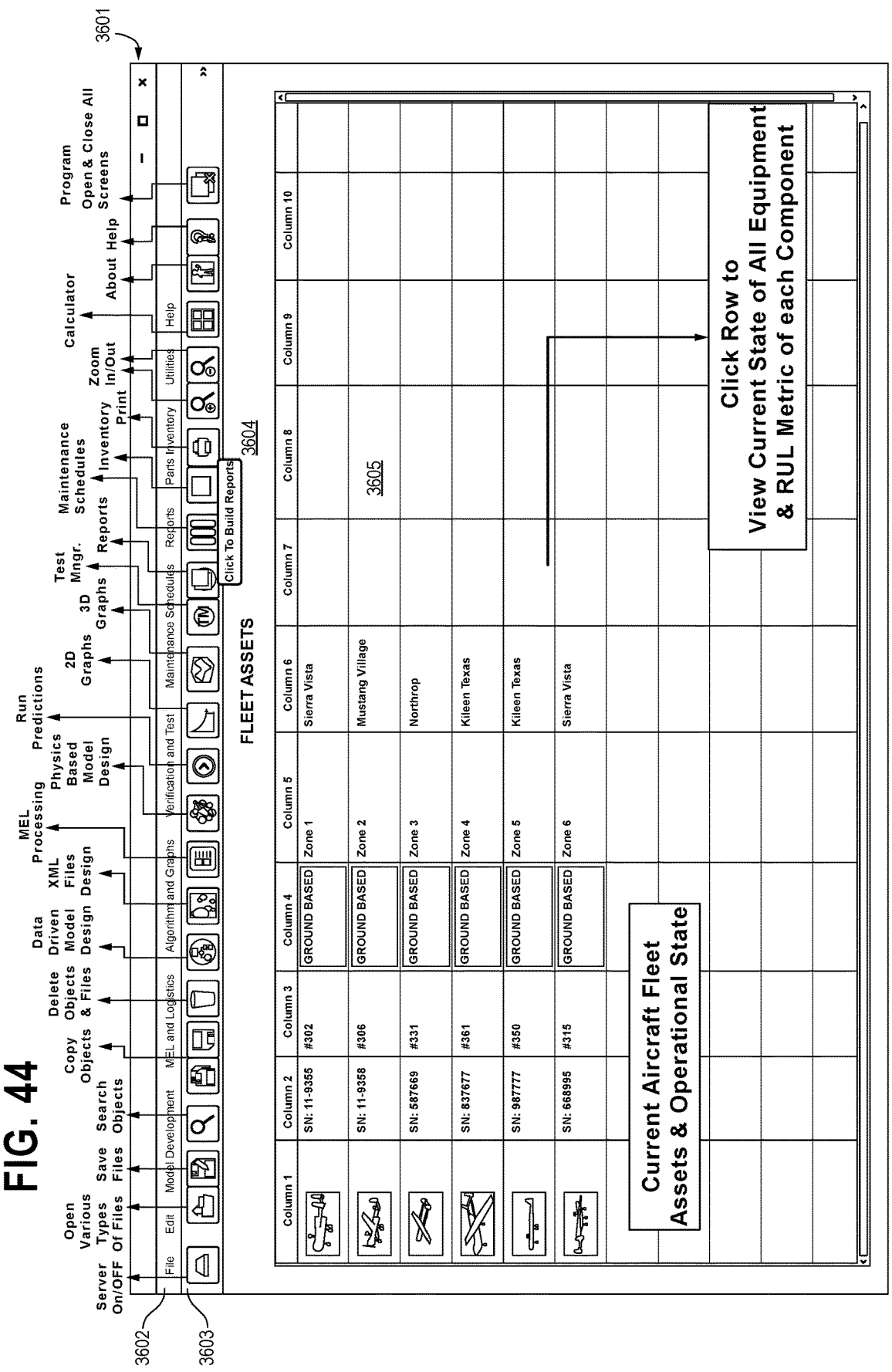
FIG. 44 shows a GUI for control of the ground-based Fleet Prognostics Systems.

FIGS. 36-37 provide a block diagram of an exemplary Fleet Level Prognostics System 3600 for which user selectable controls are provided by GUI 3601, as shown in more detail in FIG. 44. The exemplary GUI 3601 consists of a menu bar 3602 with a plurality of menus, a toolbar 3603 with a plurality of actionable button icons configured to initiate actions as indicated by the names in the tooltips 3604 shown when the mouse hovers over the button icons. The main screen body 3605 is a table that displays rows of all available aircraft where each row displays one aircraft as identified by tail number (aircraft from the fleet of like-type aircrafts are individually identified by their tail numbers). Each column in the table may display attributes particular to an aircraft tail number, such as, its serial number, tail number, mission capability (ground based, partially mission capable (PMC), non-mission capable (NMC) and fully mission capable (FMC)), it's zone, it's location, and other user defined attributes. Each displayed aircraft can be mouse selected to show its state, equipment assets, etc. The GUI has modes of operation which are role-based, i.e. each role pertains to different usage by personnel having different objectives. These personnel can be 1) mission operator who plans and executes aircraft missions, 2) maintainer who is responsible for maintenance of the aircraft, 3) trainer who trains mission operators and maintainers, 4) model designer who develops the models (Physics-based, data driven, and empirical) of the physical component, 5) database administrators who maintain database functionality, and 6) programmers who develop, maintain, and generate software for the operation of the Fleet Level Prognostics system. The GUI can run on a server with different operating systems and various servers independently, e.g., mission server, maintenance server, training server, technical data server, etc., to provide flexible and concurrent utilization.

Once the "Server" button icon in toobar 3603 is changed from "OFF" to "ON" (by the mission operator in the mission operator mode), the fleet level prognostics system goes into an autonomous mode and establishes various data socket links with the COMMS System 3605 which receives data from various aircrafts in flight or other in ground operations such as pre-flight testing, taxiing, and pre-launch. All GUI functions will typically run autonomously unless selected by the mission operator to run manually. The maintainer, via the GUI 3601, can direct the system to run in an offline "maintenance mode" (i.e. where new aircraft data is not attempted to be acquired or COMMS 3605 is inactive) and run various calculations and predictions, generate reports as required for predictive maintenance schedules, and build maintenance schedules based on mean-time-between-failures (MTBF) of aircraft components. MTBF are developed at the design phase from component specifications from the component supplier reliability and test data. These assist in inventory control and supply chain operations in Enterprise Asset Management (EAM) systems, keeping components and parts stocked and ready for repair/replacement when predictive maintenance informs a need, as will be described in association with FIG. 43, or when breakdown occurs requiring immediate corrective maintenance. The trainer via the GUI 3601 can run the system in an offline "trainer mode" for teaching and training others in the use of the fleet level prognostics system by replaying accumulated raw and analyzed data. In the designer mode, during design phase and later refinements in other phases, the designer creates models, verifies them, and tests them with synthetic and/or with actual flight data in the 4355 Test Manager (FIG. 41) via the GUI 3601 (FIG. 44). The maintainer also has this capability via the GUI 3601 (FIG. 44). The programmer mode is a development mode for building, modifying or enhancing the Fleet Level Prognostics System 3600.

FIGS. 36 and 37 as viewed together are a block diagram of an exemplary Fleet Level Prognostics System 3600. The system collects fleet level data and generates component maintenance metrics to improve on-board prognostics models and to enable determinations of whether maintenance on a common component on all like aircraft is needed. The System 3600 provides dynamic predictive maintenance schedules for actionable maintenance tasks by certified technicians. As used herein, "fleet level data" refers to data from a plurality of like-type aircraft. Of course, data for multiple different fleets can be collected and analyzed on a fleet level basis. The Data Interface 3625 provides a communication interface (API) for receiving data from different input devices. Communication Channel 3605 represents data wirelessly transmitted by radio communications (via tactical communication links) from an onboard embedded avionics prognostics engine on a vehicle/aircraft to system 3600 running on a ground-based server. All aircrafts have this engine running on their avionics mission computer or an independent IVHM computer installed in the avionics bay. The COMMS 3605 are a plurality of communication channels available to the full fleet of aircrafts. The System 3600 is designed to receive data from all these communication channels. A "like aircraft/like-type aircraft" is an aircraft of the same model and specification category. For example, the same military aircraft, e.g. F-35A, as specified for use by the U.S. Air Force may have different components and abilities from F-35B specified for use by the U.S. Marines and, an F-35C specified for use by the U.S. Navy. In such a situation, one "like aircraft" group (fleet) would include the F-35A aircraft as specified for use by the U.S. Air Force, another like aircraft group would include F-35B aircraft as specified by the U.S. Marines, and another like aircraft group would include the F-35C aircraft as specified for use by the U.S.

Navy. On the ground, aircraft data may be transferred by an Umbilical Cable (network cable) Connection 3610 or by removing hot-swappable Solid State Drives (SDDs) 3615 from the aircraft and physically transporting them to the maintenance control center and passing the data through the SSD drive receptacle 3620 to the Fleet Level Prognostics Engine 3600. The Data Interface 3625 accommodates the different data rates (when connected to aircraft communication links) and formats associated with receiving input data from the sources. Input data received from an identified aircraft by the Data Interface 3625 includes the time-stamped sensor data with an existing header (metadata) to identify the specific component/aircraft tail number from which data is received. The Input data also includes analysis data tagged to identify the associated component/aircraft tail number as generated by the on-board MBR Diagnostics Engine 106 (14) and analysis data tagged to identify the associated component generated by the Onboard Prognostics System 2600. This data is stored in a Storage 3626 database in two paths: 1) When the aircraft is operational and transmitting data via the wireless radio communication links, the Data Interface Module 3625 receives and passes the data directly to the Data Distribution Module 3630 which then stores this data in the data Storage 3626 database; 2) When the aircraft is on ground, e.g. during post flight operations, data is passed to the Fleet Prognostics System 3600 via the Umbilical Cable Connection 3610 or SSD Drive Receptacle Interface 3620 via Manual Transfer 3615 to the Data Interface Module 3625 and then to the data Storage 3626 database. Requests made from the Data Distribution Module 3630 to the Storage 3626 acquire the new stored data from data Storage 3626 module for offline use.

Models, algorithms, and components are mapped in triplets (one, one, one) or (one, many, one) or (one, many, many). Mappings (one, many, one) and (one, many, many) occur when components are similar/identical and multiple algorithms may produce accurate results for the component. Note that in this mapping scheme model is one and only one (i.e., the three tiers model combination) pertinent to the component, always. This allows for automatic selection of model-algorithm-component in Prognostics Models Module 3640. Data Distribution Module 3630 pulls data (has access to database triggers which allow for automatic pulling of data as new data arrives) from the Storage Module 3626 database and distributes the "pulled" data to the Prognostics Models Module 3640 analysis system. Module 3640 selects the appropriate three-tier models unique to the component, with appropriate algorithms applied to the component in Algorithms Module 3670 and chosen from the Algorithms Library 3680. This allows model-algorithm-component system to perform the prognosis on the component. The Data Distribution Module 3630 transmits raw data to the Automated Logistics Environment (ALE) modules 3800 and 3830. Prognostics Models Module 3640 has a mapping of algorithms pertinent to the component model. Each component has an individual tailored algorithm (e.g., electronics systems will not have the same algorithm as mechanical systems or structural systems). Within the Prognostics Model Module 3640, the data is further distributed to a Physics-Based Prognostics Model 3641, an Empirical Prognostics Model 3642, and a Data Driven Prognostics Model 3643. Similarly, the Prognostics Algorithms Module 3670 consists of Physics Based Module 3671, Empirical Module 3672, and Data Driven Module 3673. Data is transmitted from Module 3641 to Module 3671 and the cumulative model residues from Residue Distribution Module 3650 to Module 3671. This happens in the same way for Modules 3642, 3672, and 3650, as well as Modules 3643, 3673, and 3650, respectively. The processing and operations for these Modules are substantially the same as described for Module 2630 (in FIG. 27), i.e. corresponding models: Physics-Based Model Module 2710, Empirical Model Module 2715, and Data Driven Functional Physical System Model Module 2720. The Prognostic models used in Module 3640 shown in FIG. 36 function to provide prognostics for each of the like components located in a plurality of like aircraft so that the relative performance of each of the like components can then be compared to a collective performance (average, median, etc.) of other like components against data received from Data Distribution Module 3630. Similarly the algorithms used in Module 3670 function to provide algorithms to the three-tier models in Module 3640 for each of the same components located in a plurality of like aircraft so that the relative performance of each of the like components can then be compared to a collective performance of other like components against data received from Data Distribution Module 3630. The various models in the Prognostics Models Module 3640 and Prognostics Algorithms Module 3670 are stored in the Models Library DB 3660 and the Algorithms Library DB 3680, respectively, and are retrieved for use based on the particular component data to be evaluated. Residue Distribution Module 3650 enhances accuracy and precision of the predicted results as well as continuous refinement of both models and algorithms. The refinements are stored in Models Library DB 3660 and Algorithms Library DB 3680 for models and algorithms, respectively. As described in System 2600 a nonzero residue indicates a degradation event which is then ascertained by the Parameter Performance Estimation Module 2755. This is substantially the same processing as used in System 3600.

Figure 41:
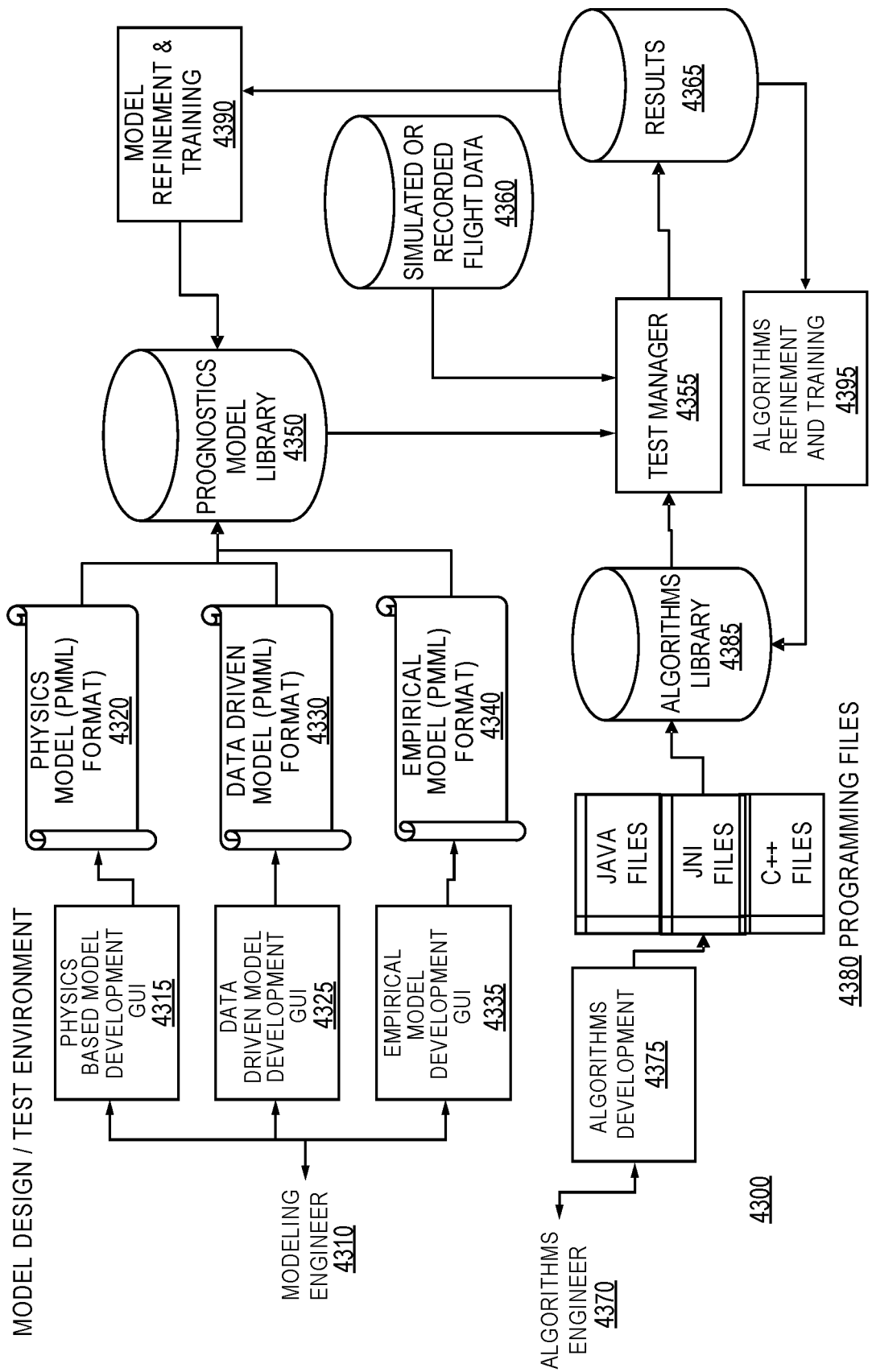
FIG. 41 is a block diagram showing the design, training, and refinement of the onboard and fleet level prognostics system.

FIG. 41 is a diagram that shows the design, training, and refinement of the fleet level prognostics system. In the design mode, a modeling engineer 4310 will use graphical user interfaces 4315, 4325 and 4335 to enter changes and modifications to the physics-based model, data driven model, an empirical model, respectively, of the subject component. The respective models 4320, 4330, and 4340, which may for example be stored in predictive model markup language (PMML), containing the modifications are then stored in the Prognostics Model Library 4350. Similarly, an algorithms engineer 4370 utilizing algorithms development interface 4375 may enter modifications of the respective algorithms into programming files 4380 which are, for example, as Java files, JNI files (interface between Java and C++ data structures) and C++ files. The updated programming files 4380 are stored in the Algorithms Library 4385.

A Test Manager 4355 utilizing a model from the Prognostics Model Library 4350 and corresponding algorithms from Algorithm Library 4385 can test the prediction accuracy based on simulated or recorded flight data from storage database 4360 (flight data migrated from 3626 Storage (FIG. 36)). The results of the regression testing and accuracy testing are stored in Results 4365, which is used by the Algorithms Refinement and Training Module 4395 for modification of corresponding algorithms stored in Algorithms Library 4385 to increase accuracy, and is also used by model Refinement and Training Module 4390 modification of corresponding models stored in the Prognostics Model Library 4350 to enhance the accuracy of the respective models.

In the design mode, the user has the capability of choosing analysis for like components in like aircrafts and time horizons (hours, days, months, years, and decades) via a graphical user interface (GUI) as well as the appropriate component algorithms. These choices may be written as XML files that include the ANSI SQL statements for component models and algorithms and stored in Prognostics Model Library 4350 and Algorithms Library 4385 databases. Embedded SQL statement in the XML file allow for automatic extraction of data from the various databases when run in the Test Manager 4355. The XML file becomes a script file for running reproducible tests. Automated script file testing is very important for regression testing of models and algorithms applied to the component(s) under test. They are easily updated for new parameter refinements while old parameters are retained under the <histories></histories>label in the XML file. In the operational mode, in System 2600, the prognostics model and corresponding algorithm configuration files are transferred (model database migrated) to and stored on the aircraft in Prognostics Models DB 2635 and Algorithms 2668 files, respectively. Similarly, in System 3600 these are stored in the Models Library DB 3660 and Algorithms Library DB 3680, and are utilized for processing in the Prognostics Models Module 3640 and Algorithms Module 3670. The fleet level analysis proceeds further in the Damage Estimator Module 3674 (similar processing control taken from System 2600 with modification of communication line 2600 in System 3600) which operates on the fleet data the same way as described for Damage Estimator Module 2625 operating on the on-board System 2600 data. Similarly, the fleet level analysis proceeds in the State Predictor Module 3675 (similar processing control taken from System 2600 with modification for SOH calculation and communication line 2600 in System 3600) which operates on the fleet data the same way as described for State Estimator Module 2670 operating on the on-board System 2600 data.

The Algorithms Library DB 3680 stores all of the algorithms developed for all of the components on the aircraft for which performance analysis is available. The algorithms used in Algorithms Module 2668 are a small subset (i.e., Neural Networks, Kalman Filter, and Particle Filter which are efficient and fast for onboard processing) of the complete set of algorithms developed for the Fleet Level Prognostics System 3600. Some of these algorithms as applied to specific components include: logistics regression, linear regression, time series, symbolic time series, random forest, decision trees, moving averages, principal component (PCA), support vector machines (SVN), Markov Chains, Bayesian methods, Monte-Carlo methods, neural networks (numerous of them), particle-swarm optimization, various filters (Kalman and Particle filters), fast Fourier transforms (FFT), gradient and Ada boost, wavelet, genetic, natural language, clustering, classification, learning & training, and data mining.

Figure 38:
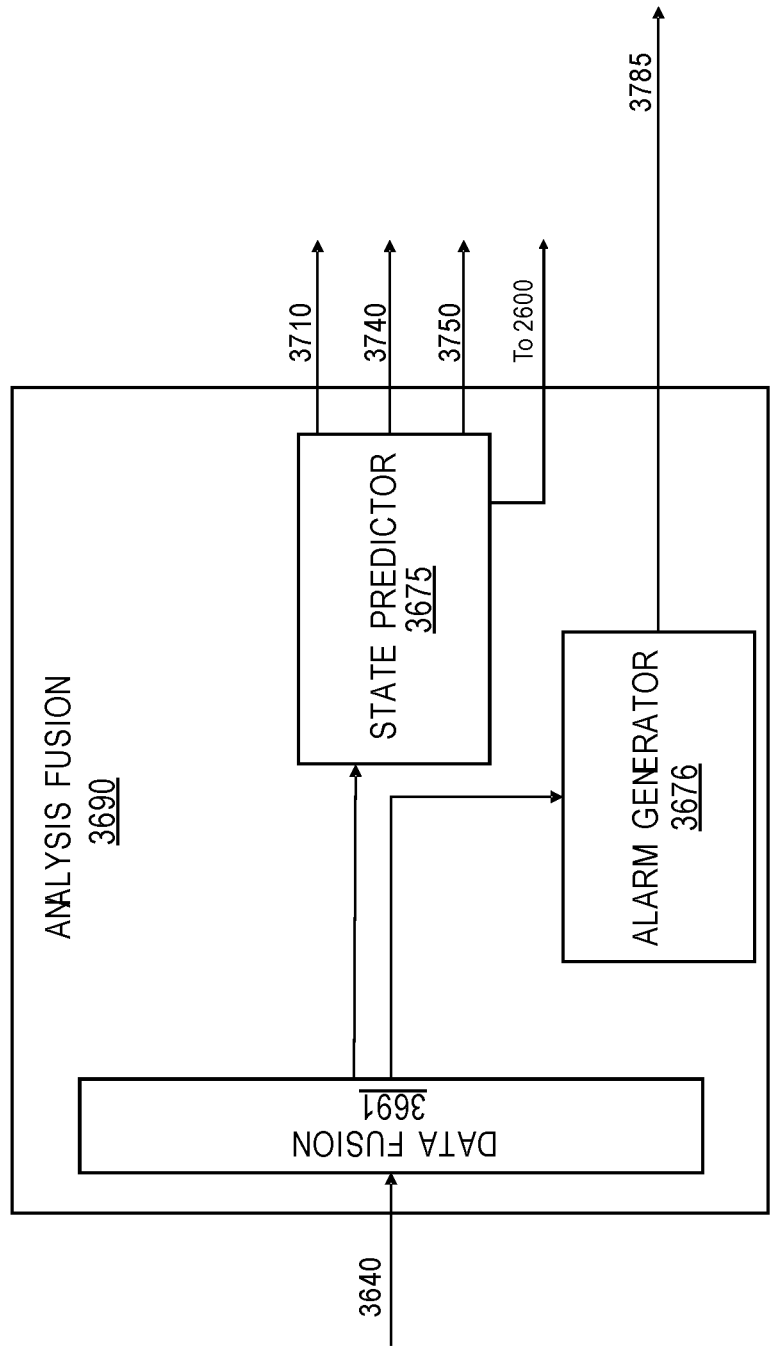
FIG. 38 is a block diagram of the Analysis Fusion Module of FIG. 37.
Figure 42:
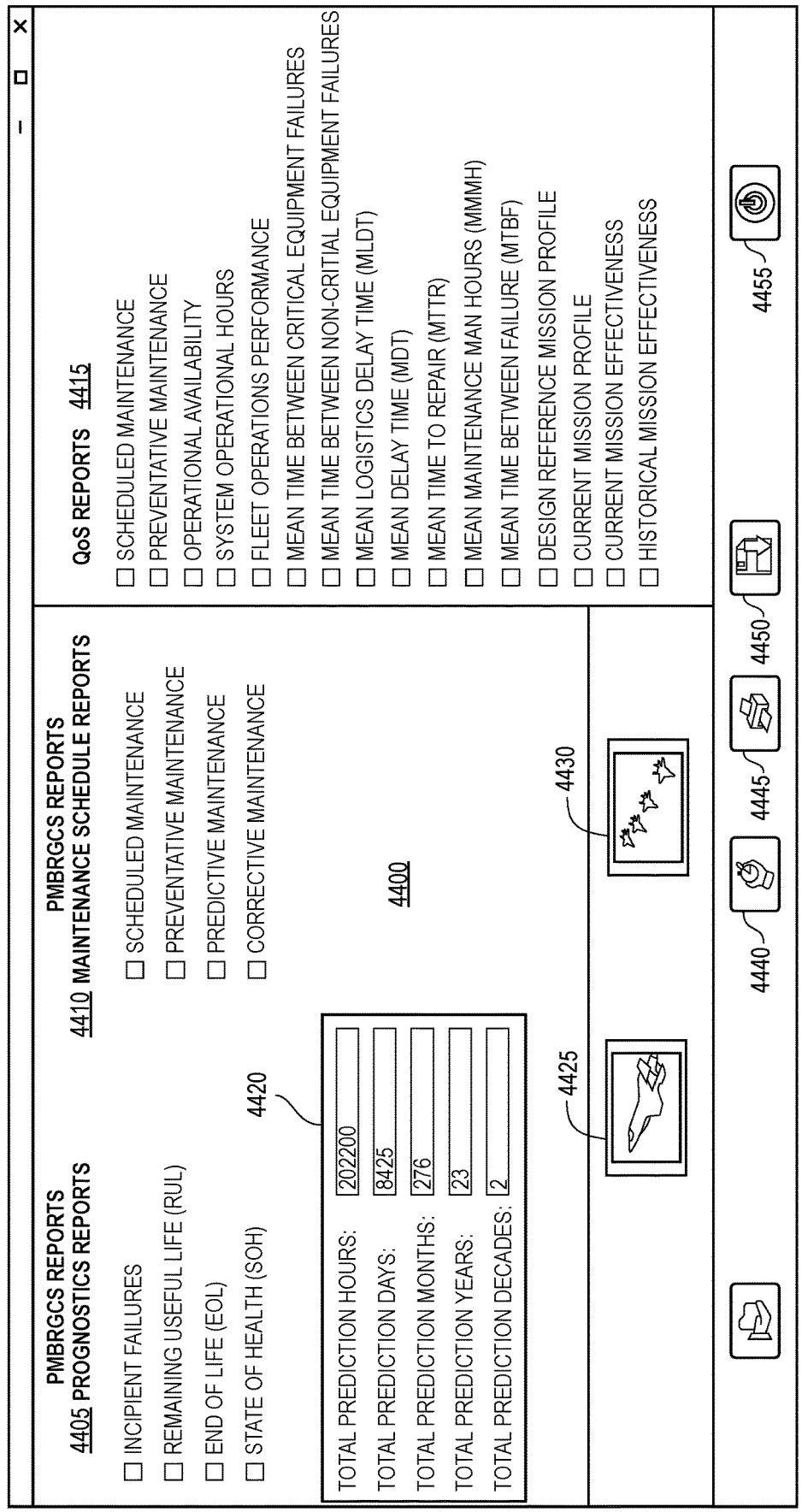
FIG. 42 shows a graphical user interface (GUI) for the selection of reports and metrics to be produced by fleet level prognostics system for single aircraft, a subset of aircrafts in the fleet, or the entire fleet.

The output from the Damage Estimator Module 3674 is provided as an input to the Analysis Fusion Module 3690, which is shown in more detail in FIG. 38. Note that the Damage Estimator Module 3674, the State Estimator Module 3675, and the Alarm Generator Module 3676 processing are substantially the same with corresponding functions in Systems 2600 and 3600. State Predictor Module 3675 is enhanced for SOH calculations in System 3600 so that both Modules 3674 and 3675 have an additional communication link (via COMMS 3605) to transmit their analysis results to System 2600 when both System 2600 and System 3600 are operational with COMMS 3605 active. These modules provide information to the aircraft flight control system (FCS) for possible hardware & software reconfiguration (this is discussed later). As well, in System 3600 both Modules 3674 and 3675 are optimized for short time horizon (>1 day) to long time horizon (less than or greater than 5 decades, which is dependent on when obsolescence occurs for the fleet of aircrafts). In System 2600, these modules work in the short time horizon that is dependent on the mission flight time of the aircraft (from takeoff to landing). Analysis Fusion Module 3690 fuses the analysis output and the related data from Module 3674 of all like components and for all like aircrafts in a chosen analysis time horizon (e.g., time durations of hours, days, months, years, decades). Data Fusion Module 3691 (FIG. 38) operates in a similar manner as Data Fusion Module 1170 in FIG. 26, where it maps and averages the incoming output from Damage Estimator Module 3674 predictions within a moving time window correlated for appropriately tagged components or group of like components. Module 3691 transmits tagged alarms to Alarm Generator 3676 (similar functions as the Alarm Generator 2645 but optimized for fleet level computations) and these alarms are then registered on the Mission Operator Dashboard 3785 when connected to COMMS 3605 in the mission operator mode, as well as to the Maintainers Dashboard 3790 in the maintainer's mode. This Module 3691 also transmits data and analysis to the State Predictor Module 3675 (enhanced and optimized for fleet level computations and includes SOH calculation), which performs the same tasks as previously defined, however in the Analysis Fusion Module 3690 it also calculates and predicts the components State-Of-Health (SOH) indicator in 4405 (FIG. 42); RUL and EOL are calculated in Damage Estimator Module 3674, and state (anomalous behavior) of components (faults/failures, fault isolations, false alarms, and root cause analysis are obtained from MBR Diagnostics Engine 106 (14)). Anomalous behavior data and analysis obtained from MBR Diagnostics Engine 106 (14) are subsequently stored in Analyzed Data Repository 3710 and used for metrics calculation in Metrics 3740 and reports generation in Reports 3750, respectively.

The output from Analysis Fusion Module 3690 is provided as an input to the Metrics Module 3740 which provides the grouping of information on a user selectable basis. For example, the GUI 4400 of FIG. 42 shows a variety of user selectable criteria that can be used to sort the information provided by the Analysis Fusion Module 3690 into a selected Prognostics Report 4405, Maintenance Schedule Reports 4410 or a QoS Reports 4415 that are generated in Report Module 3750. It will be noted that the metrics and reporting functions shown in FIG. 28 are a subset of those shown in FIG. 42. In addition to the Failure/Degradation and Quality of Service (QoS) criteria shown in FIG. 42, various types of maintenance reports, e.g. scheduled maintenance, preventive maintenance, predictive maintenance, and corrective maintenance can also be selected by the user and generated for viewing (in Mission Dashboard 3785 and Maintainer Dashboard 3790) and printing (print function Print Module 3795). Existing time horizon for running the predictions is shown in 4420. It can be updated via button 4440 for short (~day), medium (months), and long (decades) horizons. The reports can be produced for a single aircraft 4425, a subset of aircrafts 4430, or the entire fleet of aircrafts 4430. The 4435 button allows searching for existing stored predictions performed earlier allowing tweaks to be made to get better report outcomes. The 4445 button allows the printing of the chosen reports, button 4450 saves the report and prediction, and button 4455 terminates the reporting screen.

Figure 43:
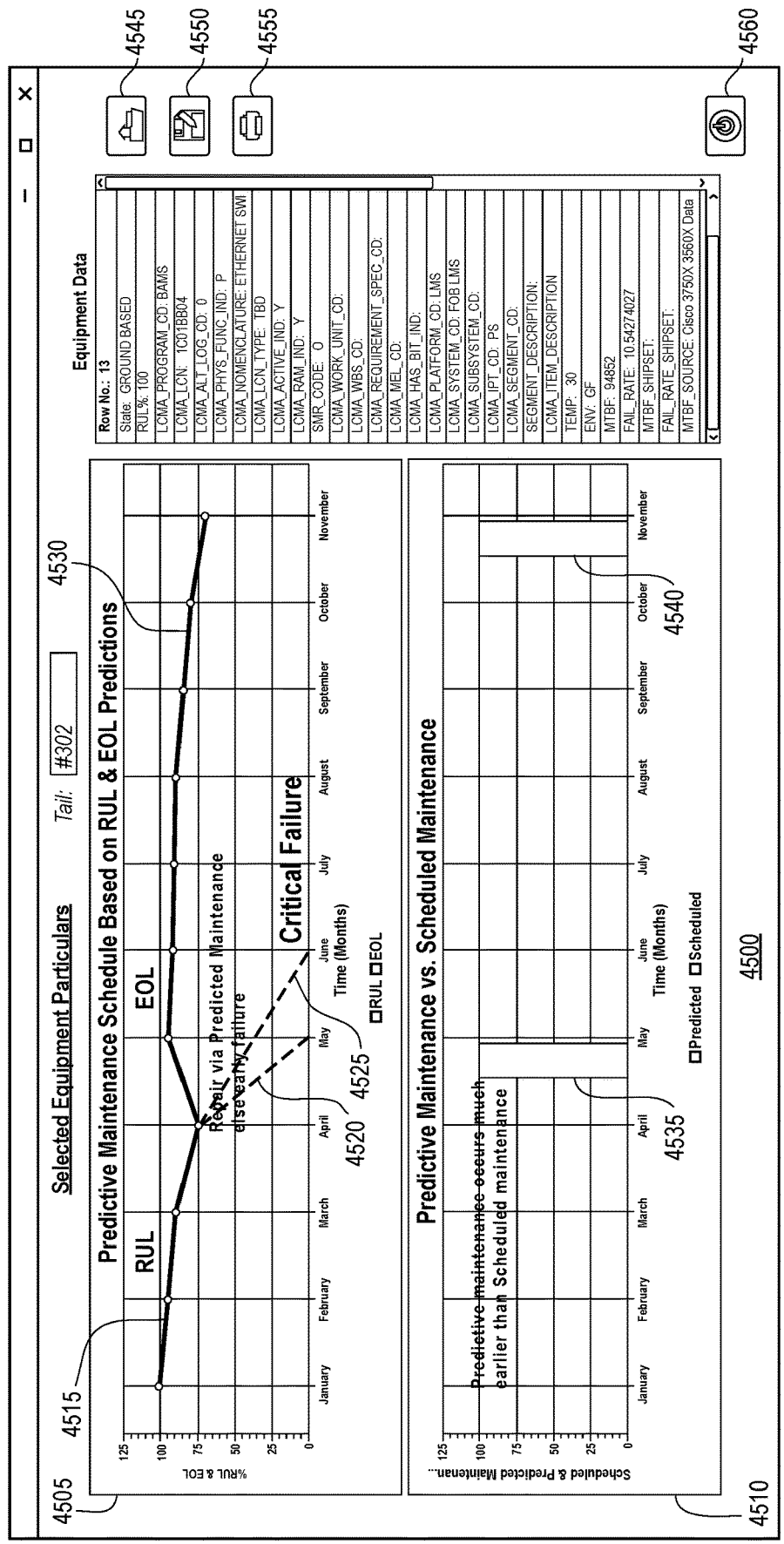
FIG. 43 is a chart of a predictive maintenance schedule for an exemplary component compared with a time interval based scheduled maintenance.

An exemplary predictive maintenance schedule 4500 generated by the Reports Module 3750 (FIG. 37) for an electronic component is shown in FIG. 43. The state-of-health (SOH), remaining useful life (RUL) and end-of-life (EOL) metrics for single/plurality of like components are grouped in the Metrics Module 3740 (obtained from Damage Estimator Module 3674 and State Predictor Module 3675) and transmitted to the Reports Module 3750 for generating reports as well as storage of metrics and reports in the Prognostics Outcome DB 3760. All other metrics shown in FIG. 42 for reporting purposes are calculated in the Metrics Module 3740, with current data and current analysis obtained from Modules Analyzed Data Repository 3710 & Prognostics Outcome DB 3760. Per user choice, viewing and printing of metrics and reports is accomplished by queries on Prognostics Outcome DB (FIG. 37) for existing data (not new) & existing metrics, reports, and data (data from the Analyzed Data Repository 3710) with the correct & existing parameters chosen by the user. Otherwise, for new data and new parameter choices, new metric predictions and reports are generated on-the-fly and stored for later use, upon user request. Data from Analyzed Data Repository 3710 and the Prognostics Outcomes DB Module 3760 can also be visualized simultaneously with existing metrics and reports or altogether generated as new reports, respectively.

FIG. 43 shows a chart 4500 with a graph 4505 above, and a graph 4510 below with each having the same x-axis timeline but different y-axis: chart 4505 with RUL/EOL as a percentage on the y-axis and chart 4510 has an arbitrary y-axis (i.e., arbitrary height of the bar graph for visual impact). Graph 4505 shows a line 4515 representing the predicted RUL for the subject component which is falling at an increasing downward slope from 100% at January to 75% at April. The increasing downward trend is cause for concern from a maintenance perspective and possibly cause for concern of component critical failure in days. Line 4520 represents one projection made in April into the future of line 4515 based on a further increasing downward trend with line 4525 representing another projection made in April into the future of line 4515 based on a lesser downward trend. Line 4520 indicates 0% RUL at May and line 4525 indicates 0% RUL at June, where 0% RUL represents a potential critical failure. The time duration between lines 4520 and 4525 is called the period of uncertainty (or an envelope of uncertainty). Based on these projections and a predetermined threshold amount of RUL, e.g. 30%, that may vary with the specific component and the amount and change in slope of the RUL projections, a need for maintenance is indicated based on these actual condition-based projections prior to a fixed predetermined maintenance schedule interval, e.g. such as the scheduled maintenance interval produced by logistics engineering via reliability centered maintenance (RCM) analysis. 0% RUL would indicate the End-Of-Life (EOL) of the component. Graph 4510 shows predictive maintenance as scheduled during an interval 4535 just prior to the beginning of May based on the predictions in graph 4505. This should be contrasted with the logistics engineering planned a priori scheduled maintenance interval 4540 for the component which is between October and November. Note also, that the line 4530 would align with line 4520 or line 4525 (EOL at 0% RUL) if 4535 Predictive Maintenance did not occur at this dynamically scheduled predictive maintenance event based on the condition of the component. If the Predicted Maintenance 4535 occurred the impact on line 4515 i.e., line 4530 indicates a significant increase in longevity of the component in question while benefiting in the increase in the operational availability of the aircraft. Button 4545 provides display of previously stored graph data and predictions, button 4550 stores the current graph data and predictions for later use, button 4555 prints the current graph, and button 4560 terminates the current screen.

The History and Training Data Database 3730 contains historical data collected from the analysis of data associated with all of the analyzed components during online and offline operations. The Training Systems Module 3720 utilizes the data contained in Database 3730 to periodically update the algorithms utilized in the Analysis Fusion Module 3690 in order to provide a more refined and accurate analysis.

The Analyzed Data Repository 3710 contains all of the data from the MBR Diagnostics Engine 106 (14), the PMBR onboard Prognostics Engine 2600, and the previously analyzed data from the PMBRGCS (the ground-based Fleet Level Prognostics Engine 3600). This information is made available to the Analysis Fusion Module 3690 to assist in increasing the accuracy of analysis and to provide access to this information by the Metrics Module 3740 in order to generate the user selected reports by Module 3750. Also, the analysis as made by Module 3690 is sent to the Database 3710 to be integrated with the historical data information. The Database 3710 also communicates with the Algorithms Library Database 3680 so that the algorithms can be continually refined. Refinements of both models & algorithms can occur autonomously in the Training Systems Module 3720 online or offline (since Module 3600 is running on a ground located server and is not a flight or mission critical system for aircraft operations). These refinements provide cumulative analysis in Module 3720 with data and analysis received from Module 3690, which receives data from Module 3710, which in turn receives data and analysis from Modules 3770 & 3780. The training algorithms for Module 3720 are obtained from the Algorithms Library DB 3680. With data from the History Database and in conjugation with moving averages algorithm for existing analyses & principle component algorithm for parametric and BIT data of other modules (described above), high fidelity refinements can be made and stored for execution of analysis of the next data for like component in the History & Training Data DB Module 3730. The Prognostics Accuracy and Algorithms Tuning and Training Module 3770 also provides interactive communication with the Algorithms Library Database 3680 and provides input to the Analyzed Data Repository 3710. The Module 3770 provides continuing accuracy updates as reflected in modifications of the corresponding algorithms utilized for analysis of the component data. Similarly, Module 3710 is also in communication with the Prognostics Models Tuning and Training Module 3780 which is in turn in communication with the models as stored in the Model Library Database 3660.

The Prognostics Outcome Database 3760 receives and stores the user selected metrics and data from Metrics Module 3740 and the corresponding report from Reports Module 3750. The Database 3760 is also in communication with the Analyzed Data Repository 3710 providing access to analyzed data. The Database 3760 also provides information to the Mission Dashboard 3785 and the Maintainer Dashboard 3790. Mission Dashboard 3785 is accessible in the mission operator mode (roles-based access) of operating Fleet Level Prognostics System 3600. It provides situational awareness of all operating and ground based aircrafts, as well as access to all menus and buttons in the Fleet Level Prognostics System 3600 GUI Module 3601, except for the model design functions. Similarly, the Maintainer Dashboard 3790 is accessible to the maintainer in the maintainer mode of operation or the maintainer's role. The maintainer will have access to all the menus and buttons in the GUI 3601, except for the model design functions. The output from each of these dashboards is provided to Print Function Module 3795 when the print button is clicked in the GUI 3601, which then provides a printed output of the chosen item in the dashboard (see FIG. 44).

Figure 39B:
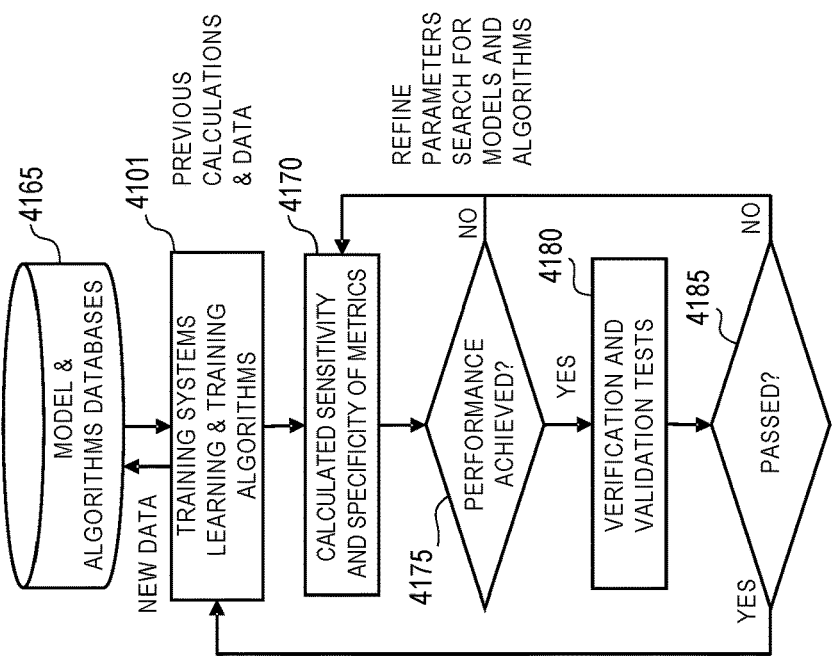
FIGS. 39A and 39B are a flow diagrams showing steps to increase the accuracy of models and algorithms used for both on-board component performance evaluation and fleet level component performance evaluation.
Figure 39A:
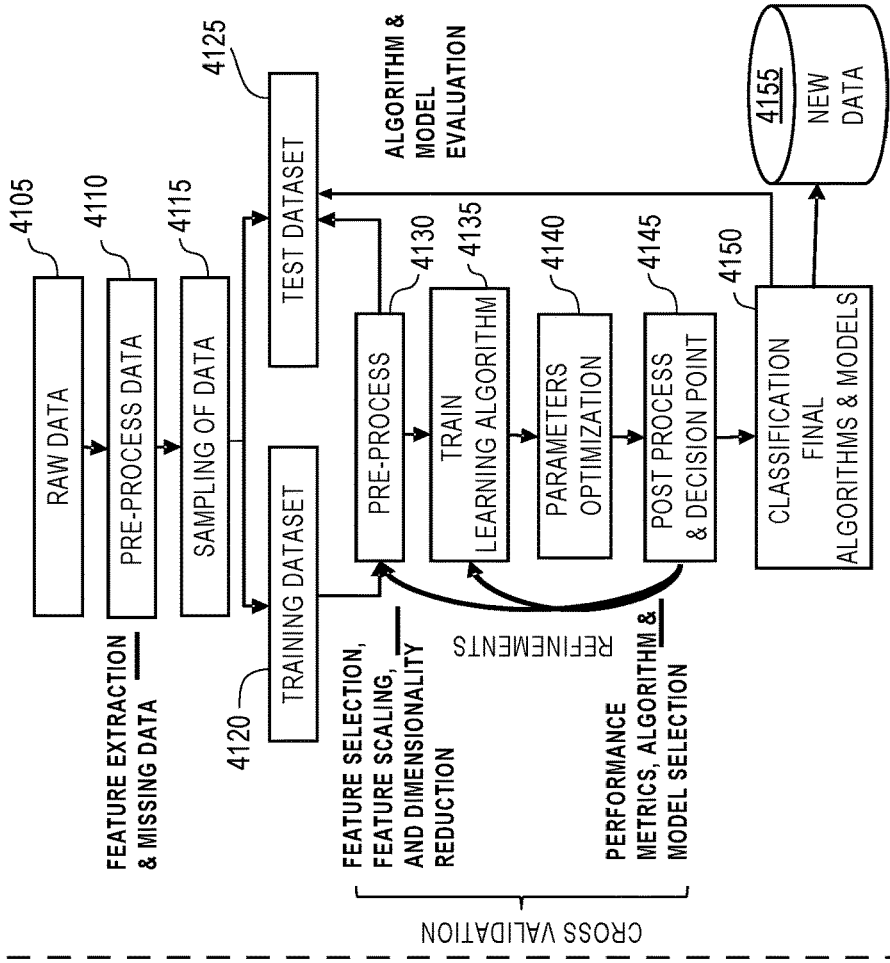

In this illustrative embodiment, the data from the Data Distribution Module 3630 is provided to the Organic Automated Logistics Environment (ALE) (i.e., Maintenance and Support Systems) 3800 and the ALE Contractor Logistics 3830. The output from Module 3800 is provided to Data Mining Module 3810 which selects data for storage and pulls data for use from the Database Farm 3820. Similarly, the output from module 3830 is provided to Data Mining Module 3840 which selects data for storage and pulls data for use from the Database Farm 3850. The ALE maintenance and support systems (logistics operations both for military and its contractors) provide the necessary enterprise level applications for maintenance functions such as 3-levels of maintenance, repair and/or replacement, overhaul, and other organization functions such as inventory control, supply chain functions for spares and parts ordering, and so on. The Fleet Level Prognostics System 3600 provides the diagnostics and prognostics data and analysis to these ALE. FIGS. 39A and 39B are flow diagrams 4100 showing how fleet level component performance metrics are used to increase the accuracy of models and algorithms used for both on-board (System 2600) and off-board (System 3600) component performance evaluation and associated model and algorithm refinement. Flowchart 4101 defines the training and learning that is performed for the refinement of models and algorithms using the integrated development environment (IDE) system depicted in FIG. 41. Note that the description provided below is equally applicable to both refinement of models and algorithms. Collected raw data in Storage 3626 or Data Farms 3850 is extracted in step 4105 via data mining algorithms that search aircraft and like aircraft component metadata (i.e., the tail numbers) in the stored files. Data Farm 3820 will in general not be available to the military contractor who built the system; it is available only to the military branch that owns the system. Parameter and parameter feature extraction for component and like component using classification and machine learning algorithms is performed in step 4110 on this data (i.e., data is pre-processed). Generally, there is sufficient data collected over the entire operational time interval of the aircraft so that a small amount of missing data, if there should be any, does not adversely impact the analysis. In step 4115 statistical sampling filter algorithms are used to select, manipulate, and analyze the component and like component parameters for a representative set of training dataset and test dataset that identify patterns and trends in the larger dataset under examination as indicated in Training Dataset step 4120 and Test Dataset step 4125. In step 4130 the Training Dataset 4120 goes through further pre-processing for feature selection, scaling, and dimensionality reduction. Feature selection is the process whereby the training dataset undergoes feature exclusion, i.e., exclusion of outlier data thus reducing unwanted features in the dataset that may produce inaccurate analysis. Dimensionality reduction transform the dataset into lower dimensions also providing quick pattern recognition and lowering the complexity in computation of the results. Scaling can be used to improve the numerical stability of both algorithms and models with scaling factors between a minimum and maximum value (generally between zero and one). This data is also added to the Test Dataset 4125 providing finer refinements. In step 4135 the Training Dataset trains the machine learning algorithms to search for the most accurate features and patterns that will refine the three-tier model parameters and algorithm(s) parameters associated with the model. These parameters are further optimized in step 4140 Parameters Optimization with weighted sampling of the data which best describe the three-tier model and their algorithm(s) from history and current dataset. In step 4145 Post Process & Decision Point, RUL, SOH, and EOL are calculated and compared with historic and current aircraft flight data results. If these are far from the already available values, e.g. >10%, refinement continues in step 4130. If close (but not close enough, e.g. >1% & less than or equal to 10%) to the already available values, refinement continues in step 4135. After n-number of refinements, if the values do not change much, e.g. within 1%, the final model and algorithm parameters and metrics are stored in step 4155 New Data and the new parameters are added to 4125 Test Data which is also stored in 4155 New Data. The 4155 New Data refers to the databases 4350 Prognostics Model Library, 4385 Algorithms Library, and 4365 Results (for the refined test dataset and metrics) in FIG. 41. These databases (4350, 4385, and 4365) are then migrated to the 3660 Models Library DB, 3680 Algorithms Library DB, and 3740 Prognostics Outcome DB in Fleet Level Prognostics System 3600, respectively. Similarly, these databases (4350, 4385, and 4365) are migrated to 2635 Prognostics Models DB, 2668 Algorithms (the subset algorithms only), and 2655 Analyzed Data in the On-board System 2600, respectively. By migrating 4350, 4385, and 4365 databases into Systems 2600 and 3600, accuracy improvements and refinements on models and algorithms are accomplished.

In the operational state 4102, the step 4165 Model & Algorithms Databases refers to the databases 3660 Models Library DB and 3680 Algorithms Library DB in System 3600, respectively. The steps 4170 to 4185 are parallel processing to existing processing occurring in 3770 Prognostics Accuracy & Algorithms Tuning & Training and 3780 Prognostics Model Tuning & Training for algorithms and models, respectively. This occurs only when new data arrives (when COMMS 3605 is active and transmitting data to System 3600, otherwise existing data in 3626 Storage is utilized) for parameter performance tuning and models and algorithms refinement. Initial analysis and data are extracted in step 4101 Training Systems Learning & Training Algorithms, described above. With new data arrival the sensitivity and specificity of model analysis are initiated in step 4170. For models, this analysis searches for changes in model output values that result from changes in the model input values. It also determines the uncertainty in the model parameters from input to output results. Algorithms sensitivity ascertains "true positive" degradation rate while algorithm specificity ascertains "true negative" degradation rate that are correctly identified. True negative rates tend to reduce the true positive rates when taken for entire like components on an aircraft. Sensitivity and specificity enhance the accuracy in measurements of RUL, EOL, and SOH. Step 4175 determines the uncertainty in the metrics calculations, e.g. to ±5%. If this percentage is greater than the set amount step 4170 is reinitiated, otherwise the process proceeds to step 4180 Verification and Validation Test. In step 4180 regression tests are performed (existing successful test scripts are executed) and compared with previous test results. If these test results pass in step 4185, the new analysis and data are transmitted to the step 4101 databases for storage and for future processing. If these test results do not pass, the analysis & processing goes back to step 4170 and the process continues as described above.

Figure 40:
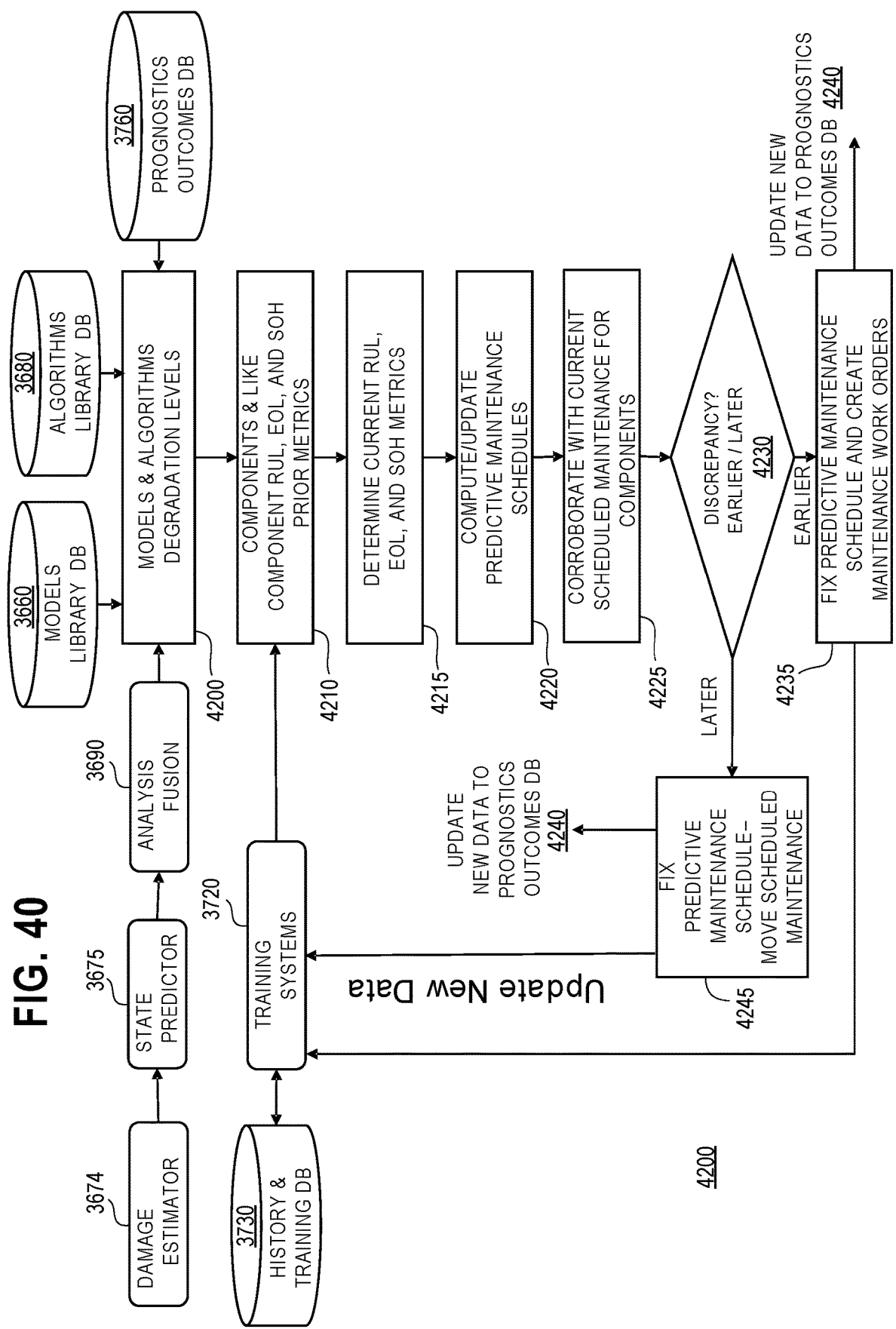
FIG. 40 is a flow diagram showing steps that determine when all like components in the fleet of aircraft require concurrent maintenance based on fleet level performance metrics and generated predictive maintenance schedules.

FIG. 40 is a flow diagram showing how fleet level performance metrics for a component are used to determine when single/all like components in the fleet of aircraft require maintenance/concurrent maintenance. There are two modes 1) autonomous mode and 2) offline mission operator/ maintenance technician mode. Autonomous mode is active when COMMS 3605 is active and the Server Button in 3601 is clicked "ON", allowing for handshake between System 3600 and COMMS 3605 via software socket connections. Real time data transmission from COMMS 3605 to Data Distribution Module 3630 verifies the automated mode (i.e., the incoming data is the trigger). In the autonomous mode when degradation/fault/failure event alarms exist these are visualized in Screen 3605 (FIG. 44)(i.e., a table of all like aircrafts) as color grey for "ground based" aircrafts, color green for "fully mission capable (FMC)", color orange for "partial mission capable (PMC)", and color red for "non-mission capable (NMC)" for particular aircraft tail number. Further action requires mission operator intervention. As a note, PMC implies that the aircraft can still perform its mission in a degraded mode. Whereas, NMC implies that the aircraft will go into a recovery mode (flight termination sequence), i.e., return to home as soon as possible and land or land in a safe place or crash. The operator can click on the row with the color's orange or red (i.e., each row on Screen 3605 is information on an aircraft with a unique tail number in operation or on ground). When the row is clicked, another detailed screen provides visibility of all the material assets on that particular aircraft with their associated metrics obtained from the Metrics Module 3740. Low RUL and SOH percentages will be an impetus for the mission operator to view the predictive maintenance schedule by simply clicking on the degraded asset row and bring up the screen as shown in FIG. 43. In the offline mission operator/ maintenance technician mode data collected in Storage 3626 is used to perform the same operation as discussed above, but offline by clicking on the "Run Predictions" button in 3601 or as discussed above by clicking on aircraft (row) in 3605 and then clicking on the asset row to view results FIG. 43, i.e., for decision on further actions to be taken. The predictive maintenance schedule shown in FIG. 43 for the degraded asset depends upon the flow diagram shown in FIG. 40.

FIG. 43 depicts the case where the predictive maintenance occurs "earlier" than the a priori planned schedule maintenance per the decision in the decision shape 4230 of FIG. 40. Work orders to the maintenance staff would be issued in step 4235. A "later" predictive maintenance schedule would have the effect of moving (in step 4245) the planned scheduled maintenance line 4540 on top of the predictive maintenance schedule line 4535. In both "earlier" and "later" cases Training Systems Module 3720 (updates the History & Training DB 3730) and Prognostics Outcomes DB 3760 are updated via step 4240. Step 4200 receives inputs from Modules 3660, 3680, and 3760, computes RUL, EOL, and SOH in Modules 3674 and 3675 as well as identifies any degradation events and decrease in component performance. Modules 3690 and 3740 provide the essential processing in steps 4210, 4215, while steps 4220, 4225, 4230, 4235, 4240, and 4345 are computed in the Reports Module 3750, for the predictive maintenance schedule and a priori planed scheduled maintenance, respectively. The graphing trigger capability as shown in FIG. 43 resides in the Reports Module 3750 via the Print Function 3795, as well as other modules which may require graphing functionality.

SOH is a percentage score that depends on the relevant physics, chemistry, and/or biology (i.e., biotechnology) of the component, for instance the SOH for a battery is estimated by dividing the maximum residual capacity $C_i$ of the i-th cycle by the nominal capacity $C_0$:

$$SOH_i = \frac{C_i}{C_0} \times 100$$

SOH for batteries depends on cyclic charging and discharging while its RUL and EOL depend on its constituent materials physical and chemical properties. For other components this process is not cyclic, e.g., structures, mechanical equipment, electronics boards, rotating machinery, etc. For example, sand particles in oil-water-mixture can cause serious erosion in choke-valves. When erosion happens the value fluid flow coefficient $C_v$ increases due to increased value opening. The SOH for this system would be:

$$SOH = C_f \times \frac{C_v^{calculated} - C_v^{reference\ (supplier\ provided)}}{C_v^{reference\ (supplier\ provided)}} \times 100$$

$C_f$ is the coefficient of friction in pipe flow given by the (Darcy-Weisbach equation):

$$C_f = \frac{H_f}{\frac{L}{D} \times \frac{v^2}{2 \times g}}$$

where
$H_f$ is the head loss (ft)
L is the length of pipe (ft)
D is the inner diameter of pipe (ft)
v is the velocity of fluid (ft/s)
g is the gravitational acceleration (ft/s$^2$)
$C_f$ is generally provided in the corresponding supplier specification. The calculated value of $C_v$ is not direct, but it can be calculated from sensor data, i.e., upstream pressure, downstream pressure, temperature, flow rates, fluid density, entropy, depending on the sensors available within and near the choke valves.

Figure 45:
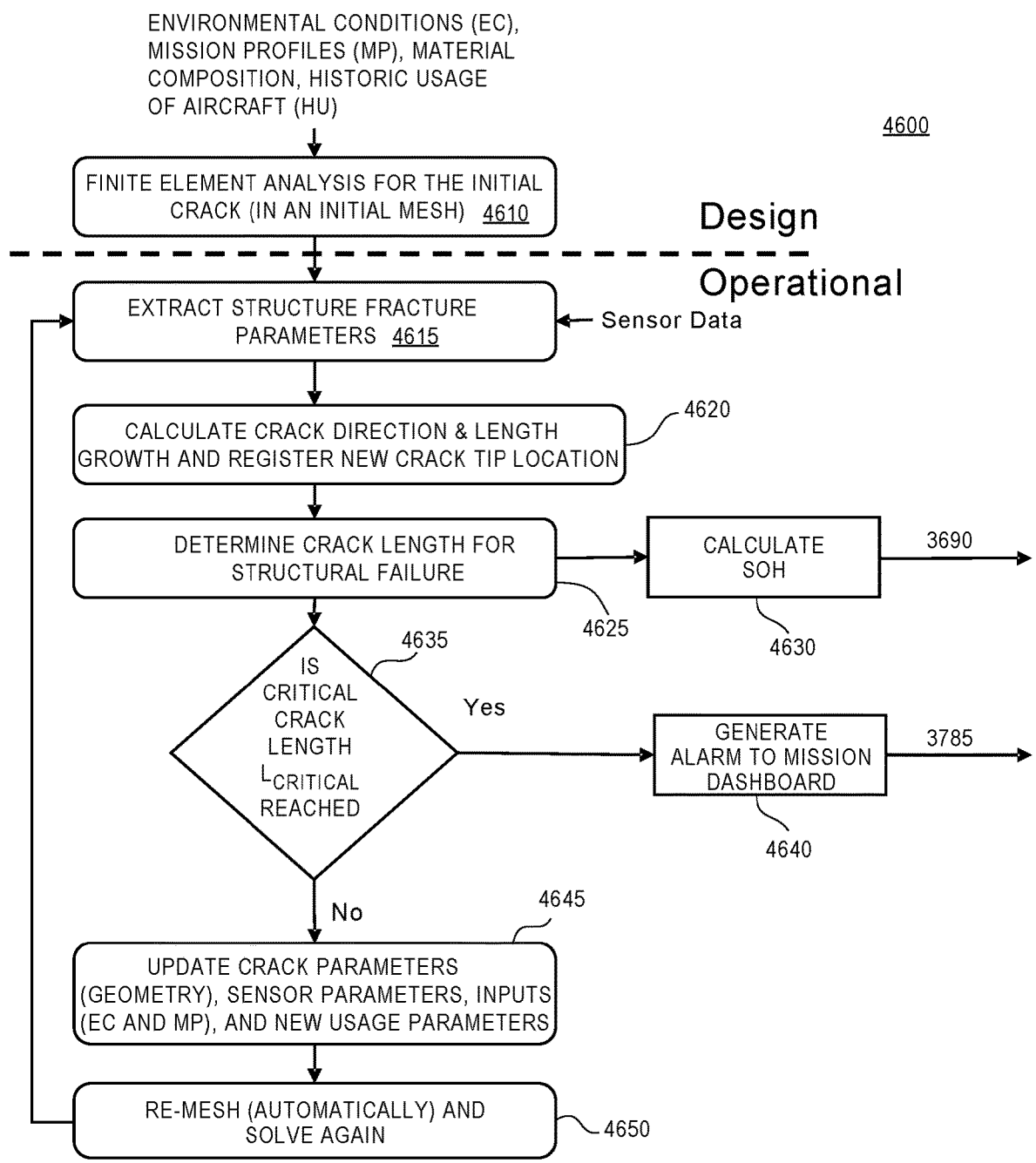
FIG. 45 is a flow chart for determination of a state of health (SOH) indicator for an exemplary structural component.
Figure 47:
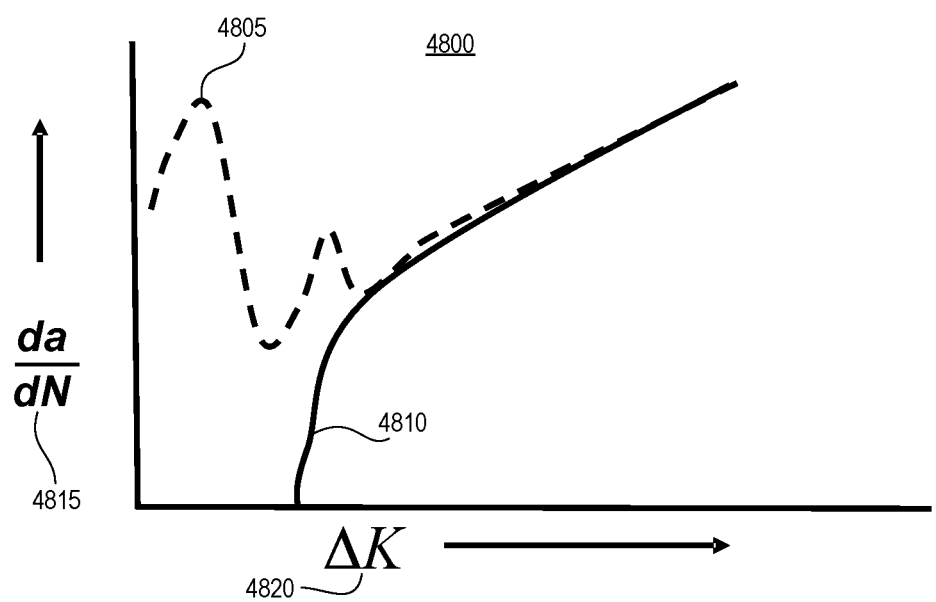
FIG. 47 is a chart showing the relationship between cyclic load, stress, and crack growth in structural material.

Another example is crack growth in structures (such as turbo blade of turbo fan aircraft engine, turbo fan housing, helicopter blades, wing structures, others). The flow diagram is shown in FIG. 45. Finite element analysis (FEA) 4610 (using available data 4605) is performed during the design phase with an initial mesh that is a partition of the problem crack space into elements (smaller spatial cells or zones) over which partial differential equations can be solved producing the result of net larger domain of the crack space. In the operational phase 4615-4650 in FIG. 45, step 4615 extracts the structure fracture parameters from the FEA 4610 and processes these parameters with incoming sensor data and then calculates the crack propagation direction, its growth in length, and then registers the new position of the crack tip. Step 4625 determines the crack length in all directions and compares with previous calculations or from a previous flight calculation. In step 4630 SOH is calculated and transmitted to Module 3690. The FEA 4610 also calculates the critical crack length "$L_{critical}$" that would cause aerodynamic instability of the aircraft. If this instability occurs, "$L_{critical}$" is reached in step 4635, an alarm is generated in step 4640 and shown on the Mission Operator Dashboard 3785 as a blinking alarm for immediate action. In step 4645 if the critical crack length in decision step 4635 is not reached the processing continues with update of the crack parameters and re-mesh is applied in step 4650 with these new crack growth parameters. Processing continues with feedback to step 4615. SOH for these components would indicate the percentage of crack propagation over time and its criticality. SOH would depend on the material composition (i.e., micro structural deformities and material impurities), environmental conditions, and the usage of the aircraft under various operating maneuvers and missions (high and low acceleration, fast turning, fast ascent & descent having the effect of increasing and decreasing gravitational forces). As shown in FIG. 47, the crack growth can be small crack which grows slowly over time (4805) or long crack growth (4810) which grows quickly over time and may propagate to critical system failure in a very short time interval depending on the cyclic external load cycle N (i.e., da/dN 4815) and the increasing tearing of the area around the crack is due to this cyclic external load and the stress (4820) on the structural material. The SOH is given mathematically:

$$\frac{da}{dN} = C(\Delta K)^m;$$

Paris' Law
where:
a=crack length
N=load cycle
$\Delta K$=the stress intensity factor
"C" and "m" are experimentally obtained from frequency, temperature, stress ratio and environmental conditions $\Delta K = s_N \sqrt{\pi \times a}$ where s=applied stress $$SOH \approx 100 \times \frac{da/dN}{\pi \times a \times s_N^2}$$

It is noted, that the battery example is dealing with cyclic charging and discharging due to its internal chemical and physical structure, as it provides electricity to an external load. Whereas, in the crack growth example an external cyclic load causes deformation in the structure leading to tearing sheer stresses & strains in the material causing the crack to grow and tear. This external load on the structure could have been continuous rather than cyclic.

In step 4635 a determination is made of whether the critical crack length $L_{critical}$ has been reached for which structural failure is projected. A YES determination by step 4635 results in an alarm being generated at the mission dashboard in step 4640. The generation of the alarm is appropriate since the critical length $L_{critical}$ of the crack to potentially create a structural failure has been determined. A NO determination by step 4635, indicating that the critical crack length has not yet reached $L_{critical}$ projected to cause a structural failure, results in step 4645 updating the crack parameters, sensor parameters, new environmental condition and mission profile, and new usage parameters. Following this updating, in step 4650 another calculation iteration is continued by returning to step 4615 so that continuing determinations can be made by step 4635 based on new information.

Figure 46B:
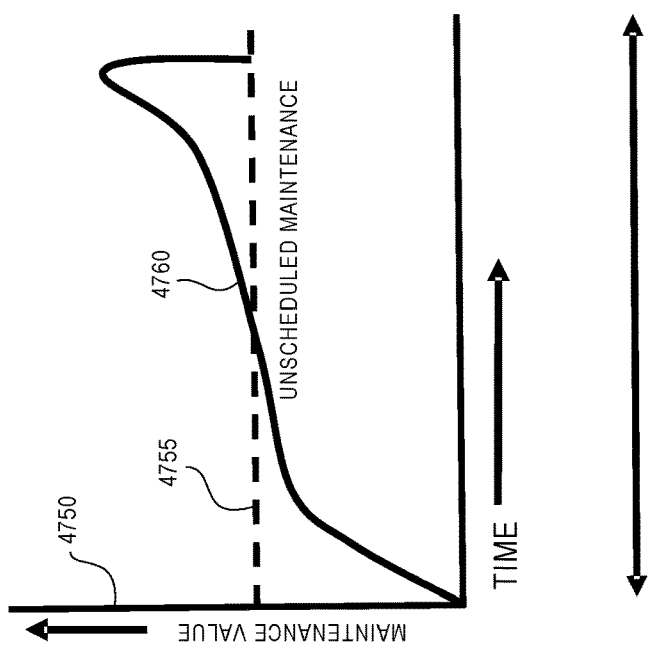
FIGS. 46A and 46B are graphs of the maintenance characteristics of a component versus time.
Figure 46A:
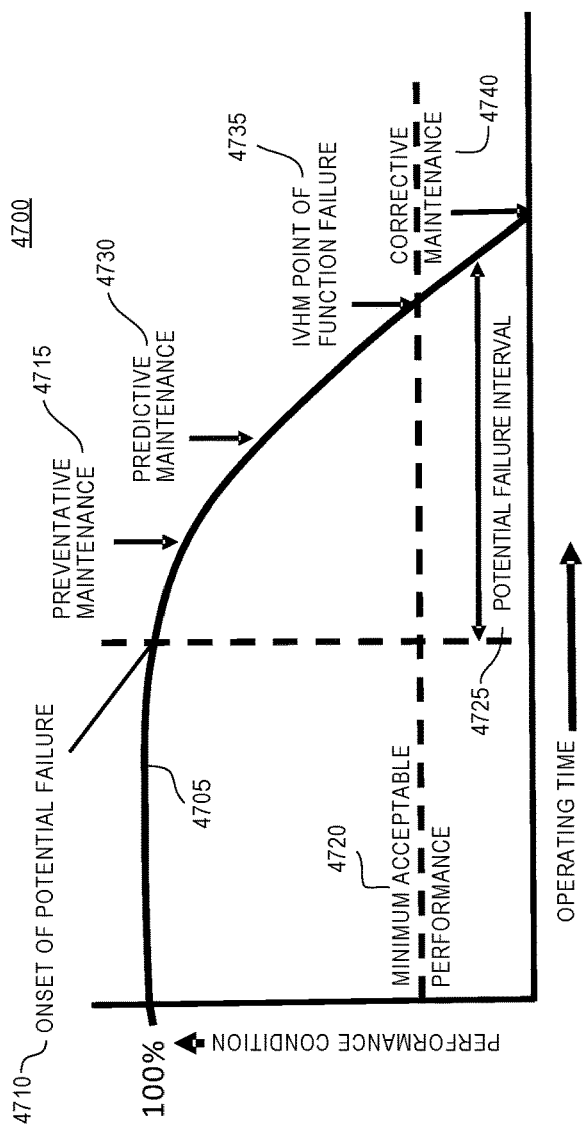

FIGS. 46A and 46B are graphs of the maintenance characteristics of a component versus time. Module 3800 represents the organic maintenance and support systems of the military used to generate maintenance tasks orders, perform intermediate level (I-Level) of maintenance (at minimum), supply chain and inventory control, etc. Module 3830 represents the maintenance and support systems of the defense contractor. The defense contractor may be asked to perform D-Level (i.e., Depot-Level maintenance) by the organization operating the aircraft, who may in turn may request D-Level maintenance from its suppliers and manufacturers. O-Level Maintenance is provided by the organization operating the aircraft (i.e. the military) with technical data and possibly services provided by the contractor or developer of the aircraft (i.e., a contractor team may be embedded within the military). Various types of maintenance are described in FIG. 46A as a probability of "performance condition" 4705 versus "time" ranging on the y-axis from 100% performance to near 0% performance indicating corrective maintenance and may reflect an EOL of the component (an overhaul of very expensive component may be performed keeping the component in service). As a maintenance objective, the Remaining Useful Life (RUL) of a component/Line Replaceable Unit (LRU) and the Remaining Useful Performance (RUP) should be maximized while avoiding unscheduled maintenance. The definition of terms shown in FIG. 46A are defined below.

| Maintenance Type or Function | Definition |
| --- | --- |
| O-Level Maintenance | Maintenance performed at the organizational level, may occur for example, by a maintenance squadron as part of an aircraft wing. O-level maintenance is performed to optimize in-theater operation quick turn-around time and to enhance operational availability of the aircraft |
| D-Level Maintenance | Depot-level maintenance requires major repair and overhaul and occurs at the manufacturer's site. It may require the complete rebuilding of the aircraft, its end items, its parts, its assemblies and subassemblies, as well as technical assistance and testing from the designer/developer of the aircraft (i.e., the defense contractor) |
| I-Level Maintenance | I-Level maintenance support facilities provide a regional repair center. The military customer will ship faulty component to this regional repair center. The facility will perform inspections and tests on the component. Generally, this entails. 1) identify No Fault Found (NFF) or Can Not Duplicate (CND) faults and prevent these components from being sent back to the Depot Level (D-Level) facility, 2) identify faulty components inside the LRU and replace the faulty internal components with functioning qualified spares, and 3) ship back to the origination site |

| Maintenance Type or Function | Definition |
| --- | --- |
| Corrective Maintenance 4740 | Implies that all life of the component in question is consumed (EOL), the effects are unpredictable and corrective actions are taken due to failure of the component |
| Predictive Maintenance 4730 | Utilization of IVHM techniques (diagnostics & prognostics) in identifying maintenance before significant degradation or total failure or shutdown occurs |
| Preventative Maintenance 4715 | Scheduled maintenance events occur at specified intervals and if the component is replaced there is significant wastage of remaining life |
| IVHM Point of Function Failure 4735 | The point where IVHM remediation and actionable preventative measures occur based on accumulated evidence of degrading/failing system conditions |
| IVHM Enabled Maintenance (IEM) | Enables Performance Based Logistics (PBL), CBM, CBM+(i.e., reduction in logistics footprint, better spares management, minimization of external test equipment needs, increased safety, increased availability, risk reduced for loss of system, minimization of unscheduled maintenance, and better management of resources based on need). IEM allows for self-cognizant systems, maintenance driven availability and availability contracts, dynamic warranties, prognostics driven health management, minimizes loss of remaining life, better diagnostics, less post-repair testing, reduction in collateral damage during repair, less end-of-life disposal (disposal avoidance), reduction in take-back costs, and the maintenance outcome is driven by requirements |
| Onset of Potential Failure 4710 | The point where potential failures could occur based on mission profiles, usage information, and informed IVHM predictions |
| Minimum Acceptable Performance 4720 | The point at which degradation of missions, increase in mission aborts, and decrease in the availability of the system could occur |
| Potential Failure Interval 4725 | The time interval where failure of system could occur unexpectedly |

From this graph it should be apparent that on the onset of potential failure 4710, the preventative maintenance 4715 will typically be substantially less cost-effective while adding more cost than predictive maintenance 4730 since often a component will have substantial RUL beyond the scheduled time of preventive maintenance 4715. Hence, utilizing maintenance based on actual performance utilizing predictive maintenance will obtain a longer operational lifetime of the component and hence minimize component replacement/repair costs as well as the labor costs for performing the maintenance while keeping the aircraft operational longer.

In FIG. 46B the dashed line 4755 represents a Maintenance Value 4750 of zero. This value represents the transition point between aircraft Mean Logistics Delay Time (MLDT) and Mean Time To Repair (MTTR) (due to aircraft downtime with work orders for unscheduled maintenance) and its ready for operational state 4755. MLDT can be due to various delays in administrative work, lack of transportation or long time for round trip transportation, and other reasons. Once MLDT has been resolved, additional MTTR is needed to perform the maintenance repair or replacement action. Note that the positive peak in graph 4760 and it's direct fall to zero, generally represents the component nearing its the EOL, which may lead to unscheduled maintenance (complete overhaul for expensive component).

Figure 48:
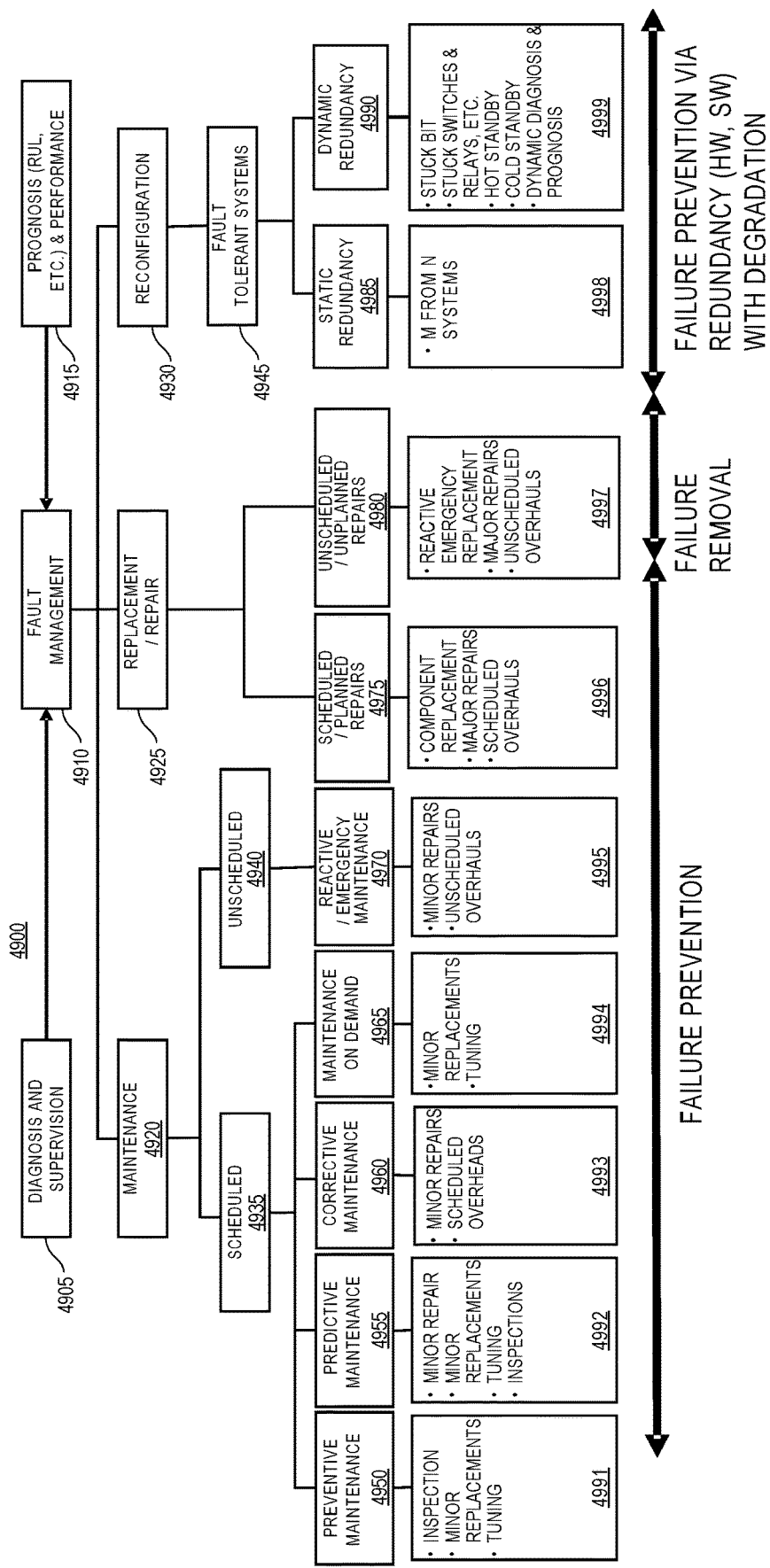
FIG. 48 is a chart showing the interrelationship between fault management and various maintenance methods and actions.

In FIG. 48, Fault Management 4910 consists of Diagnosis & Supervision 4905 (fault detection, fault isolation, false alarm rejection, and root cause analysis) and Prognosis 4915 (degradation analysis and metrics computation: RUL, EOL, SOH for health of aircraft equipment) and various interrelated Maintenance Actions, Procedures, and Reconfiguration (all from 4920-4999). It is important to realize that high fidelity and accurate diagnostics and prognostics have a significant impact on the maintenance, repair, and overhaul (MRO) activities on components and aircrafts. Accurate fault & failure isolations, false alarm rejections, and determination of equipment degradations reduce the maintenance workload as well as reduce fleet of aircraft operation and support costs over decades of operations eliminating up to 50% of cost burden (significant over decades) with accurate diagnostics and prognostics. The Fleet Level Prognostics System 3600 analyzes, computes, stores, and reports on each of these various maintenance functions. Maintenance 4920 procedure breakdown into Schedule Maintenance 4935 and Unscheduled Maintenance 4940. Schedule Maintenance 4935 further breaks down in Preventative Maintenance 4950, Predictive Maintenance 4955, Corrective Maintenance 4960, and Maintenance On Demand 4965 (refers to urgent and run of the mill maintenance need). Similarly, Unscheduled Maintenance 4940 breaks down into Reactive/Emergency Maintenance 4970. Blocks 4950-4965 each have associated with them their typical maintenance actions performed by certified technicians in blocks 4991-4994 for Schedule Maintenance 4935, respectively. Reactive/Emergency Maintenance 4970 has its reference maintenance actions block 4995. The key difference between Reactive/Emergency Maintenance 4970 and Maintenance On Demand 4965 is the inclusion of planned maintenance tasks in conjunction with reactive/emergency needs, whereas on-demand maintenance tasks may result in ad-hoc time interval maintenance not planned (e.g., best available time). Replacement/Repair 4925 tasks breakdown into Schedule/Planned Repairs 4975 and Unscheduled/Unplanned Repairs 4980. Blocks 4975 and 4980 have their associated maintenance action 4996 and 4997, respectively. Aircraft flight control systems are fault tolerant and have adaptive resiliency, such that in-flight reconfiguration of hardware and software from faults is possible by sending a command to reconfigure (e.g., stuck hardware bit, stuck switches, stuck relays, etc.). Reconfiguration 4930 performs such an adaptive resiliency available only on Fault Tolerant Systems 4945 with Static Redundancy 4985 and Dynamic Redundancy 4990. The Damage Estimator Module 3674 and the State Estimator Module 3675 perform this reconfiguration function available only in the inflight operations while the Fleet Level Prognostics System 3600 is operational and connected via COMMS 3605 to the onboard Prognostics System 2600. System 2600 requests additional processing to System 3600, which provides the necessary analysis and information on command sequence triggers to System 2600. System 2600 builds and verifies the command sequences for transmission to the aircraft flight control system (FCS). If for any reason System 3600 is not available, System 2600 builds the best possible command sequences with uncertainties from available information. There is direct feedback link to the System 2600 to generate the command sequence (from triggers provided by System 3600) for reconfiguration without bringing the aircraft down. Note that this command sequence information is only a recommendation to FCS. Systems 2600 and 3600 provide situational awareness alone; FCS must make the final determination on whether or not to transmit the reconfiguration command sequence depending on a variety of factors such available hardware & software redundancy, current mission, environmental conditions, possible cascading faults and failures (a fault in one component generates faults in other components, as well as in other subsystem components), and others. Most of this information is provided by the System 2600 and 3600. Static and dynamic redundancies are handled by the FCS. Static redundancy in fault tolerant systems (requires high reliability with real time performance) generally deals with memory correction codes and majority voting scheme "m from n systems" in block 4998 (in the FCS). Similarly, dynamic redundancy requires high fidelity and accurate Diagnostics (Module 106 (14)), Prognostics (Modules 2600 and 3600), and redundant hardware. Computational hardware can be single, dual, triple or quadruple redundant systems (i.e., identical in every way). In such cases the FCS uses a majority voting scheme between the hardware outputs to determine the most likely and best results (i.e., single: is a single point of failure, dual: is in a master-slave configuration—if master fails slave takes over, triple: 2 out of 3 similar results; quadruple: 3 out of 4 similar results, etc.). In quadruple redundant hardware complication result when 2 pairs show different results while each pair shows the same results; which pair to choose? Other information/evidence is required to choose the correct pair. It is even more difficult when each computer shows different results. These are a topic of concern in FCS and not in the diagnostics and prognostics systems. Note the elements in FIG. 48 responsible for failure prevention, failure removal and failure prevention via redundancy (HW, SW) with degradation.

What is claimed is:

1. A method implemented by a ground-based computing system to improve the accuracy of component degradation determinations on-board an aircraft comprising the steps of:
receiving data of performance parameters for like components disposed on a plurality of like aircraft and storing the data in memory associated with a microprocessor in the ground-based computing system;
determining by the microprocessor, by at least two models of each of the corresponding like components, corresponding levels of degradation and rates of change of degradation for the respective like components based on the received data;
generating by the microprocessor a fleet level of degradation for each group of like components based on the degradations of the like components in each group;
modifying by the microprocessor at least one of the at least two models of like components based on the fleet level degradation to improve the accuracy of the at least one model;
transmitting from the ground-based computing system the modified at least one model to the like aircraft so that the modified at least one model can be used to replace a prior version of the at least one model to generate on-board degradation analysis, thereby enhancing the accuracy of on-board degradation analysis based on fleet level data.

2. The method of claim 1 wherein:
the data includes identification of an operational mode of the aircraft for the performance parameters;
the determining step determines the corresponding levels of degradation and rates of change of degradation for the respective like components based on the stored performance parameters and the operational mode of the aircraft associated with the respective performance parameters.

3. The method of claim 1 wherein:
the determining step determines at least one of a remaining useful lifetime (RUL) and a state-of-health (SOH) for each of the respective like components based on a comparison of the levels of degradation for each of the like components and the fleet level of degradation of the group of like components;
the determining step determines a predicted time for maintenance for each like component based on the corresponding at least one of the RUL and SOH of the like component, thereby enabling cost effective maintenance determinations for components based on a fleet level information.

4. The method of claim 3 wherein determining the RUL for each of the respective like components comprises:
determining the RUL for each like component based on a previous determination of RUL of the like component and the rate of degradation of performance of the respective like component.

5. The method of claim 1 wherein the receiving of data includes transferring a plurality of like components' data from a respective like aircraft to the ground-based computing system while the aircraft is on the ground, the data based on component performance parameters stored in an aircraft data storage device while the aircraft was in flight.

6. The method of claim 1 wherein the receiving of data includes transferring via a wireless communication link a plurality of like components' data from a respective like aircraft to the ground-based computing system while the aircraft is in flight.

7. The method of claim 1 wherein the determining corresponding levels of degradation and rates of change of degradation for the respective like components comprises:
determining, by at least one of a physics-based model of the respective like components and an empirical model of the respective like components, a first residue that is a difference between a current state of the performance parameters of the like components and corresponding states of the performance parameters of the like components as determined by the at least one of the physics-based model and the empirical model;
determining, by a physical system model of the respective like components, a second residue that is a difference between the current state of the performance parameters of the like components and predetermined ranges of states of performance parameters of the corresponding like components as determined by the physical system model; and
determining, based on a combination of the first and second residues, a level of degradation for the respective like components and a rate of change of degradation for the respective like components;
determining a current state of health (SOH) for each like component;
comparing for each like component the current corresponding SOH with a state of 100% performance to generate a current SOH for the like component.

8. A computer readable non-transitory storage medium having data stored therein representing software instructions executable by a computer, the software including instructions to implement a ground-based computing system to improve the accuracy of component degradation determinations on-board an aircraft, the storage medium comprising:
instructions for storing, in memory associated with a microprocessor in the ground-based computing system, received data of performance parameters for like components disposed on a plurality of like aircraft;
instructions to cause determining by the microprocessor, by at least two models of each of the corresponding like components, corresponding levels of degradation and rates of change of degradation for the respective like components based on the received data;
instructions to cause generating by the microprocessor a fleet level of degradation for each group of like components based on the degradations of the like components in each group;
instructions to cause modifying by the microprocessor at least one of the at least two models of like components based on the fleet level degradation to improve the accuracy of the at least one model;
instructions to cause transmitting from the ground-based computing system the modified at least one model to the like aircraft so that the modified at least one model can be used to replace a prior version of the at least one model to generate on-board degradation analysis, thereby enhancing the accuracy of on-board degradation analysis based on fleet level data.

9. The medium of claim 8 wherein:
the data includes identification of an operational mode of the aircraft for the performance parameters;
the instructions to cause determining includes determining the corresponding levels of degradation and rates of change of degradation for the respective like components based on the stored performance parameters and the operational mode of the aircraft associated with the respective performance parameters.

10. The medium of claim 8 wherein:
the instructions to cause the determining includes determining at least one of a remaining useful lifetime (RUL) and a state-of-health (SOH) for each of the respective like components based on a comparison of the levels of degradation for each of the like components and the fleet level of degradation of the group of like components;
the instructions to cause the determining includes determining a predicted time for maintenance for each like component based on the corresponding at least one of the RUL and SOH of the like component, thereby enabling cost effective maintenance determinations for components based on a fleet level information.

11. The medium of claim 10 wherein the instructions to cause the determining of the RUL for each of the respective like components comprises:
instructions to cause determining the RUL for each like component based on a previous determination of RUL of the like component and the rate of degradation of performance of the respective like component.

12. The medium of claim 8 wherein the instructions to cause the determining comprises:
instructions to cause determining, by at least one of a physics-based model of the respective like components and an empirical model of the respective like components, a first residue that is a difference between a current state of the performance parameters of the like components and corresponding states of the performance parameters of the like components as determined by the at least one of the physics-based model and the empirical model;
instructions to cause determining, by a physical system model of the respective like components, a second residue that is a difference between the current state of the performance parameters of the like components and predetermined ranges of states of performance parameters of the corresponding like components as determined by the physical system model; and
instructions to cause determining, based on a combination of the first and second residues, a level of degradation for the respective like components and a rate of change of degradation for the respective like components;
instructions to cause determining a current state of health (SOH) for each like component;
instructions to cause comparing for each like component the current corresponding SOH with a state of 100% performance to generate a current SOH for the like component.

* * * * *